(12) United States Patent
Kim et al.

(10) Patent No.: US 10,986,545 B2
(45) Date of Patent: Apr. 20, 2021

(54) METHOD FOR RESOURCE ALLOCATION IN WIRELESS COMMUNICATION SYSTEM AND APPARATUS THEREFOR

(71) Applicant: LG ELECTRONICS INC., Seoul (KR)

(72) Inventors: Myoungseob Kim, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/544,741

(22) Filed: Aug. 19, 2019

(65) Prior Publication Data

US 2019/0373524 A1     Dec. 5, 2019

Related U.S. Application Data

(63) Continuation of application No. 15/755,046, filed as application No. PCT/KR2016/009428 on Aug. 25, 2016, now Pat. No. 10,390,274.

(Continued)

(51) Int. Cl.
*H04W 36/00* (2009.01)
*H04W 72/04* (2009.01)
(Continued)

(52) U.S. Cl.
CPC ......... *H04W 36/0072* (2013.01); *H04W 4/46* (2018.02); *H04W 36/00* (2013.01);
(Continued)

(58) Field of Classification Search
CPC ...... H04W 4/029; H04W 64/00; H04W 84/12
See application file for complete search history.

(56) References Cited

U.S. PATENT DOCUMENTS 9,681,430 B2 * 6/2017 Rune ................ H04L 1/1671
9,743,319 B2    8/2017 Wu
(Continued)

FOREIGN PATENT DOCUMENTS

WO    2010002692    1/2010
WO    2013152217    10/2013
WO    2014070049    5/2014

OTHER PUBLICATIONS

U.S. Appl. No. 15/755,046, Notice of Allowance dated Apr. 2, 2019, 10 pages.

(Continued)

*Primary Examiner* — Chandrahas B Patel
(74) *Attorney, Agent, or Firm* — Lee, Hong, Degerman, Kang & Waimey

(57) ABSTRACT

Disclosed are a method for allocating resources in a wireless communication system and an apparatus therefor. In particular, a method for allocating radio resources to a UE in a wireless communication system, comprising: a step of receiving, from a first base station, first semi-persistent scheduling (SPS) configuration information including semi-persistent resource allocation information of a first cluster; a step of being allocated a first SPS resource on the basis of the first SPS configuration information by receiving an SPS assignment from the first base station; and a step of, when the UE performs handover to a second cluster belonging to the same cluster group as the first cluster, being allocated a second SPS resource on the basis of the first SPS configuration information by receiving an SPS assignment from a second base station.

11 Claims, 35 Drawing Sheets

Related U.S. Application Data

(60) Provisional application No. 62/209,847, filed on Aug. 25, 2015.

(51) Int. Cl.
  *H04W 72/10* (2009.01)
  *H04W 4/46* (2018.01)
  *H04W 36/08* (2009.01)

(52) U.S. Cl.
  CPC ......... *H04W 36/08* (2013.01); *H04W 72/042* (2013.01); *H04W 72/10* (2013.01)

(56) References Cited

U.S. PATENT DOCUMENTS

| | | | |
|---|---|---|---|
| 10,390,274 | B2 | 8/2019 | Kim et al. |
| 2013/0267221 | A1 | 10/2013 | Srinivasan et al. |
| 2014/0242989 | A1 | 8/2014 | Cai et al. |
| 2018/0049104 | A1* | 2/2018 | Van Phan .............. H04W 76/14 |
| 2018/0270722 | A1 | 9/2018 | Kim et al. |

OTHER PUBLICATIONS

PCT International Application No. PCT/KR2016/009428, Written Opinion of the International Searching Authority dated Dec. 1, 2016, 8 pages.

LG Electronics, "Discussion for CR on SPS PDSCH mapping," 3GPP TSG-RAN WG1 #72bis, R1-131280, Apr. 2013, 4 pages.

HTC, "Control Signalling Enhancements for Improved Spectral Efficiency," 3GPP TSG-RAN WG1 #73, R1-132077, May 2013, 6 pages.

CMCC, "SPS support in dual connectivity," 3GPP TSG-RAN WG2 #85, R2-140127, Feb. 2014, 4 pages.

European Patent Office Application Serial No. 16839628.1, Search Report dated Mar. 28, 2019, 9 pages.

* cited by examiner (a) Single CC          (b) Multiple CC (a) Radio resource use_type 1

(b) Radio resource use_type 2

FIG. 30

| Subframe # (DL) | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|
| Cluster group #0 (Synchronization signal transmission timing (subframe) of cluster #0, #7, #14, .. #42) | ▨ | | | | | | | | | | ▨ | | | | | | | | | |
| Cluster group #1 (Synchronization signal transmission timing (subframe) of cluster #1, #8, #15, .. #43) | | ▨ | | | | | | | | | | ▨ | | | | | | | | |
| Cluster group #2 (Synchronization signal transmission timing (subframe) of cluster #2, #9, #16, .. #44) | | | ▨ | | | | | | | | | | ▨ | | | | | | | |

⋮

METHOD FOR RESOURCE ALLOCATION IN WIRELESS COMMUNICATION SYSTEM AND APPARATUS THEREFOR

CROSS-REFERENCE TO RELATED APPLICATIONS

This application is a continuation of U.S. patent application Ser. No. 15/755,046, filed on Feb. 23, 2018, now U.S. Pat. No. 10,390,274, which is the National Stage filing under 35 U.S.C. 371 of International Application No. PCT/KR2016/009428, filed on Aug. 25, 2016, which claims the benefit of U.S. Provisional Application No. 62/209,847, filed on Aug. 25, 2015, the contents of which are all incorporated by reference herein in their entireties.

TECHNICAL FIELD

The present invention relates to a wireless communication system and, more particularly, to a resource allocation method using semi-persistent scheduling and an apparatus supporting the same.

BACKGROUND ART

A mobile communication system has been developed to provide a voice service while guaranteeing user mobility. However, the mobile communication system has been extended a service range to a data service as well as a voice, and nowadays, a resource shortage phenomenon occurs due to explosive traffic increase and users request a higher speed service and thus a more enhanced mobile communication system is required.

A next generation mobile communication system should be able to support acceptance of explosive data traffic, epochal increase of a transmission rate per user, acceptance of the largely increased connection device number, very low end-to-end latency, and high energy efficiency. For this reason, various technologies such as dual connectivity, Massive Multiple Input Multiple Output (Massive MIMO), In-band Full Duplex, Non-Orthogonal Multiple Access (NOMA), Super wideband support, and Device Networking have been researched.

DISCLOSURE

Technical Problem

An object of the present invention proposes a method for allocating resources using a semi-persistent scheduling method in a wireless communication system.

Furthermore, an object of the present invention proposes a method for allocating resources to a vehicle type-UE (V-UE) using semi-persistent scheduling method in a wireless communication system supporting vehicle-to-everything (V2X) communication, in particular.

Technical objects to be achieved by the present invention are not limited to the aforementioned technical objects, and other technical objects not described above may be evidently understood by a person having ordinary skill in the art to which the present invention pertains from the following description.

Technical Solution

In an aspect of the present invention, a method for a UE being allocated with radio resources in a wireless communication system includes the steps of receiving first semi-persistent scheduling (SPS) configuration information including semi-persistent resource allocation information of a first cluster from a first eNB, receiving an allocation of a first SPS resource based on the first SPS configuration information by receiving SPS assignment from the first eNB, and receiving an allocation of a second SPS resource based on the first SPS configuration information by receiving SPS assignment from a second eNB when the UE performs handover to a second cluster belonging to a cluster group identical with an identical cluster group of the first cluster. The cluster may include one or more cells, and the cluster group may include one or more clusters in which the same resource pool has been configured.

In another aspect of the present invention, a UE being allocated with radio resources in a wireless communication system includes a radio frequency (RF) unit for transmitting/receiving a radio signal and a processor controlling the RF unit. The processor is configured to receive first semi-persistent scheduling (SPS) configuration information including semi-persistent resource allocation information of a first cluster from a first eNB, receive an allocation of a first SPS resource based on the first SPS configuration information by receiving SPS assignment from the first eNB, and receive an allocation of a second SPS resource based on the first SPS configuration information by receiving SPS assignment from a second eNB when the UE performs handover to a second cluster belonging to a cluster group identical with an identical cluster group of the first cluster. The cluster may include one or more cells, and the cluster group may include one or more clusters in which the same resource pool has been configured.

Preferably, when the UE performs the cluster handover, priority may be assigned to a cluster belonging to the same cluster group as a cluster to which the UE belongs.

Preferably, if a different resource region is configured within a resource pool for each cluster belonging to an identical cluster group, the first SPS resource may be allocated within a resource region configured in the first cluster, and the second SPS resource may be allocated within a resource region configured in the second cluster.

Preferably, the second SPS resource may correspond to resource at the same location as the first SPS resource in a time-frequency domain.

Preferably, when the cluster handover is performed, a cluster having the greatest received intensity of a cluster synchronization signal may be selected.

Preferably, the cluster synchronization signal may be transmitted at same timing determined according to an index of the cluster in all cells belonging to the same cluster.

Preferably, the cluster synchronization signal may be transmitted in different subframes for each cell belonging to the same cluster.

Preferably, the method may further include the steps of receiving second SPS configuration information including semi-persistent resource allocation information of a third cluster from a third eNB if the UE performs handover to the third cluster belonging to a cluster group different from the first cluster, and receiving an allocation of a third SPS resource based on the second SPS configuration information by receiving SPS assignment from the third eNB.

Preferably, the method may further include the step of requesting a release of the second SPS resource from the third eNB when the UE complete handover to the third cluster.

Preferably, when empty transmission of a specific number or more continues from the UE on the second SPS resource, the second SPS resource may be released.

Preferably, the second SPS resource may be released when non-acknowledgement (NACK) is continuously transmitted by a specific number or more from the UE receiving data through the second SPS resource using vehicle-to-vehicle (V2V) communication.

Advantageous Effects

In accordance with an embodiment of the present invention, in particular, resources can be stably allocated to a UE having fast mobility in a wireless communication system supporting V2X.

Furthermore, in accordance with an embodiment of the present invention, in particular, signaling overhead for resource allocation in a wireless communication system supporting V2X can be minimized Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompany drawings, which are included to provide a further understanding of the present invention and are incorporated on and constitute a part of this specification illustrate embodiments of the present invention and together with the description serve to explain the principles of the present invention.

FIG. 30 is a diagram illustrating a method of transmitting a cluster synchronization signal according to an embodiment of the present invention.

MODE FOR INVENTION

Figure 1:
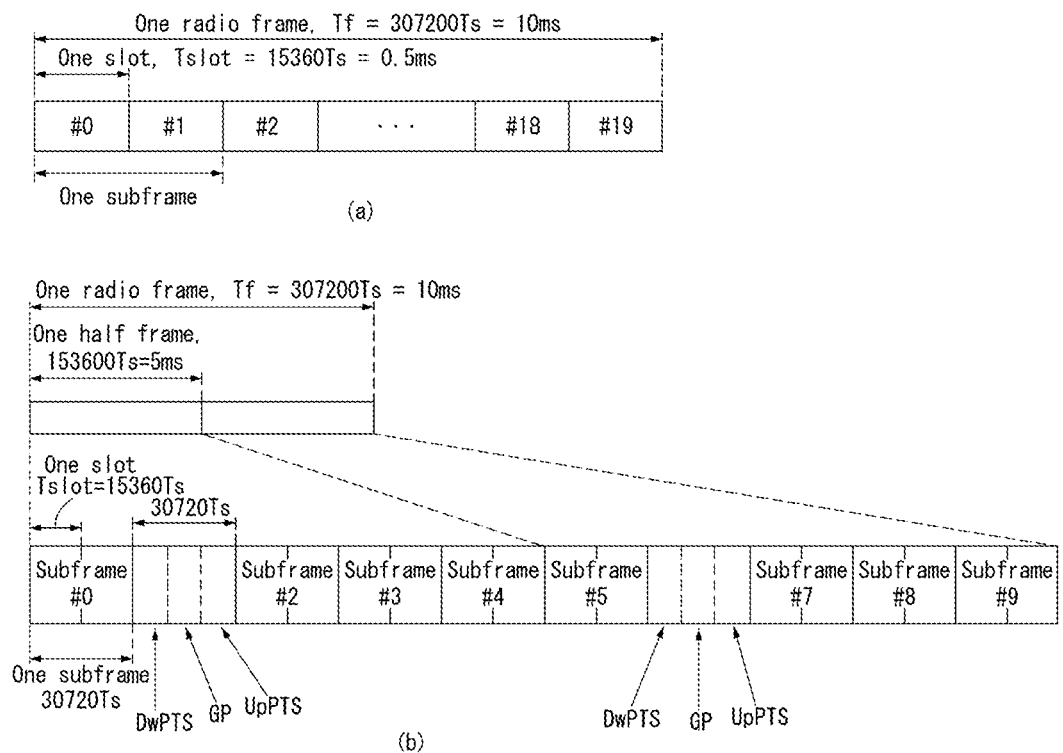
FIG. 1 illustrates the structure of a radio frame in a wireless communication system to which the present invention may be applied.

Hereafter, preferred embodiments of the present invention will be described in detail with reference to the accompanying drawings. A detailed description to be disclosed hereinafter together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA(Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 1(a) exemplifies radio frame structure type 1. The radio frame is constituted by 10 subframes. One subframe is constituted by 2 slots in a time domain A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 1(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | — | — | D |

Referring to Table 1, for each sub frame of the radio frame, 'D' represents a subframe for downlink transmission, 'U' represents a subframe for uplink transmission, and 'S' represents a special subframe constituted by three fields such as the DwPTS, the GP, and the UpPTS. The uplink-downlink configuration may be divided into 7 configurations and the positions and/or the numbers of the downlink subframe, the special subframe, and the uplink subframe may vary for each configuration.

A time when the downlink is switched to the uplink or a time when the uplink is switched to the downlink is referred to as a switching point. Switch-point periodicity means a period in which an aspect of the uplink subframe and the downlink subframe are switched is similarly repeated and both 5 ms or 10 ms are supported. When the period of the downlink-uplink switching point is 5 ms, the special subframe S is present for each half-frame and when the period of the downlink-uplink switching point is 5 ms, the special subframe S is present only in a first half-frame.

In all configurations, subframes #0 and #5 and the DwPTS are intervals only the downlink transmission. The UpPTS and a subframe just subsequently to the subframe are continuously intervals for the uplink transmission.

The uplink-downlink configuration may be known by both the base station and the terminal as system information. The base station transmits only an index of configuration information whenever the uplink-downlink configuration information is changed to announce a change of an uplink-downlink allocation state of the radio frame to the terminal. Further, the configuration information as a kind of downlink control information may be transmitted through a physical downlink control channel (PDCCH) similarly to other scheduling information and may be commonly transmitted to all terminals in a cell through a broadcast channel as broadcasting information.

Table 2 shows the configuration (length of DwPTS/GP/UpPTS) of special subframes.

Figure 2:
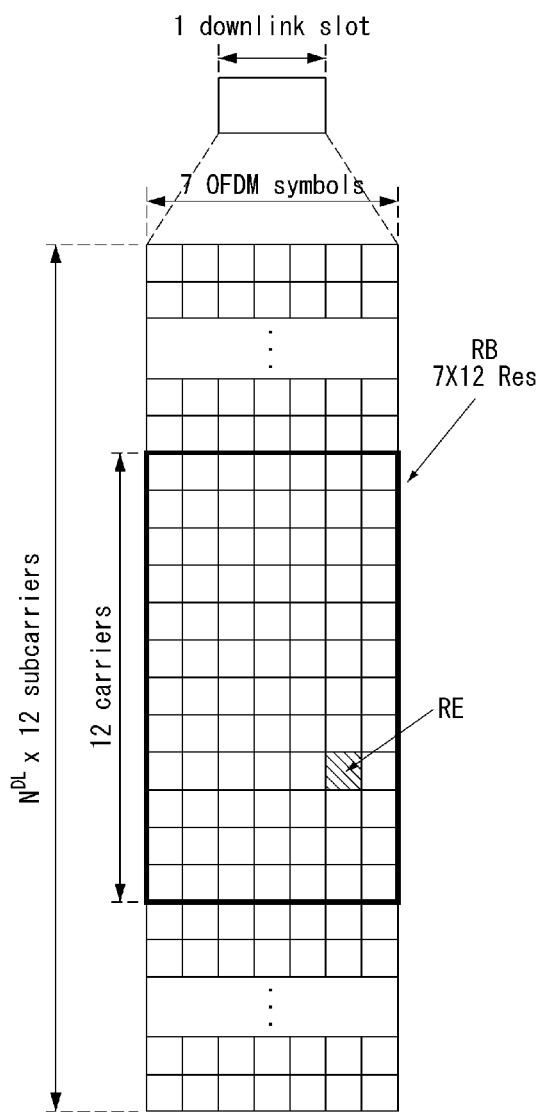
FIG. 2 is a diagram illustrating a resource grid for a downlink slot in a wireless communication system to which the present invention may be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

Figure 3:
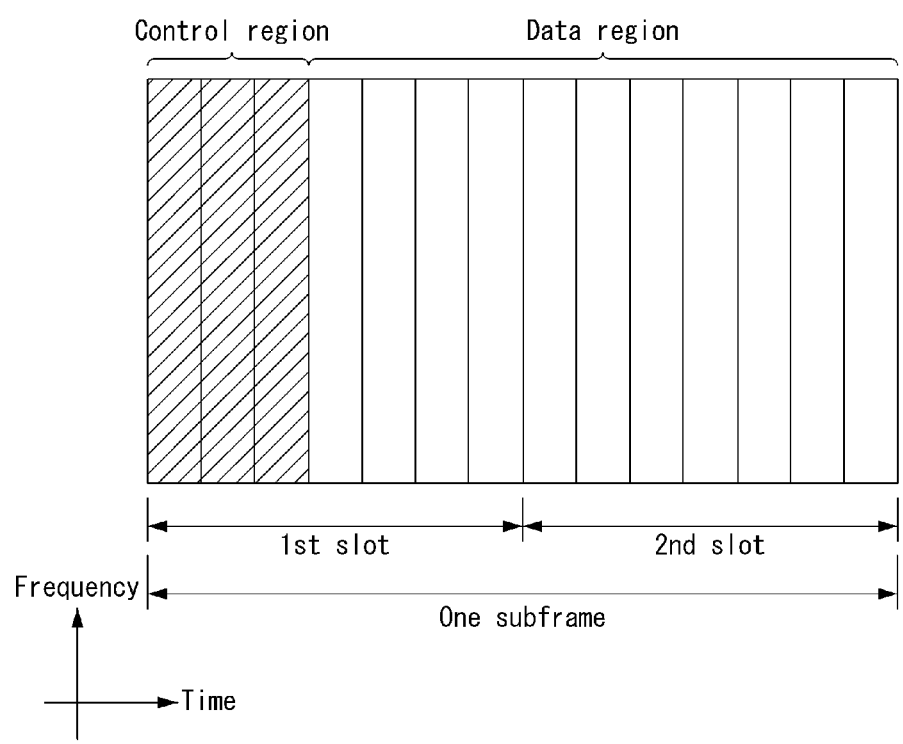
FIG. 3 illustrates a structure of downlink subframe in a wireless communication system to which the present invention may be applied.

FIG. 3 illustrates a structure of a downlink subframe in the wireless communication system to which the present invention can be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource alloca-

TABLE 2

| | | Normal cyclic prefix in downlink | | | | |
|---|---|---|---|---|---|---|
| | | UpPTS | | | Extended cyclic prefix in downlink | |
| | | Normal | | | UpPTS | |
| Special subframe configuration | DwPTS | cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of the radio frame is only an example, and the number of subcarriers included in a radio frame, the number of slots included in a subframe, and the number of OFDM symbols included in a slot may be changed in various ways.

FIG. 2 is a diagram illustrating a resource grid for one downlink slot in the wireless communication system to which the present invention can be applied.

tion information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Figure 4:
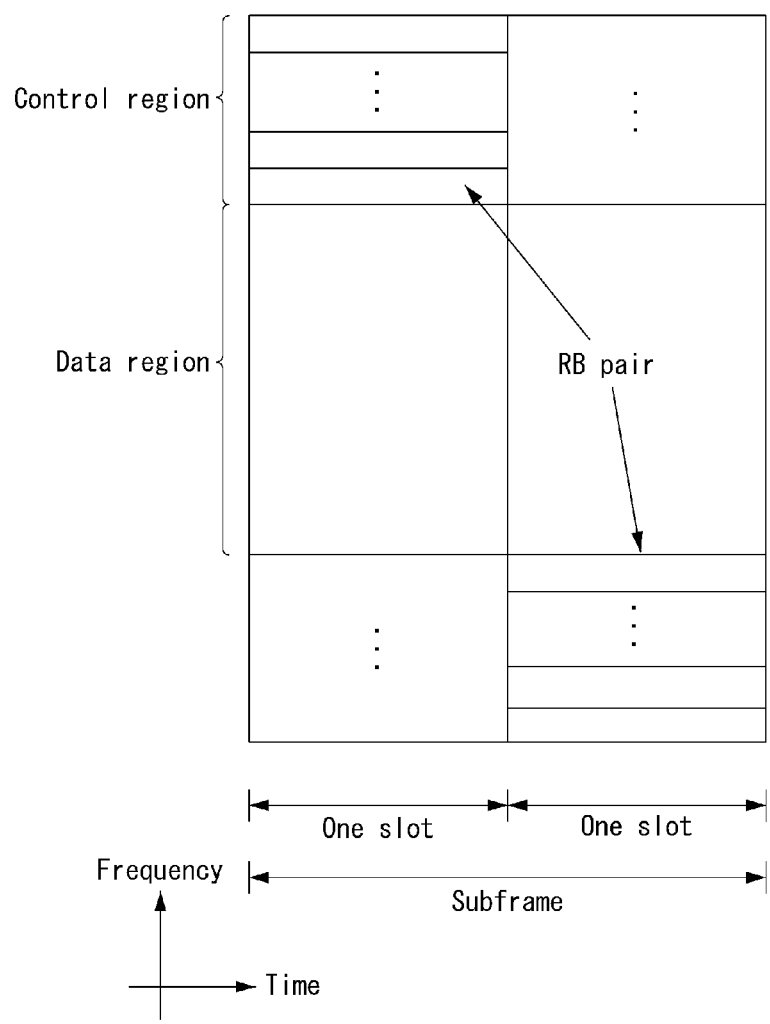
FIG. 4 illustrates a structure of uplink subframe in a wireless communication system to which the present invention may be applied.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) that transports uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe is allocated to the PUCCH for one terminal. RBs included in the RB pair occupy different subcarriers in two slots, respectively. The RB pair allocated to the PUCCH frequency-hops in a slot boundary. This is called the RB pair allocated to the PUCCH is frequency hopped at the slot boundary.

Physical Uplink Control Channel (PUCCH)

Uplink control information (UCI) transmitted through a PUCCH may include the following scheduling request (SR), HARQ ACK/NACK information, and downlink channel measurement information.

Scheduling Request (SR): The SR is information used for requesting an uplink UL-SCH resource. The SR is transmitted using an On-off Keying (OOK) method.

HARQ ACK/NACK: The HARQ ACK/NACK is a response signal to a downlink data packet on a PDSCH. The HARQ ACK/NACK represents whether a downlink data packet is successfully received. ACK/NACK 1 bit is transmitted in response to a single downlink codeword, and ACK/NACK 2 bits are transmitted in response to two downlink codewords.

Channel State Information (CSI): The CSI is feedback information about a downlink channel. CSI may include at least one of a Channel Quality Indicator (CQI), a rank indicator (RI), a Precoding Matrix Indicator (PMI), and a Precoding Type Indicator (PTI). 20 bits are used per subframe.

The HARQ ACK/NACK information may be generated according to a downlink data packet on the PDSCH is successfully decoded. In the existing wireless communication system, 1 bit is transmitted as ACK/NACK information with respect to downlink single codeword transmission and 2 bits are transmitted as the ACK/NACK information with respect to downlink 2-codeword transmission.

The channel measurement information which designates feedback information associated with a multiple input multiple output (MIMO) technique may include a channel quality indicator (CQI), a precoding matrix index (PMI), and a rank indicator (RI). The channel measurement information may also be collectively expressed as the CQI.

20 bits may be used per subframe for transmitting the CQI.

The PUCCH may be modulated by using binary phase shift keying (BPSK) and quadrature phase shift keying (QPSK) techniques. Control information of a plurality of terminals may be transmitted through the PUCCH and when code division multiplexing (CDM) is performed to distinguish signals of the respective terminals, a constant amplitude zero autocorrelation (CAZAC) sequence having a length of 12 is primary used. Since the CAZAC sequence has a characteristic to maintain a predetermined amplitude in the time domain and the frequency domain, the CAZAC sequence has a property suitable for increasing coverage by decreasing a peak-to-average power ratio (PAPR) or cubic metric (CM) of the terminal. Further, the ACK/NACK information for downlink data transmission performed through the PUCCH is covered by using an orthogonal sequence or an orthogonal cover (OC).

Further, the control information transmitted on the PUCCH may be distinguished by using a cyclically shifted sequence having different cyclic shift (CS) values. The cyclically shifted sequence may be generated by cyclically shifting a base sequence by a specific cyclic shift (CS) amount. The specific CS amount is indicated by the cyclic shift (CS) index. The number of usable cyclic shifts may vary depending on delay spread of the channel Various types of sequences may be used as the base sequence the CAZAC sequence is one example of the corresponding sequence.

Further, the amount of control information which the terminal may transmit in one subframe may be determined according to the number (that is, SC-FDMA symbols other an SC-FDMA symbol used for transmitting a reference signal (RS) for coherent detection of the PUCCH) of SC-FDMA symbols which are usable for transmitting the control information.

In the 3GPP LTE system, the PUCCH is defined as a total of 7 different formats according to the transmitted control information, a modulation technique, the amount of control information, and the like and an attribute of the uplink control information (UCI) transmitted according to each PUCCH format may be summarized as shown in Table 3 given below.

TABLE 3

| PUCCH Format | Uplink Control Information(UCI) |
| --- | --- |
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 | HARQ ACK/NACK, SR, CSI (48 coded bits) |

PUCCH format 1 is used for transmitting only the SR. A waveform which is not modulated is adopted in the case of transmitting only the SR and this will be described below in detail.

PUCCH format 1a or 1b is used for transmitting the HARQ ACK/NACK. PUCCH format 1a or 1b may be used when only the HARQ ACK/NACK is transmitted in a predetermined subframe. Alternatively, the HARQ ACK/NACK and the SR may be transmitted in the same subframe by using PUCCH format 1a or 1b.

PUCCH format 2 is used for transmitting the CQI and PUCCH format 2a or 2b is used for transmitting the CQI and the HARQ ACK/NACK. In the case of an extended CP, PUCCH format 2 may be transmitted for transmitting the CQI and the HARQ ACK/NACK.

PUCCH format 3 is used for carrying encoded UCI of 48 bits. The PUCCH format 3 may carry HARQ ACK/NACK of a plurality of serving cells, SR (when existing), and CSI report of one serving cell.

Figure 5:
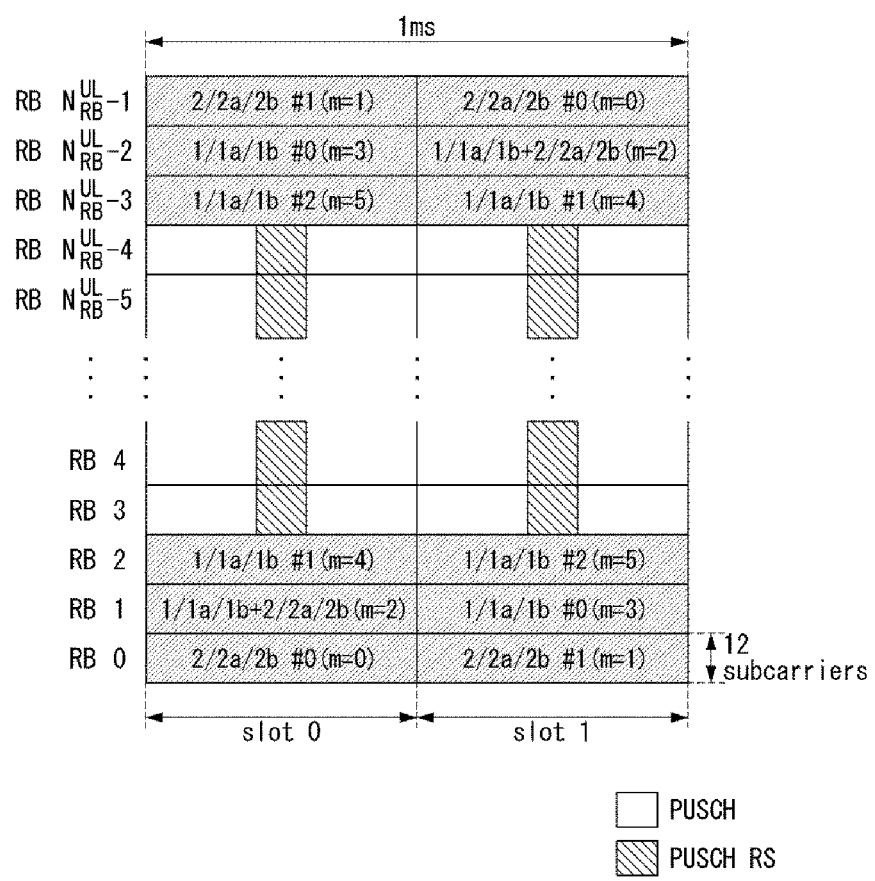
FIG. 5 illustrates an example of the shape in which PUCCH formats are mapped to the PUCCH region of uplink physical resource block in a wireless communication system to which the present invention may be applied.

FIG. 5 illustrates one example of a type in which PUCCH formats are mapped to a PUCCH region of an uplink physical resource block in the wireless communication system to which the present invention can be applied.

In FIG. 5, $N_{RB}^{UL}$ represents the number of resource blocks in the uplink and 0, 1, . . . , $N_{RB}^{UL}-1$ mean numbers of physical resource blocks. Basically, the PUCCH is mapped to both edges of an uplink frequency block. As illustrated in FIG. 5, PUCCH format 2/2a/2b is mapped to a PUCCH region expressed as m=0, 1 and this may be expressed in such a manner that PUCCH format 2/2a/2b is mapped to resource blocks positioned at a band edge. Further, both PUCCH format 2/2a/2b and PUCCH format 1/1a/1b may be mixed and mapped to a PUCCH region expressed as m=2. Next, PUCCH format 1/1a/1b may be mapped to a PUCCH region expressed as m=3, 4, and 5. The number ($N_{RB}^{(2)}$) of PUCCH RBs which are usable by PUCCH format 2/2a/2b may be indicated to terminals in the cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency wise (alternatively, a frequency resolution) to be measured may be controlled by the base station. In the time domain, periodic and aperiodic CQI reporting may be supported. PUCCH format 2 may be used for only the periodic reporting and the PUSCH may be used for aperiodic reporting. In the case of the aperiodic reporting, the base station may instruct the terminal to transmit a scheduling resource loaded with individual CQI reporting for the uplink data transmission.

Figure 6:
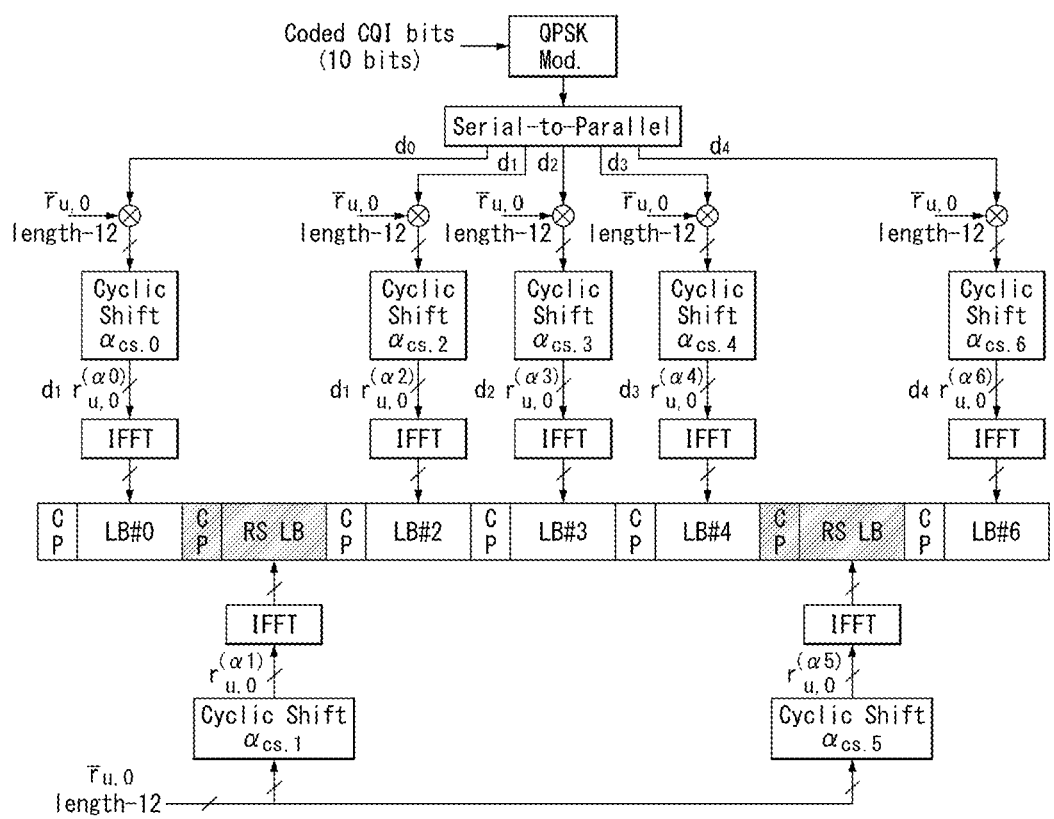
FIG. 6 illustrates a structure of CQI channel in the case of normal CP in a wireless communication system to which the present invention may be applied.

FIG. 6 illustrates a structure of a CQI channel in the case of a general CP in the wireless communication system to which the present invention can be applied.

In SC-FDMA symbols 0 to 6 of one slot, SC-FDMA symbols 1 and 5 (second and sixth symbols) may be used for transmitting a demodulation reference signal and the CQI information may be transmitted in the residual SC-FDMA symbols. Meanwhile, in the case of the extended CP, one SC-FDMA symbol (SC-FDMA symbol 3) is used for transmitting the DMRS.

In PUCCH format 2/2a/2b, modulation by the CAZAC sequence is supported and the CAZAC sequence having the length of 12 is multiplied by a QPSK-modulated symbol. The cyclic shift (CS) of the sequence is changed between the symbol and the slot. The orthogonal covering is used with respect to the DMRS.

The reference signal (DMRS) is loaded on two SC-FDMA symbols separated from each other by 3 SC-FDMA symbols among 7 SC-FDMA symbols included in one slot and the CQI information is loaded on 5 residual SC-FDMA symbols. Two RSs are used in one slot in order to support a high-speed terminal. Further, the respective terminals are distinguished by using the CS sequence. CQI information symbols are modulated and transferred to all SC-FDMA symbols and the SC-FDMA symbol is constituted by one sequence. That is, the terminal modulates and transmits the CQI to each sequence.

The number of symbols which may be transmitted to one TTI is 10 and modulation of the CQI information is determined up to QPSK. When QPSK mapping is used for the SC-FDMA symbol, since a CQI value of 2 bits may be loaded, a CQI value of 10 bits may be loaded on one slot. Therefore, a CQI value of a maximum of 20 bits may be loaded on one subframe. A frequency domain spread code is used for spreading the CQI information in the frequency domain.

The CAZAC sequence (for example, ZC sequence) having the length of 12 may be used as the frequency domain spread code. CAZAC sequences having different CS values may be applied to the respective control channels to be distinguished from each other. IFFT is performed with respect to the CQI information in which the frequency domain is spread.

12 different terminals may be orthogonally multiplexed on the same PUCCH RB by a cyclic shift having 12 equivalent intervals. In the case of a general CP, a DMRS sequence on SC-FDMA symbol 1 and 5 (on SC-FDMA symbol 3 in the case of the extended CP) is similar to a CQI signal sequence on the frequency domain, but the modulation of the CQI information is not adopted.

The terminal may be semi-statically configured by upper-layer signaling so as to periodically report different CQI, PMI, and RI types on PUCCH resources indicated as PUCCH resource indexes ($n_{PUCCH}^{(1,\tilde{p})}$, $n_{PUCCH}^{(2,\tilde{p})}$ and $n_{PUCCH}^{(3,\tilde{p})}$). Herein, the PUCCH resource index ($n_{PUCCH}^{(2,\tilde{p})}$) is information indicating the PUCCH region used for PUCCH format 2/2a/2b and a CS value to be used.

Hereinafter, PUCCH formats 1a and 1b will be described.

In the PUCCH format 1a/1b, a symbol modulated using a BPSK or QPSK modulation method is multiplied with a CAZAC sequence of a length 12. For example, a result in which a CAZAC sequence r(n) (n=0, 1, 2, . . . , N−1) of a length N is multiplied to a modulation symbol d(0) becomes y(0), y(1), y(2), . . . , y(N−1). y(0), y(1), y(2), . . . , y(N−1) symbols may be referred to as a block of symbol. After a CAZAC sequence is multiplied to a modulation symbol, block-wise diffusion using an orthogonal sequence is applied.

A Hadamard sequence of a length 4 is used for general ACK/NACK information, and a Discrete Fourier Transform (DFT) sequence of a length 3 is used for shortened ACK/NACK information and a reference signal.

A Hadamard sequence of a length 2 is used for a reference signal of an extended CP.

Figure 7:
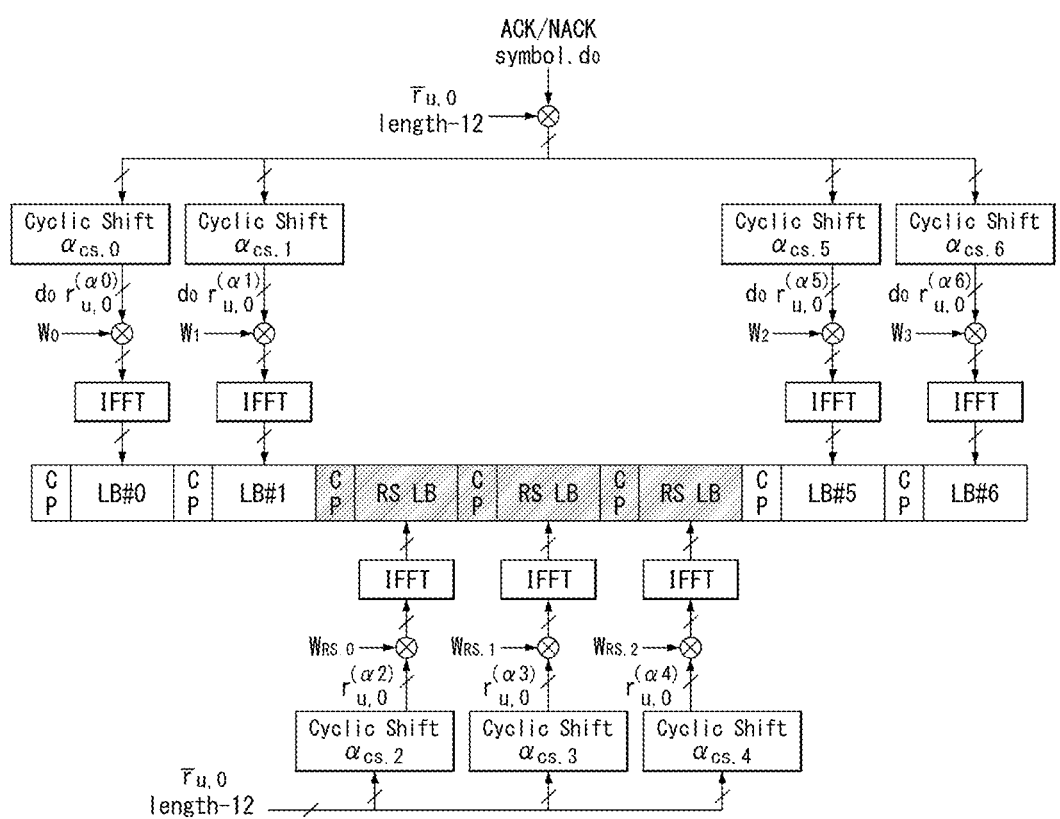
FIG. 7 illustrates a structure of ACK/NACK channel in the case of normal CP in a wireless communication system to which the present invention may be applied.

FIG. 7 illustrates a structure of an ACK/NACK channel in the case of a general CP in the wireless communication system to which the present invention can be applied.

In FIG. 7, a PUCCH channel structure for transmitting the HARQ ACK/NACK without the CQI is exemplarily illustrated.

The reference signal (DMRS) is loaded on three consecutive SC-FDMA symbols in a middle part among 7 SC-FDMA symbols and the ACK/NACK signal is loaded on 4 residual SC-FDMA symbols.

Meanwhile, in the case of the extended CP, the RS may be loaded on two consecutive symbols in the middle part. The number of and the positions of symbols used in the RS may vary depending on the control channel and the numbers and the positions of symbols used in the ACK/NACK signal associated with the positions of symbols used in the RS may also correspondingly vary depending on the control channel.

Acknowledgment response information (not scrambled status) of 1 bit and 2 bits may be expressed as one HARQ ACK/NACK modulated symbol by using the BPSK and QPSK modulation techniques, respectively. A positive acknowledgement response (ACK) may be encoded as '1' and a negative acknowledgment response (NACK) may be encoded as '0'.

When a control signal is transmitted in an allocated band, 2-dimensional (D) spread is adopted in order to increase a multiplexing capacity. That is, frequency domain spread and time domain spread are simultaneously adopted in order to increase the number of terminals or control channels which may be multiplexed.

A frequency domain sequence is used as the base sequence in order to spread the ACK/NACK signal in the frequency domain. A Zadoff-Chu (ZC) sequence which is one of the CAZAC sequences may be used as the frequency domain sequence. For example, different CSs are applied to the ZC sequence which is the base sequence, and as a result, multiplexing different terminals or different control channels may be applied. The number of CS resources supported in an SC-FDMA symbol for PUCCH RBs for HARQ ACK/NACK transmission is set by a cell-specific upper-layer signaling parameter ($\Delta_{shift}^{PUCCH}$).

The ACK/NACK signal which is frequency-domain spread is spread in the time domain by using an orthogonal spreading code. As the orthogonal spreading code, a Walsh-Hadamard sequence or DFT sequence may be used. For example, the ACK/NACK signal may be spread by using an orthogonal sequence (w0, w1, w2, and w3) having the length of 4 with respect to 4 symbols. Further, the RS is also spread through an orthogonal sequence having the length of 3 or 2. This is referred to as orthogonal covering (OC).

Multiple terminals may be multiplexed by a code division multiplexing (CDM) scheme by using the CS resources in the frequency domain and the OC resources in the time domain described above. That is, ACK/NACK information and RSs of a lot of terminals may be multiplexed on the same PUCCH RB.

In respect to the time-domain spread CDM, the number of spreading codes supported with respect to the ACK/NACK information is limited by the number of RS symbols. That is, since the number of RS transmitting SC-FDMA symbols is smaller than that of ACK/NACK information transmitting SC-FDMA symbols, the multiplexing capacity of the RS is smaller than that of the ACK/NACK information.

For example, in the case of the general CP, the ACK/NACK information may be transmitted in four symbols and not 4 but 3 orthogonal spreading codes are used for the ACK/NACK information and the reason is that the number of RS transmitting symbols is limited to 3 to use only 3 orthogonal spreading codes for the RS.

In the case of the subframe of the general CP, when 3 symbols are used for transmitting the RS and 4 symbols are used for transmitting the ACK/NACK information in one slot, for example, if 6 CSs in the frequency domain and 3 orthogonal cover (OC) resources may be used, HARQ acknowledgement responses from a total of 18 different terminals may be multiplexed in one PUCCH RB. In the case of the subframe of the extended CP, when 2 symbols are used for transmitting the RS and 4 symbols are used for transmitting the ACK/NACK information in one slot, for example, if 6 CSs in the frequency domain and 2 orthogonal cover (OC) resources may be used, the HARQ acknowledgement responses from a total of 12 different terminals may be multiplexed in one PUCCH RB.

Next, PUCCH format 1 is described. The scheduling request (SR) is transmitted by a scheme in which the terminal requests scheduling or does not request the scheduling. An SR channel reuses an ACK/NACK channel structure in PUCCH format 1a/1b and is configured by an on-off keying (OOK) scheme based on an ACK/NACK channel design. In the SR channel, the reference signal is not transmitted. Therefore, in the case of the general CP, a sequence having a length of 7 is used and in the case of the extended CP, a sequence having a length of 6 is used. Different cyclic shifts (CSs) or orthogonal covers (OCs) may be allocated to the SR and the ACK/NACK. That is, the terminal transmits the HARQ ACK/NACK through a resource allocated for the SR in order to transmit a positive SR. The terminal transmits the HARQ ACK/NACK through a resource allocated for the ACK/NACK in order to transmit a negative SR.

Next, an enhanced-PUCCH (e-PUCCH) format is described. An e-PUCCH may correspond to PUCCH format 3 of an LTE-A system. A block spreading technique may be applied to ACK/NACK transmission using PUCCH format 3.

The block spread scheme is described in detail later with reference to FIG. 14.

PUCCH Piggybacking

Figure 8:
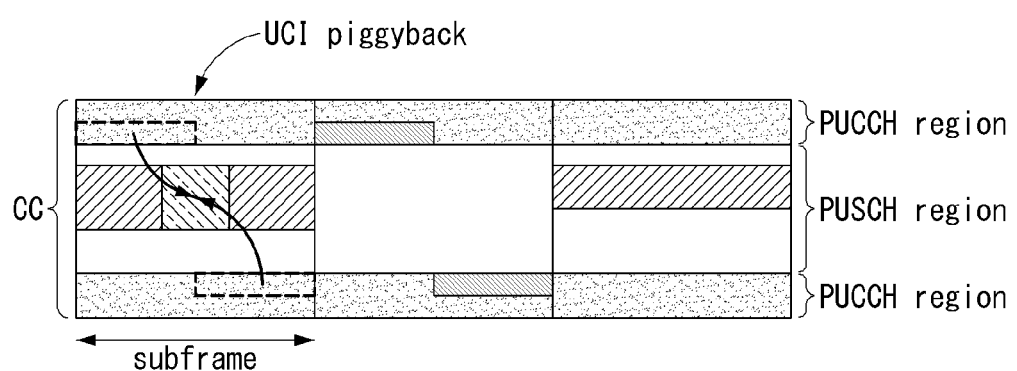
FIG. 8 illustrates an example of transmission channel processing of UL-SCH in a wireless communication system to which the present invention may be applied.

FIG. 8 illustrates one example of transport channel processing of a UL-SCH in the wireless communication system to which the present invention can be applied.

Figure 11:
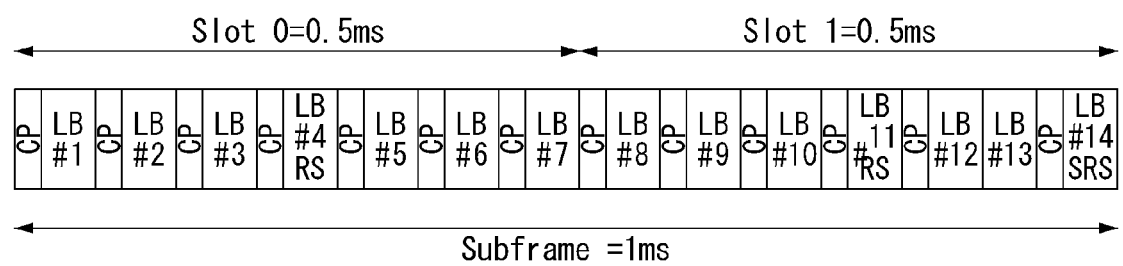
FIG. 11 illustrates an uplink subframe including a sounding reference signal symbol in a wireless communication system to which the present invention may be applied.

In a 3GPP LTE system (=E-UTRA, Rel. 8), in the case of the UL, single carrier transmission having an excellent peak-to-average power ratio (PAPR) or cubic metric (CM) characteristic which influences the performance of a power amplifier is maintained for efficient utilization of the power amplifier of the terminal. That is, in the case of transmitting the PUSCH of the existing LTE system, data to be transmitted may maintain the single carrier characteristic through DFT-precoding and in the case of transmitting the PUCCH, information is transmitted while being loaded on a sequence having the single carrier characteristic to maintain the single carrier characteristic. However, when the data to be DFT-precoded is non-contiguously allocated to a frequency axis or the PUSCH and the PUCCH are simultaneously transmitted, the single carrier characteristic deteriorates. Therefore, when the PUSCH is transmitted in the same subframe as the transmission of the PUCCH as illustrated in FIG. 11, uplink control information (UCI) to be transmitted to the PUCCH is transmitted (piggyback) together with data through the PUSCH.

Since the PUCCH and the PUSCH may not be simultaneously transmitted as described above, the existing LTE terminal uses a method that multiplexes uplink control information (UCI) (CQI/PMI, HARQ-ACK, RI, and the like) to the PUSCH region in a subframe in which the PUSCH is transmitted.

As one example, when the channel quality indicator (CQI) and/or precoding matrix indicator (PMI) needs to be transmitted in a subframe allocated to transmit the PUSCH, UL-SCH data and the CQI/PMI are multiplexed after DFT-spreading to transmit both control information and data. In this case, the UL-SCH data is rate-matched by considering a CQI/PMI resource. Further, a scheme is used, in which the control information such as the HARQ ACK, the RI, and the like punctures the UL-SCH data to be multiplexed to the PUSCH region.

Figure 9:
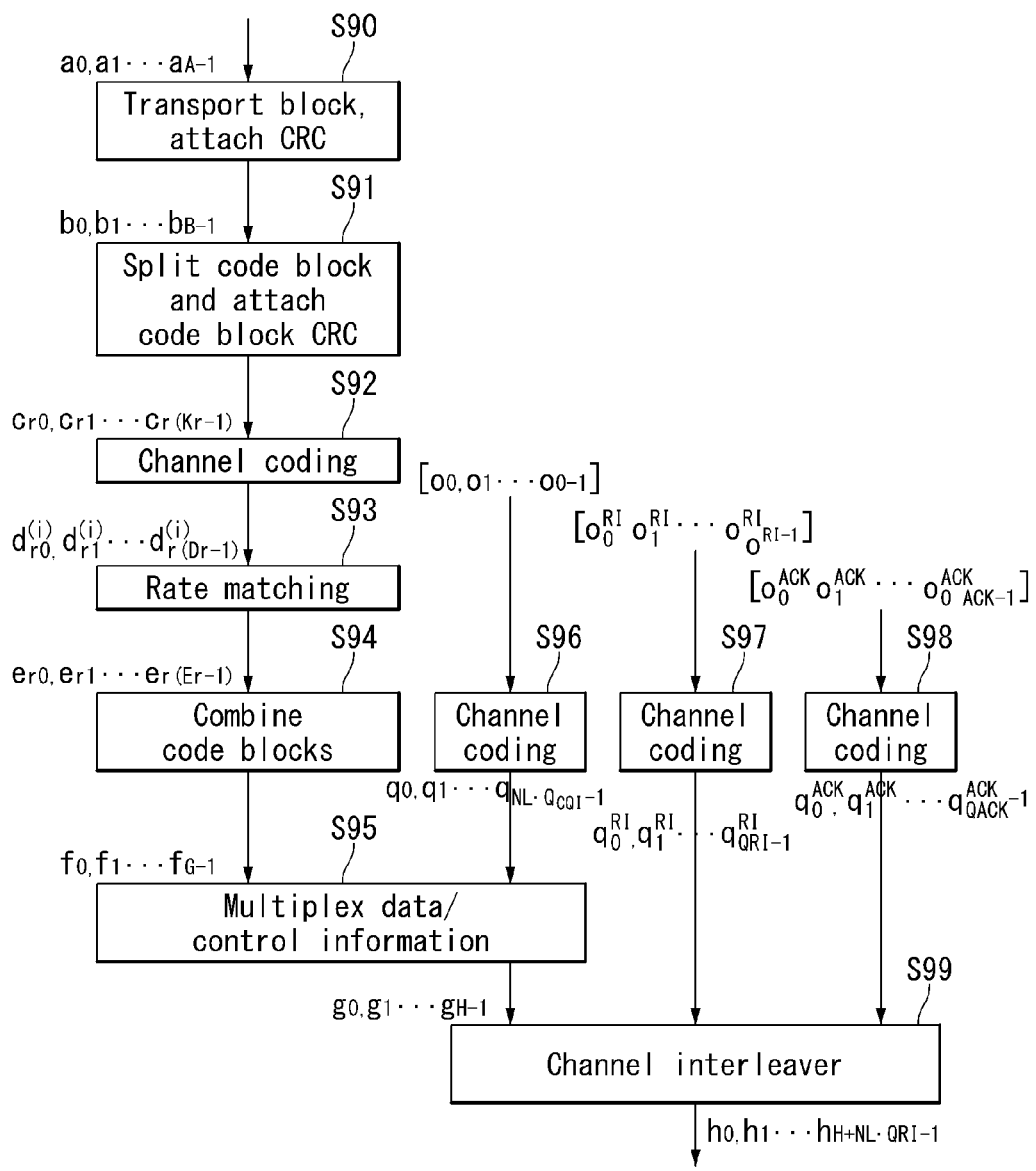
FIG. 9 illustrates an example of signal processing process of uplink shared channel which is a transport channel in a wireless communication system to which the present invention may be applied.
Figure 10:
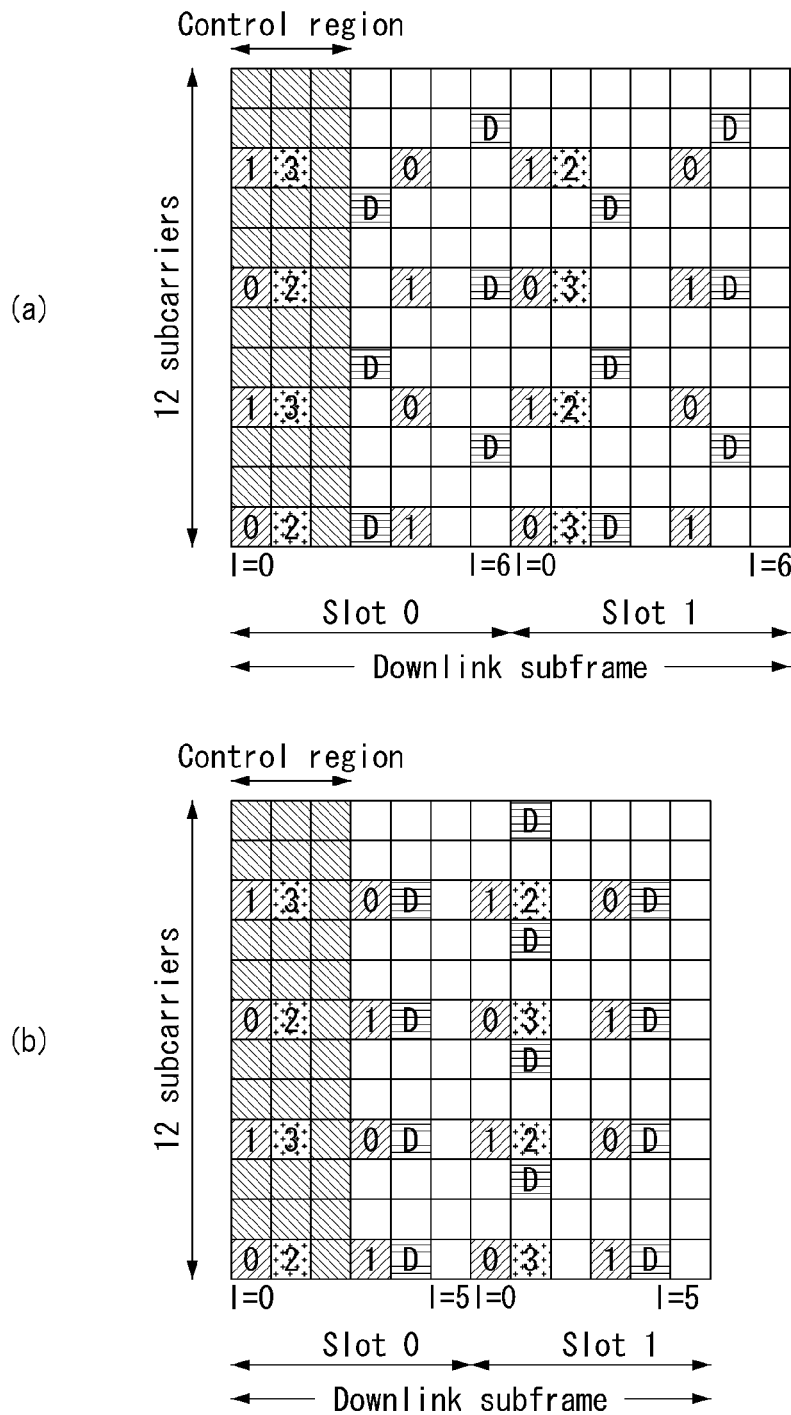
FIG. 10 illustrates a reference signal pattern mapped to a downlink resource block pair in a wireless communication system to which the present invention may be applied.

FIG. 9 illustrates one example of a signal processing process of an uplink share channel of a transport channel in the wireless communication system to which the present invention can be applied.

Herein, the signal processing process of the uplink share channel (hereinafter, referred to as "UL-SCH") may be applied to one or more transport channels or control information types.

Referring to FIG. 9, the UL-SCH transfers data to a coding unit in the form of a transport block (TB) once every a transmission time interval (TTI).

A CRC parity bit $p_0, p_1, p_2, p_3, \ldots, p_{L-1}$ is attached to a bit of the transport block received from the upper layer (S90). In this case, A represents the size of the transport block and L represents the number of parity bits. Input bits to which the CRC is attached are shown in $b_0, b_1, b_2, b_3, \ldots, b_{B-1}$. In this case, B represents the number of bits of the transport block including the CRC.

$b_0, b_1, b_2, b_3, \ldots, b_{B-1}$ is segmented into multiple code blocks (CBs) according to the size of the TB and the CRC is attached to multiple segmented CBs (S91). Bits after the code block segmentation and the CRC attachment are shown in $c_{r0}, c_{r1}, c_{r2}, c_{r3}, \ldots, c_{r(K_r-1)}$. Herein, r represents No. (r=0, ..., C−1) of the code block and Kr represents the bit number depending on the code block r. Further, C represents the total number of code blocks.

Subsequently, channel coding is performed (S92). Output bits after the channel coding are shown in $d_{r0}^{(i)}, d_{r1}^{(i)}, d_{r2}^{(i)}, d_{r2}^{(i)}, \ldots, d_{r(D_r-1)}^{(i)}$. In this case, i represents an encoded stream index and may have a value of 0, 1, or 2. Dr represents the number of bits of the i-th encoded stream for the code block r. r represents the code block number (r=0, ..., C−1) and C represents the total number of code blocks. Each code block may be encoded by turbo coding.

Subsequently, rate matching is performed (S93). Bits after the rate matching are shown in $e_{r0}, e_{r1}, e_{r2}, e_{r3}, \ldots, e_{r(E_r-1)}$. In this case, r represents the code block number (r=0, ..., C−1) and C represents the total number of code blocks. Er represents the number of rate-matched bits of the r-th code block.

Subsequently, concatenation among the code blocks is performed again (S94). Bits after the concatenation of the code blocks is performed are shown in $f_0, f_1, f_2, f_3, \ldots, f_{G-1}$. In this case, G represents the total number of bits encoded for transmission and when the control information is multiplexed with the UL-SCH, the number of bits used for transmitting the control information is not included.

Meanwhile, when the control information is transmitted in the PUSCH, channel coding of the CQI/PMI, the RI, and the ACK/NACK which are the control information is independently performed (S96, S97, and S98). Since different encoded symbols are allocated for transmitting each piece of control information, the respective control information has different coding rates.

In time division duplex (TDD), as an ACK/NACK feedback mode, two modes of ACK/NACK bundling and ACK/NACK multiplexing are supported by an upper-layer configuration. ACK/NACK information bits for the ACK/NACK bundling are constituted by 1 bit or 2 bits and ACK/NACK information bits for the ACK/NACK multiplexing are constituted by 1 to 4 bits.

After the concatenation among the code blocks in step S94, encoded bits $f_0, f_1, f_2, f_3, \ldots, f_{G-1}$ of the UL-SCH data and encoded bits $q_0, q_1, q_2, q_3, \ldots, q_{N_L \cdot Q_{CQI}-1}$ of the CQI/PMI are multiplexed (S95). A multiplexed result of the data and the CQI/PMI is shown in $g_0, g_1, g_2, g_3, \ldots, g_{H'-1}$. In this case, $g_i$ (i=0, ..., H'−1) represents a column vector having a length of $(Q_m \cdot N_L)$. $H=(G+N_L \cdot Q_{CQI})$ and $H'=H/(N_L \cdot Q_m)$. $N_L$ and the number of layers mapped to a UL-SCH transport block and H represents the total number of encoded bits allocated to $N_L$ transport layers mapped with the transport block for the UL-SCH data and the CQI/PMI information.

Subsequently, the multiplexed data and CQI/PMI, a channel encoded RI, and the ACK/NACK are channel-interleaved to generate an output signal (S99).

Reference Signal(RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase transmission/reception efficiency rather than a single transmitting antenna and a single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system can be mainly categorized into two types. In particular, there are a reference signal for the purpose of channel information acquisition and a reference signal used for data demodulation. Since the object of the former reference signal is to enable user equipment (UE) to acquire a channel information in downlink (DL), the former reference signal should be transmitted on broadband. And, even if the UE does not receive DL data in a specific subframe, it should perform a channel measurement by receiving the corresponding reference signal. Moreover, the corresponding reference signal can be used for a measurement for mobility management of a handover or the like. The latter reference signal is the reference signal transmitted together when an eNB transmits DL data. If UE receives the corresponding reference signal, the UE can perform channel estimation, thereby demodulating data. And, the corresponding reference signal should be transmitted in a data transmitted region.

5 types of downlink reference signals are defined.

A cell-specific reference signal (CRS)

A multicast-broadcast single-frequency network reference signal (MBSFN RS)

A UE-specific reference signal or a demodulation reference signal (DM-RS)

A positioning reference signal (PRS)

A channel state information reference signal (CSI-RS)

One RS is transmitted in each downlink antenna port.

The CRS is transmitted in all of downlink subframe in a cell supporting PDSCH transmission. The CRS is transmitted in one or more of antenna ports 0-3. The CRS is transmitted only in Δf=15 kHz.

The MBSFN RS is transmitted in the MBSFN region of an MBSFN subframe only when a physical multicast channel (PMCH) is transmitted. The MBSFN RS is transmitted in an antenna port 4. The MBSFN RS is defined only in an extended CP.

The DM-RS is supported for the transmission of a PDSCH and is transmitted in antenna ports p=5, p=7, p=8 or p=7, 8, . . . υ+6. In this case, υ is the number of layers which is used for PDSCH transmission. The DM-RS is present and valid for the demodulation of a PDSCH only when PDSCH transmission is associated in a corresponding antenna port. The DM-RS is transmitted only in a resource block (RB) to which a corresponding PDSCH is mapped.

If any one of physical channels or physical signals other than the DM-RS is transmitted using the resource element (RE) of the same index pair (k,l) as that of a RE in which a DM-RS is transmitted regardless of an antenna port "p", the DM-RS is not transmitted in the RE of the corresponding index pair (k,l).

The PRS is transmitted only in a resource block within a downlink subframe configured for PRS transmission.

If both a common subframe and an MBSFN subframe are configured as positioning subframes within one cell, OFDM symbols within the MBSFN subframe configured for PRS transmission use the same CP as that of a subframe #0. If only an MBSFN subframe is configured as a positioning subframe within one cell, OFDM symbols configured for a PRS within the MBSFN region of the corresponding subframe use an extended CP.

The start point of an OFDM symbol configured for PRS transmission within a subframe configured for the PRS transmission is the same as the start point of a subframe in which all of OFDM symbols have the same CP length as an OFDM symbol configured for the PRS transmission.

The PRS is transmitted in an antenna port 6.

The PRS is not mapped to RE (k,l) allocated to a physical broadcast channel (PBCH), a PSS or and SSS regardless of an antenna port "p."

The PRS is defined only in Δf=15 kHz.

The CSI-RS is transmitted in 1, 2, 4 or 8 antenna ports using p=15, p=15, 16, p=15, . . . , 18 and p=15, . . . , 22, respectively.

The CSI-RS is defined only in Δf=15 kHz.

A reference signal is described in more detail.

The CRS is a reference signal for obtaining information about the state of a channel shared by all of UEs within a cell and measurement for handover, etc. The DM-RS is used to demodulate data for only specific UE. Information for demodulation and channel measurement may be provided using such reference signals. That is, the DM-RS is used for only data demodulation, and the CRS is used for the two purposes of channel information acquisition and data demodulation.

The receiver side (i.e., terminal) measures the channel state from the CRS and feeds back the indicators associated with the channel quality, such as the channel quality indicator (CQI), the precoding matrix index (PMI), and/or the rank indicator (RI) to the transmitting side (i.e., an eNB). The CRS is also referred to as a cell-specific RS. On the contrary, a reference signal associated with a feed-back of channel state information (CSI) may be defined as CSI-RS.

The DM-RS may be transmitted through resource elements when data demodulation on the PDSCH is required. The terminal may receive whether the DM-RS is present through the upper layer and is valid only when the corresponding PDSCH is mapped. The DM-RS may be referred to as the UE-specific RS or the demodulation RS (DMRS).

Figure 14:
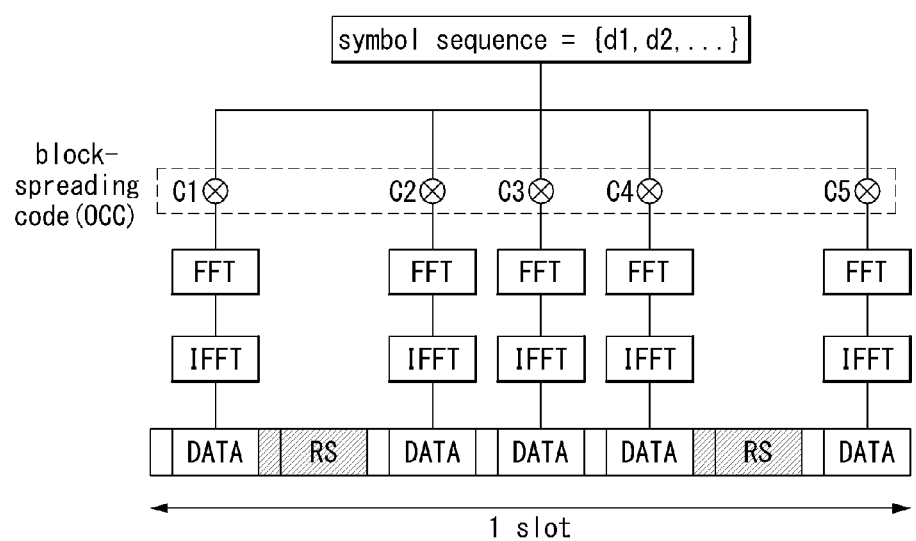
FIG. 14 illustrates an example of generating and transmitting five SC-FDMA symbols during a slot in a wireless communication system to which the present invention may be applied.

FIG. 14 illustrates a reference signal pattern mapped to a downlink resource block pair in the wireless communication system to which an embodiment of the present invention may be applied.

Referring to FIG. 14, as a unit in which the reference signal is mapped, the downlink resource block pair may be expressed by one subframe in the time domain×12 subcarriers in the frequency domain. That is, one resource block pair has a length of 14 OFDM symbols in the case of a normal cyclic prefix (CP) (FIG. 14(a)) and a length of 12 OFDM symbols in the case of an extended cyclic prefix (CP) (FIG. 14(b)). Resource elements (REs) represented as '0', '1', '2', and '3' in a resource block lattice mean the positions of the CRSs of antenna port indexes '0', '1', '2', and '3', respectively and resource elements represented as 'D' means the position of the DM-RS.

Hereinafter, when the CRS is described in more detail, the CRS is used to estimate a channel of a physical antenna and distributed in a whole frequency band as the reference signal which may be commonly received by all terminals positioned in the cell. That is, the CRS is transmitted in each subframe across a broadband as a cell-specific signal. Further, the CRS may be used for the channel quality information (CSI) and data demodulation.

The CRS is defined as various formats according to an antenna array at the transmitter side (base station). The 3GPP LTE system (for example, release-8) supports various antenna arrays and a downlink signal transmitting side has three types of antenna arrays of three single transmitting antennas, two transmitting antennas, and four transmitting antennas. When the base station uses the single transmitting antenna, a reference signal for a single antenna port is arrayed. When the base station uses two transmitting antennas, reference signals for two transmitting antenna ports are arrayed by using a time division multiplexing (TDM) scheme and/or a frequency division multiplexing (FUM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule of mapping the CRS to the resource block is defined as below.

$$k = 6m + (v + v_{shift}) \bmod 6 \quad \text{[Equation 1]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 1, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink. ns represents a slot index and, $N_{ID}^{cell}$ represents a cell ID. mod represents an modulo operation. The position of the reference signal varies depending on the $v_{shift}$ value in the frequency domain. Since $v_{shift}$ is subordinated to the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 2 shows the case of the normal CP and Equation 3 shows the case of the extended CP.

$$k = (k') \bmod N_{sc}^{RB} + N_{sc}^{RB} \cdot n_{PRB} \quad \text{[Equation 2]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 3]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 2 and 3 given above, k and p represent the subcarrier index and the antenna port, respectively. $N_{RB}^{DL}$, ns, and $N_{ID}^{cell}$ represent the number of RBs, the number of slot indexes, and the number of cell IDs allocated to the downlink, respectively. The position of the RS varies depending on the $v_{shift}$ value in terms of the frequency domain.

In Equations 1 to 3, k and l represent the subcarrier index and the symbol index, respectively and p represents the antenna port. $N_{sc}^{RB}$ represents the size of the resource block in the frequency domain and is expressed as the number of subcarriers. $n_{PRB}$ represents the number of physical resource blocks. $N_{RB}^{PDSCH}$ represents a frequency band of the resource block for the PDSCH transmission. ns represents the slot index and $N_{ID}^{cell}$ represents the cell ID. mod represents the modulo operation. The position of the reference signal varies depending on the $v_{shift}$ value in the frequency domain. Since $v_{shift}$ is subordinated to the cell ID, the position of the reference signal has various frequency shift values according to the cell.

Sounding Reference Signal (SRS)

The SRS is primarily used for the channel quality measurement in order to perform frequency-selective scheduling and is not associated with transmission of the uplink data and/or control information. However, the SRS is not limited thereto and the SRS may be used for various other purposes for supporting improvement of power control and various start-up functions of terminals which have not been scheduled. One example of the start-up function may include an initial modulation and coding scheme (MCS), initial power control for data transmission, timing advance, and frequency semi-selective scheduling. In this case, the frequency semi-selective scheduling means scheduling that selectively allocates the frequency resource to the first slot of the subframe and allocates the frequency resource by pseudo-randomly hopping to another frequency in the second slot.

Further, the SRS may be used for measuring the downlink channel quality on the assumption that the radio channels between the uplink and the downlink are reciprocal. The assumption is valid particularly in the time division duplex in which the uplink and the downlink share the same frequency spectrum and are divided in the time domain.

Subframes of the SRS transmitted by any terminal in the cell may be expressed by a cell-specific broadcasting signal. A 4-bit cell-specific 'srsSubframeConfiguration' parameter represents 15 available subframe arrays in which the SRS may be transmitted through each radio frame. By the arrays, flexibility for adjustment of the SRS overhead is provided according to a deployment scenario.

A 16-th array among them completely turns off a switch of the SRS in the cell and is suitable primarily for a serving cell that serves high-speed terminals.

FIG. 11 illustrates an uplink subframe including a sounding reference signal symbol in the wireless communication system to which the present invention can be applied.

Referring to FIG. 11, the SRS is continuously transmitted through a last SC FDMA symbol on the arrayed subframes. Therefore, the SRS and the DMRS are positioned at different SC-FDMA symbols.

The PUSCH data transmission is not permitted in a specific SC-FDMA symbol for the SRS transmission and consequently, when sounding overhead is highest, that is, even when the SRS symbol is included in all subframes, the sounding overhead does not exceed approximately 7%.

Each SRS symbol is generated by a base sequence (random sequence or a sequence set based on Zadoff-Ch (ZC)) associated with a given time wise and a given frequency band and all terminals in the same cell use the same base sequence. In this case, SRS transmissions from a plurality of terminals in the same cell in the same frequency band and at the same time are orthogonal to each other by different cyclic shifts of the base sequence to be distinguished from each other.

SRS sequences from different cells may be distinguished from each other by allocating different base sequences to respective cells, but orthogonality between different base sequences is not secured.

General Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used interchangeably with the term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRCConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

Figure 12:
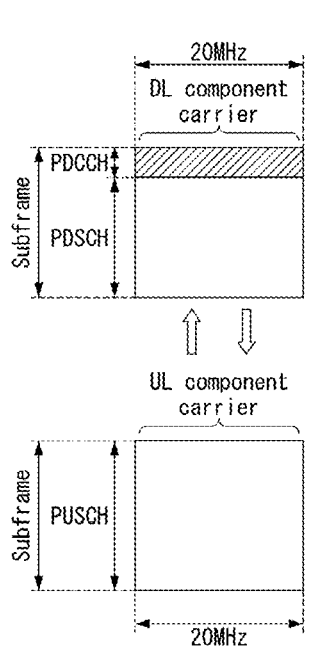
FIG. 12 illustrates an example of component carrier and carrier aggregation in a wireless communication system to which the present invention may be applied.
Figure 12:
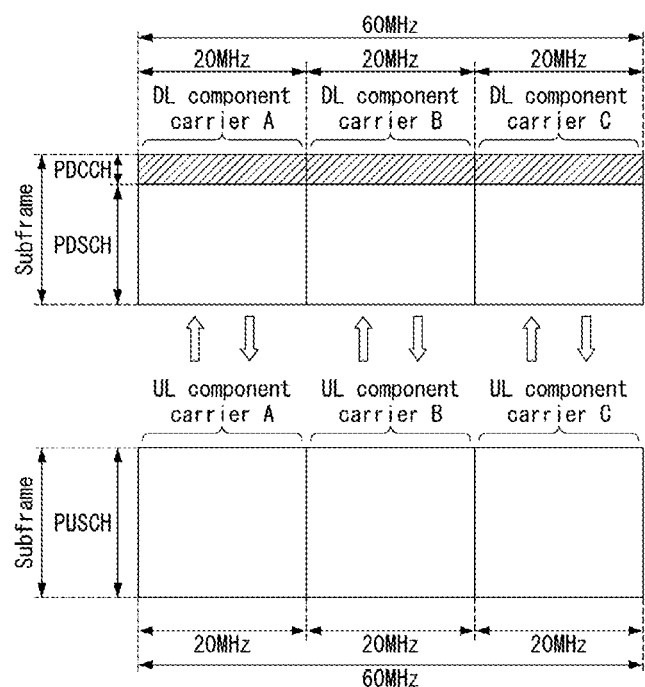

FIG. 12 illustrates examples of a component carrier and carrier aggregation in the wireless communication system to which the present invention can be applied.

FIG. 12(a) illustrates a single carrier structure used in an LTE system. The component carrier includes the DL CC and the UL CC. One component carrier may have a frequency range of 20 MHz.

FIG. 12(b) illustrates a carrier aggregation structure used in the LTE system. In the case of FIG. 12(b), a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Cross Carrier Scheduling

In the carrier aggregation system, in terms of scheduling for the carrier or the serving cell, two types of a self-scheduling method and a cross carrier scheduling method are provided. The cross carrier scheduling may be called cross component carrier scheduling or cross cell scheduling.

The cross carrier scheduling means transmitting the PDCCH (DL grant) and the PDSCH to different respective DL CCs or transmitting the PUSCH transmitted according to the PDCCH (UL grant) transmitted in the DL CC through other UL CC other than a UL CC linked with the DL CC receiving the UL grant.

Whether to perform the cross carrier scheduling may be UE-specifically activated or deactivated and semi-statically known for each terminal through the upper-layer signaling (for example, RRC signaling).

When the cross carrier scheduling is activated, a carrier indicator field (CIF) indicating through which DL/UL CC the PDSCH/PUSCH the PDSCH/PUSCH indicated by the corresponding PDCCH is transmitted is required. For example, the PDCCH may allocate the PDSCH resource or the PUSCH resource to one of multiple component carriers by using the CIF. That is, the CIF is set when the PDSCH or PUSCH resource is allocated to one of DL/UL CCs in which the PDCCH on the DL CC is multiply aggregated. In this case, a DCI format of LTE-A Release-8 may extend according to the CIF. In this case, the set CIF may be fixed to a 3-bit field and the position of the set CIF may be fixed regardless of the size of the DCI format. Further, a PDCCH structure (the same coding and the same CCE based resource mapping) of the LTE-A Release-8 may be reused.

On the contrary, when the PDCCH on the DL CC allocates the PDSCH resource on the same DL CC or allocates the PUSCH resource on a UL CC which is singly linked, the CIF is not set. In this case, the same PDCCH structure (the same coding and the same CCE based resource mapping) and DCI format as the LTE-A Release-8 may be used.

When the cross carrier scheduling is possible, the terminal needs to monitor PDCCHs for a plurality of DCIs in a control region of a monitoring CC according to a transmission mode and/or a bandwidth for each CC. Therefore, a configuration and PDCCH monitoring of a search space which may support monitoring the PDCCHs for the plurality of DCIs are required.

In the carrier aggregation system, a terminal DL CC aggregate represents an aggregate of DL CCs in which the terminal is scheduled to receive the PDSCH and a terminal UL CC aggregate represents an aggregate of UL CCs in which the terminal is scheduled to transmit the PUSCH. Further, a PDCCH monitoring set represents a set of one or more DL CCs that perform the PDCCH monitoring. The PDCCH monitoring set may be the same as the terminal DL CC set or a subset of the terminal DL CC set. The PDCCH monitoring set may include at least any one of DL CCs in the terminal DL CC set. Alternatively, the PDCCH monitoring set may be defined separately regardless of the terminal DL CC set. The DL CCs included in the PDCCH monitoring set may be configured in such a manner that self-scheduling for the linked UL CC is continuously available. The terminal DL CC set, the terminal UL CC set, and the PDCCH monitoring set may be configured UE-specifically, UE group-specifically, or cell-specifically.

When the cross carrier scheduling is deactivated, the deactivation of the cross carrier scheduling means that the PDCCH monitoring set continuously means the terminal DL CC set and in this case, an indication such as separate signaling for the PDCCH monitoring set is not required. However, when the cross carrier scheduling is activated, the PDCCH monitoring set is preferably defined in the terminal DL CC set. That is, the base station transmits the PDCCH through only the PDCCH monitoring set in order to schedule the PDSCH or PUSCH for the terminal.

Figure 13:
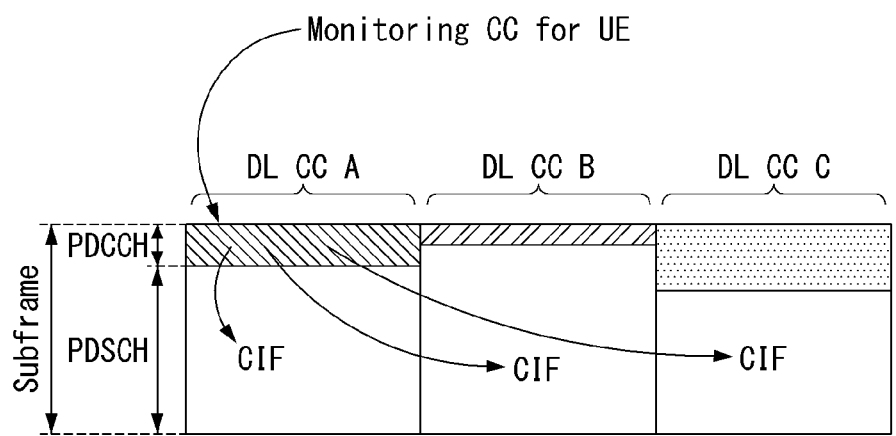
FIG. 13 illustrates an example of subframe structure according to cross carrier scheduling in a wireless communication system to which the present invention may be applied.

FIG. 13 illustrates one example of a subframe structure depending on cross carrier scheduling in the wireless communication system to which the present invention can be applied.

Referring to FIG. 13, a case is illustrated, in which three DL CCs are associated with a DL subframe for an LTE-A terminal and DL CC 'A' is configured as a PDCCH monitoring DL CC. When the CIF is not used, each DL CC may transmit the PDCCH scheduling the PDSCH thereof without the CIF. On the contrary, when the CIF is used through the upper-layer signaling, only one DL CC 'A' may transmit the PDCCH scheduling the PDSCH thereof or the PDSCH of another CC by using the CIF. In this case, DL CC 'B' and 'C' in which the PDCCH monitoring DL CC is not configured does not transmit the PDCCH.

PDCCH Transmission

An eNB determines a PDCCH format depending on a DCI to be transmitted to a UE and attaches cyclic redundancy check (CRC) to control information. The CRC is masked with a unique identifier (this is called a radio network temporary identifier (RNTI)) depending on the owner or use of the PDCCH. If the PDCCH is a PDCCH a specific UE, the CRC may be masked with a unique identifier of the UE, for example, a cell-RNTI (C-RNTI). Or if the PDCCH is a PDCCH for a paging message, the CRC may be masked with a paging indication identifier, for example, a paging-RNTI (P-RNTI). If the PDCCH is a PDCCH for system information, more specifically, a system information block (SIB), the CRC may be masked with a system information identifier, a system information RNTI (SI-RNTI). In order to indicate a random access response, that is, a response to the transmission of the random access preamble of the UE, the CRC may be masked with a random access-RNTI (RA-RNTI).

Next, the eNB generates coded data by performing channel coding on the control information to which the CRC has been added. In this case, the eNB may perform the channel coding at a code rate according to an MCS level. The eNB performs rate matching according to a CCE aggregation level allocated to a PDCCH format, and generates modulation symbols by modulating the coded data. In this case, a modulation rank according to the MCS level may be used. In modulation symbols forming one PDCCH, a CCE aggregation level may be one of 1, 2, 4 and 8. Thereafter, the eNB maps the modulation symbols to a physical resource element (CCE to RE mapping).

A plurality of PDCCHs may be transmitted within one subframe. That is, the control region of one subframe consists of a plurality of CCEs having indices $0 \sim N_{CCE,k}-1$. In this case, $N_{CCE,k}$ means a total number of CCEs within the control region of a k-th subframe. The UE monitors a plurality of PDCCHs every subframe.

In this case, the monitoring means that the UE attempts the decoding of each PDCCH depending on a PDCCH format that is monitored. In the control region allocated within a subframe, the eNB does not provide the UE with information regarding that where is a corresponding PDCCH. In order to receive a control channel transmitted by the eNB, the UE is unaware that its own PDCCH is transmitted at which CCE aggregation level or DCI format at which location. Accordingly, the UE searches the subframe for its own PDCCH by monitoring a set of PDCCH candidates. This is called blind decoding/detection (BD). Blind decoding refers to a method for a UE to de-mask its own UE identifier (UE ID) from a CRC part and to check whether a corresponding PDCCH is its own control channel by reviewing a CRC error.

In the active mode, the UE monitors a PDCCH every subframe in order to receive data transmitted thereto. In the DRX mode, the UE wakes up in the monitoring interval of a DRX period and monitors a PDCCH in a subframe corresponding to the monitoring interval. A subframe in which the monitoring of the PDCCH is performed is called a non-DRX subframe.

In order to receive a PDCCH transmitted to the UE, the UE needs to perform blind decoding on all of CCEs present in the control region of a non-DRX subframe. The UE is unaware that which PDCCH format will be transmitted, and thus has to decode all of PDCCHs at a CCE aggregation level until the blind decoding of the PDCCHs is successful within the non-DRX subframe. The UE needs to attempt detection at all of CCE aggregation levels until the blind decoding of a PDCCH is successful because it is unaware that the PDCCH for the UE will use how many CCEs. That is, the UE performs blind decoding for each CCE aggregation level. That is, the UE first attempts decoding by setting a CCE aggregation level unit to 1. If decoding fully fails, the UE attempts decoding by setting the CCE aggregation level unit to 2. Thereafter, the UE attempts decoding by setting the CCE aggregation level unit to 4 and setting the CCE aggregation level unit to 8. Furthermore, the UE attempts blind decoding on all of a C-RNTI, P-RNTI, SI-RNTI and RA-RNTI. Furthermore, the UE attempts blind decoding on all of DCI formats that need to be monitored.

As described above, if the UE performs blind decoding on all of possible RNTIs, all of DCI formats to be monitored and for each of all of CCE aggregation levels, the number of detection attempts is excessively many Accordingly, in the LTE system, a search space (SS) concept is defined for the blind decoding of a UE. The search space means a PDCCH candidate set for monitoring, and may have a different size depending on each PDCCH format.

The search space may include a common search space (CSS) and a UE-specific/dedicated search space (USS). In the case of the common search space, all of UEs may be aware of the size of the common search space, but a UE-specific search space may be individually configured for each UE. Accordingly, in order to decode a PDCCH, a UE must monitor both the UE-specific search space and the common search space, and thus performs a maximum of 44 times of blind decoding (BD) in one subframe. This does not include blind decoding performed based on a different CRC value (e.g., C-RNTI, P-RNTI, SI-RNTI, RA-RNTI).

There may occur a case where an eNB cannot secure CCE resources for transmitting a PDCCH to all of UEs to which the PDCCH is to be transmitted within a given subframe due to a smaller search space. The reason for this is that resources left over after a CCE location is allocated may not be included in the search space of a specific UE. In order to minimize such a barrier that may continue even in a next subframe, a UE-specific hopping sequence may be applied to the point at which the UE-specific search space starts.

Table 4 shows the size of the common search space and the UE-specific search space.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

In order to reduce a computational load of a UE according to the number of times that the UE attempts blind decoding, the UE does not perform search according to all of defined DCI formats at the same time. Specifically, the UE may always perform search for the DCI formats 0 and 1A in the UE-specific search space. In this case, the DCI formats 0 and 1A have the same size, but the UE may distinguish between the DCI formats using a flag for the DCI format 0/format 1A differentiation included in a PDCCH. Furthermore, a different DCI format in addition to the DCI formats 0 and 1A may be required for the UE depending on a PDSCH transmission mode configured by an eNB. For example, the DCI formats 1, 1B and 2 may be required for the UE.

The UE may search the common search space for the DCI formats 1A and 1C. Furthermore, the UE may be configured to search for the DCI format 3 or 3A. The DCI formats 3 and 3A have the same size as the DCI formats 0 and 1A, but the UE may distinguish between the DCI formats using CRS scrambled by another identifier other than a UE-specific identifier.

A search space $S_k^{(L)}$ means a PDCCH candidate set according to an aggregation level $L \in \{1,2,4,8\}$. A CCE according to the PDCCH candidate set m of the search space may be determined by Equation 4.

$$L \cdot \{(Y_k+m) \bmod \lfloor N_{CCE,k}/L \rfloor\} + i \quad \text{[Equation 4]}$$

In this case, $M^{(L)}$ indicates the number of PDCCH candidates according to a CCE aggregation level L for monitoring in the search space, and m=0, . . . , $M^{(L)}$−1. i is an index for designating an individual CCE in each PDCCH candidate, and is i=0, . . . , L−1.

As described above, in order to decode a PDCCH, the UE monitors both the UE-specific search space and the common search space. In this case, the common search space (CSS) supports PDCCHs having an aggregation level of {4, 8}, and the UE-specific search space(USS) supports PDCCHs having an aggregation level of {1, 2, 4, 8}.

Table 5 shows DCCH candidates monitored by a UE.

TABLE 5

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Equation 4, in the case of the common search space, $Y_i$ is set to 0 with respect to two aggregation levels L=4 and L=8. In contrast, with respect to an aggregation level L, in the case of the UE-specific search space, $Y_k$ is defined as in Equation 5.

$$Y_k = (A \cdot Y_{k-1}) \bmod D \quad \text{[Equation 5]}$$

In this case, $Y_{-1} = n_{RNTI} \neq 0$, and an RNTI value used for $n_{RNTI}$ may be defined as one of the identifications of the UE. Furthermore, A=39827, D=65537, and k=$\lfloor n_s/2 \rfloor$. In this case, $n_s$ indicates the slot number (or index) of a radio frame.

ACK/NACK Multiplexing Method

In a situation in which the terminal simultaneously needs to transmit multiple ACKs/NACKs corresponding to multiple data units received from an eNB, an ACK/NACK multiplexing method based on PUCCH resource selection may be considered in order to maintain a single-frequency characteristic of the ACK/NACK signal and reduce ACK/NACK transmission power.

Together with ACK/NACK multiplexing, contents of ACK/NACK responses for multiple data units may be identified by combining a PUCCH resource and a resource of QPSK modulation symbols used for actual ACK/NACK transmission.

For example, when one PUCCH resource may transmit 4 bits and four data units may be maximally transmitted, an ACK/NACK result may be identified in the eNB as shown in Table 6 given below.

TABLE 6

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |

TABLE 6-continued

| HARQ-ACK(0), HARQ-ACK(1), HARQ-ACK(2), HARQ-ACK(3) | $n_{PUCCH}^{(1)}$ | b(0), b(1) |
|---|---|---|
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 6 given above, HARQ-ACK(i) represents an ACK/NACK result for an i-th data unit. In Table 6 given above, discontinuous transmission (DTX) means that there is no data unit to be transmitted for the corresponding HARQ-ACK(i) or that the terminal may not detect the data unit corresponding to the HARQ-ACK(i).

According to Table 6 given above, a maximum of four PUCCH resources ($n_{PUCCH,0}^{(1)}$, $n_{PUCCH,1}^{(1)}$, $n_{PUCCH,2}^{(1)}$, and $n_{PUCCH,3}^{(1)}$) are provided and b(0) and b(1) are two bits transmitted by using a selected PUCCH.

For example, when the terminal successfully receives all of four data units, the terminal transmits 2 bits (1,1) by using $n_{PUCCH,1}^{(1)}$.

When the terminal fails in decoding in first and third data units and succeeds in decoding in second and fourth data units, the terminal transmits bits (1,0) by using $n_{PUCCH,3}^{(1)}$.

In ACK/NACK channel selection, when there is at least one ACK, the NACK and the DTX are coupled with each other. The reason is that a combination of the PUCCH resource and the QPSK symbol may not all ACK/NACK states. However, when there is no ACK, the DTX is decoupled from the NACK.

In this case, the PUCCH resource linked to the data unit corresponding to one definite NACK may also be reserved to transmit signals of multiple ACKs/NACKs.

Block Spread Scheme

Unlike the existing PUCCH format 1 series or 2 series, a block spread scheme is a method for modulating control signal transmission using an SC-FDMA method. As shown in FIG. 14, a symbol sequence may be spread on the time domain using orthogonal cover code (OCC) and transmitted. The control signals of a plurality of UEs may be multiplexed on the same RB using the OCC. In the case of the PUCCH format 2, one symbol sequence is transmitted over the time domain, and the control signals of a plurality of UEs are multiplexed using a cyclic shift (CS) of a CAZAC sequence. In contrast, in the case of the block spread-based PUCCH format (e.g., PUCCH format 3), one symbol sequence is transmitted over the frequency domain, and the control signals of a plurality of UEs are multiplexed using the time domain spread using the OCC.

FIG. 14 illustrates one example of generating and transmitting 5 SC-FDMA symbols during one slot in the wireless communication system to which the present invention can be applied.

In FIG. 14, an example of generating and transmitting 5 SC-FDMA symbols (that is, data part) by using an OCC having the length of 5 (alternatively, SF=5) in one symbol sequence during one slot. In this case, two RS symbols may be used during one slot.

In the example of FIG. 14, the RS symbol may be generated from a CAZAC sequence to which a specific cyclic shift value is applied and transmitted in a type in which a predetermined OCC is applied (alternatively, multiplied) throughout a plurality of RS symbols. Further, in the example of FIG. 8, when it is assumed that 12 modulated symbols are used for each OFDM symbol (alternatively, SC-FDMA symbol) and the respective modulated symbols are generated by QPSK, the maximum bit number which may be transmitted in one slot becomes 24 bits (=12×2). Accordingly, the bit number which is transmittable by two slots becomes a total of 48 bits. When a PUCCH channel structure of the block spreading scheme is used, control information having an extended size may be transmitted as compared with the existing PUCCH format 1 series and 2 series.

Hybrid—Automatic Repeat and Request (HARQ)

In a mobile communication system, one eNB transmits/receives data to/from a plurality of UEs through a radio channel environment in one cell/sector.

In a system operating using multiple carriers and a similar form, an eNB receives packet traffic from the wired Internet and transmits the received packet traffic to each UE using a predetermined communication method. In this case, what the eNB determines to transmit data to which UE using which frequency domain at which timing is downlink scheduling.

Furthermore, the eNB receives and demodulates data transmitted by UEs using a communication method of a predetermined form, and transmits packet traffic to the wired Internet. What an eNB determines to transmit uplink data to which UEs using which frequency band at which timing is uplink scheduling. In general, a UE having a better channel state transmits/receives data using more time and more frequency resources.

Figure 15:
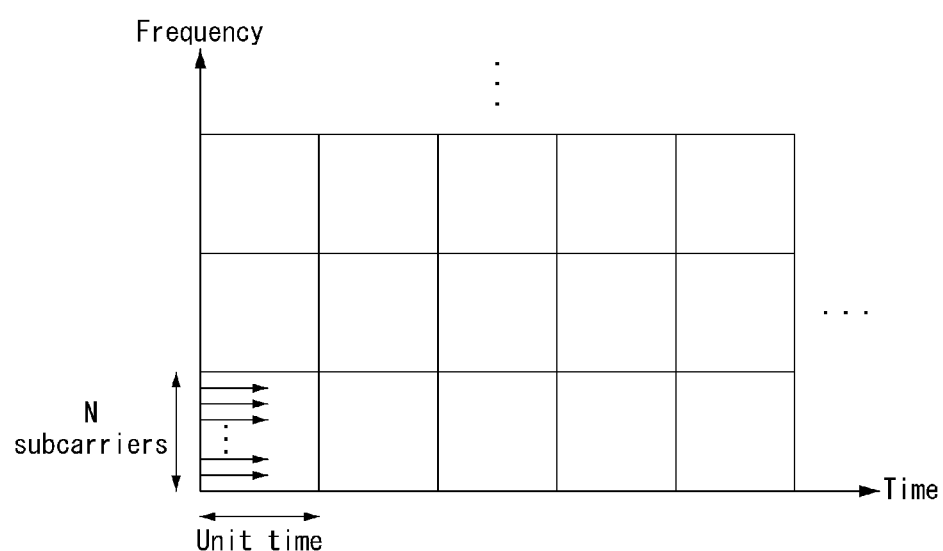
FIG. 15 is a diagram illustrating a time-frequency resource block in the time frequency domain of a wireless communication system to which the present invention may be applied.

FIG. 15 is a diagram illustrating a time-frequency resource block in the time frequency domain of a wireless communication system to which the present invention may be applied.

Resources in a system using multiple carriers and a similar form may be basically divided into time and frequency domains. The resources may be defined as a resource block. The resource block includes specific N subcarriers and specific M subframes or a predetermined time unit. In this case, N and M may be 1.

In FIG. 15, one rectangle means one resource block, and one resource block includes several subcarriers in one axis and a predetermined time unit in the other axis. In the downlink, an eNB schedules one or more resource block for a selected UE according to a predetermined scheduling rule, and the eNB transmits data to the UE using the allocated resource blocks. In the uplink, the eNB schedules one or more resource block for a selected UE according to a predetermined scheduling rule, and UEs transmits data using the allocated resources in the uplink.

After data is transmitted after scheduling, an error control method if a frame is lost or damaged includes an automatic repeat request (ARQ) method and a hybrid ARQ (HARQ) method of a more advanced form.

Basically, in the ARQ method, after one frame transmission, the reception side waits for an acknowledgement message (ACK). The reception side transmits an acknowledgement message (ACK) only when a message is properly received. If an error is generated in a frame, the reception side transmits a negative-ACK (NACK) message and deletes information about the erroneously received frame from a reception stage buffer. A transmission side transmits a subsequent frame when it receives an ACK signal is received, but retransmits the frame when it receives a NACK message.

Unlike in the ARQ method, in the HARQ method, if a received frame cannot be demodulated, the reception stage transmits a NACK message to the transmission stage, but stores the received frame in the buffer for a specific time, and combines the stored frame with a previously received frame when the frame is retransmitted, thereby increasing a reception success rate.

Recently, a more efficient HARQ method than the basic ARQ method is widely used. In addition to the HARQ method, several types are present. The HARQ method may be divided into synchronous HARQ and asynchronous HARQ depending on timing for retransmission. With respect to the amount of resources used upon retransmission, the method may be divided into a channel-adaptive method and a channel-non-adaptive method depending on whether a channel state is incorporated or not.

The synchronous HARQ method is a method in which subsequent retransmission is performed by a system at predetermined timing when initial transmission fails. That is, assuming that timing at which retransmission is performed every fourth time unit after the initial transmission fails, since an agreement has been previously made between an eNB and UEs, it is not necessary to additionally provide notification of the timing. However, if the data transmission side has received a NACK message, a frame is retransmitted every fourth time unit until an ACK message is received.

In contrast, in the asynchronous HARQ method, retransmission timing may be newly scheduled or may be performed through additional signaling. Timing at which retransmission for a previously failed frame varies due to several factors, such as a channel state.

The channel-non-adaptive HARQ method is a method in which upon retransmission, the modulation of a frame or the number of resource blocks used or adaptive modulation and coding (ACM) is performed as predetermined upon initial transmission. Unlike in the channel-non-adaptive HARQ method, the channel-adaptive HARQ method is a method in which they vary depending on the state of a channel For example, in the channel-non-adaptive HARQ method, a transmission side transmitted data using six resource blocks upon initial transmission and retransmits data using six resource blocks likewise even upon retransmission. In contrast, although transmission has been performed using 6 resource blocks at the early stage, a method of performing retransmission using resource blocks greater than or smaller than 6 depending on a channel state is a channel-adaptive HARQ method.

Four combinations of HARQ may be performed based on such classification, but a chiefly used HARQ method includes an asynchronous channel-adaptive asynchronous, a channel-adaptive HARQ (HARQ) method, and a synchronous and channel-non-adaptive HARQ method.

The asynchronous channel-adaptive HARQ method can maximize retransmission efficiency because retransmission timing and the amount of resources used are adaptively made different depending on the state of a channel, but is not generally taken into consideration because it has a disadvantage in that it has increasing overhead.

Meanwhile, the synchronous channel-non-adaptive HARQ method has an advantage in that there is almost no overhead because timing and resource allocation for retransmission have been agreed within a system, but has a disadvantage in that retransmission efficiency is very low if it is used in a channel state in which a change is severe.

Figure 16:
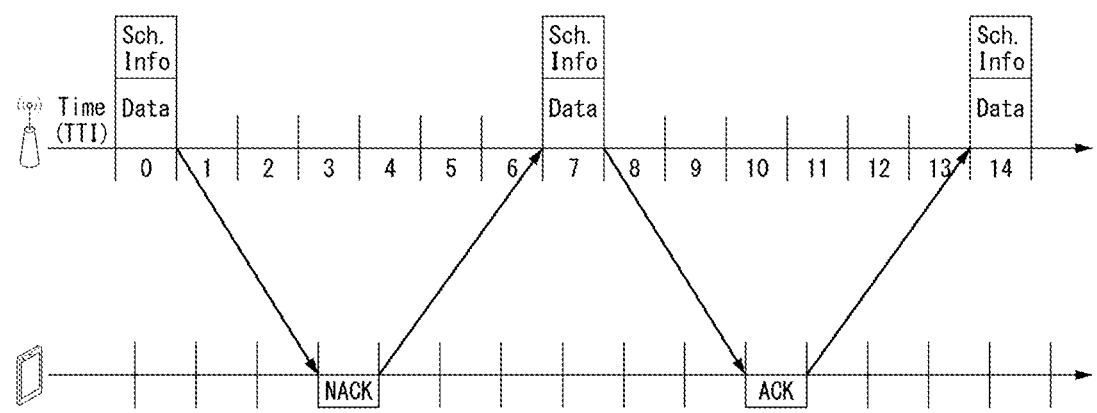
FIG. 16 is a diagram illustrating a resources allocation and retransmission process of an asynchronous HARQ method in a wireless communication system to which the present invention may be applied.

FIG. 16 is a diagram illustrating a resources allocation and retransmission process of an asynchronous HARQ method in a wireless communication system to which the present invention may be applied.

Meanwhile, for example, in the case of the downlink, after data is transmitted after scheduling, ACK/NACK information is received from a UE, and time delay is generated after next data is transmitted as in FIG. 16. The delay is delay generated due to channel propagation delay and the time taken for data decoding and data encoding.

For non-empty data transmission during such a delay interval, a transmission method using an independent HARQ process is used. For example, if the shortest period between next data transmission and next data transmission is 7 subframes, data transmission can be performed without an empty space if 7 independent processes are placed.

An LTE physical layer supports HARQ in a PDSCH and PUSCH and transmits associated reception ACK feedback in a separate control channel If the LTE FDD system does not operate in MIMO, 8 stop-and-wait (SAW) HARQ processes are supported both in the uplink and downlink as a constant round-trip time (RTT) of 8 ms.

CA-Based CoMP Operation

In the LTE-post system, cooperative multi-point (CoMP) transmission may be implemented using a carrier aggregation (CA) function in LTE.

Figure 17:
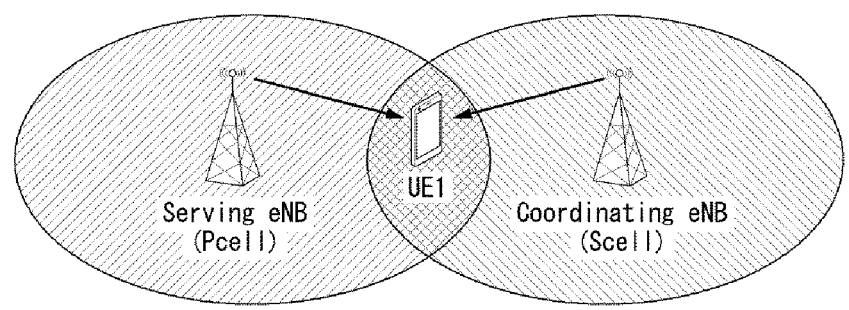
FIG. 17 is a diagram illustrating a carrier aggregation-based CoMP system in a wireless communication system to which the present invention may be applied.
Figure 17:
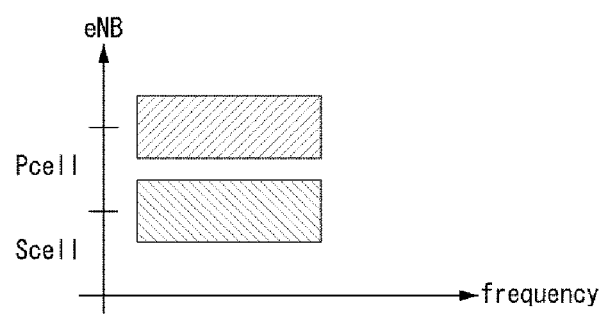

FIG. 17 is a diagram illustrating a carrier aggregation-based CoMP system in a wireless communication system to which the present invention may be applied.

FIG. 17 illustrates a case where a primary cell (PCell) carrier and a secondary cell (SCell) carrier are allocated to two eNBs that use the same frequency band in a frequency axis and are geographically spaced apart, respectively.

Various DL/UL CoMP operations, such as JT, CS/CB, and dynamic cell selection, may be possible in such a manner that a serving eNB assigns the PCell to a UE1 and assign an SCell, to an adjacent eNB having great interference.

FIG. 17 shows an example in which a UE merges the two eNBs as a PCell and an SCell, respectively. However, one UE may merge 3 or more cells. Some of the cells may perform a CoMP operation in the same frequency band and other cells may perform a simple CA operation in another frequency band. In this case, the PCell does not need to necessarily participate in the CoMP operation.

UE Procedure for PDSCH Reception

When a UE detects the PDCCH of a serving cell in which a DCI format 1, 1A, 1B, 1C, 1D, 2, 2A, 2B or 2C intended therefor is delivered within a subframe other than a sub-frame(s) indicated by a high layer parameter "mbsfn-SubframeConfigList", it decodes a corresponding PDSCH in the same subframe due to a limit of the number of transport blocks defined in a high layer.

It is assumed that the UE decodes a PDSCH according to the detected PDCCH carrying the DCI format 1A or 1C intended therefor and having CRC scrambled by an SI-RNTI or P-RNTI and a PRS is not present in a resource block (RB) in which the corresponding PDSCH is delivered.

It is assumed that in the UE in which a carrier indication field (CIF) for a serving cell is configured, a carrier indication field is not present in any PDCCH of the serving cell within a common search space.

If not, it is assumed that when PDCCH CRC is scrambled by the C-RNTI or SPS C-RNTI, in a UE in which a CIF is configured, a CIF for the serving cell is present in a PDCCH located within a UE-specific search space.

When the UE is configured by a high layer so that it decodes a PDCCH having CRC scrambled by an SI-RNTI, the UE decodes the PDCCH and the corresponding PDSCH according to a combination defined in Table 3. The PDSCH corresponding to the PDCCH(s) is subjected to scrambling initialization by the SI-RNTI.

Table 3 illustrates the PDCCH and PDSCH configured by the SI-RNTI.

TABLE 7

| DCI format | Search space | PDSCH transmission method corresponding to a PDCCH |
|---|---|---|
| DCI format 1C | Common | If the number of PBCH antenna ports is 1, a single antenna port, a port 0 is used, and if not, transmit diversity |
| DCI format 1A | Common | If the number of PBCH antenna ports is 1, a single antenna port, a port 0 is used, and if not, transmit diversity |

If the UE is configured by a high layer so that it decodes a PDCCH having CRC scrambled by a P-RNTI, the UE decodes the PDCCH and a corresponding PDSCH according to a combination defined in Table 4. The PDSCH corresponding to the PDCCH(s) is subjected to scrambling initialization by the P-RNTI.

Table 8 illustrates the PDCCH and PDSCH configured by the P-RNTI.

TABLE 8

| DCI format | Search space | PDSCH transmission method corresponding to a PDCCH |
|---|---|---|
| DCI format 1C | Common | If the number of PBCH antenna ports is 1, a single antenna port, port 0 is used, and if not, transmit diversity |
| DCI format 1A | Common | If the number of PBCH antenna ports is 1, a single antenna port, port 0 is used, and if not, transmit diversity |

If the UE is configured by a high layer so that it decodes a PDCCH having CRC scrambled by an RA-RNTI, the UE decodes the PDCCH and a corresponding PDSCH according to a combination defined in Table 5. The PDSCH corresponding to the PDCCH(s) is subjected to scrambling initialization by the RA-RNTI.

Table 9 illustrates the PDCCH and PDSCH scrambled by the RA-RNTI.

TABLE 9

| DCI format | Search space | PDSCH transmission method corresponding to PDCCH |
|---|---|---|
| DCI format 1C | Common | If the number of PBCH antenna ports is 1, a single antenna port, port 0 is used, and if not, transmit diversity |
| DCI format 1A | Common | If the number of PBCH antenna ports is 1, a single antenna port, port 0 is used, and if not, transmit diversity |

The UE may be semi-statically configured through higher layer signaling so that it receives PDSCH data transmission signaled through a PDCCH according to one of nine transmission modes, such as a mode 1 to a mode 9.

In the case of a frame architecture type 1,

A UE does not receive a PDSCH RB transmitted in the antenna port 5 within any subframe in which the number of OFDM symbols for a PDCCH having a normal CP is 4.

If any one of 2 physical resource blocks (PRBs) to which a virtual resource block (VRB) pair is mapped overlaps a frequency in which a PBCH or a primary or secondary synchronization signal is transmitted within the same subframe, a UE does not receive a PDSCH RB transmitted in the antenna port 5, 7, 8, 9, 10, 11, 12, 13 or 14 in the corresponding 2 PRBs.

A UE does not receive a PDSCH RB transmitted in the antenna port 7 to which distributed VRB resource allocation has been assigned.

If a UE does not receive all of allocated PDSCH RBs, it may skip the decoding of a transport block. If the UE skip decoding, a physical layer indicates a high layer that a transport block has not been successfully.

In the case of a frame architecture type 2,

A UE does not receive a PDSCH RB transmitted in the antenna port 5 within any subframe in which the number of OFDM symbols for a PDCCH having a normal CP is 4.

If any one of two PRBs to which a VRB pair is mapped overlaps a frequency in which a PBCH is transmitted within the same subframe, a UE does not receive a PDSCH RB in the antenna port 5 transmitted in the corresponding two PRBs.

If any one of two PRBs to which a VRB pair is mapped overlaps a frequency in which a primary or secondary synchronization signal is transmitted in the same subframe, a UE does not receive a PDSCH RB transmitted in the antenna port 7, 8, 9, 10, 11, 12, 13 or 14 in the corresponding two PRBs.

I a normal CP is configured, a UE does not receive in the antenna port 5 PDSCH to which VRB resource allocation distributed within a special subframe has been assigned in an uplink-downlink configuration #1 or #6.

A UE does not receive a PDSCH in the antenna port 7 to which distributed VRB resource allocation has been assigned.

If a UE does not receive all of allocated PDSCH RB, it may skip the decoding of a transport block. If the UE skips decoding, a physical layer indicates a high layer that a transport block has not been successfully decoded.

If a UE is configured by a high layer so that it decodes a PDCCH having CRC scrambled by a C-RNTI, the UE decodes the PDCCH and a corresponding PDSCH according to each combination defined in Table 10. The PDSCH corresponding to the PDCCH(s) is subjected to scrambling initialization by the C-RNTI.

If a CIF for a serving cell is configured or a UE is configured by a high layer so that it decodes a PDCCH having CRC scrambled by a C-RNTI, the UE decodes the PDSCH of a serving cell indicated by a CIF value within a decoded PDCCH.

If a UE of the transmission mode 3, 4, 8 or 9 receives DCI format 1A assignment, the UE assumes that PDSCH transmission is related to a transport block 1 and a transport block 2 is disabled.

If a UE is configured in the transmission mode 7, a UE-specific reference signal corresponding to a PDCCH(s) is subjected to scrambling initialization by a C-RNTI.

If an extended CP is used in the downlink, a UE does not support the transmission mode 8.

If the transmission mode 9 is configured for a UE, when the UE detects a PDCCH carrying the DCI format 1A or 2C intended therefor and having CRC scrambled by a C-RNTI, the UE decodes a corresponding PDSCH in a subframe indicated by a high layer parameter ("mbsfn-SubframeConfigList"). However, the UE is configured by a high layer so that it decodes a PMCH, or a PRS occasion is configured only within an MBSFN subframe and a subframe in which a CP length used in a subframe #0 is a normal CP and a subframe used as part of a PRS occasion by a high layer is excluded.

Table 10 illustrates a PDCCH and PDSCH configured by a C-RNTI.

TABLE 10

| Transmission mode | DCI format | Search space | PDSCH transmission method corresponding to PDCCH |
|---|---|---|---|
| Mode 1 | DCI format 1A | Common and UE-specific by C-RNTI | Single antenna port, port 0 |
|  | DCI format 1 | UE-specific by C-RNTI | Single antenna port, port 0 |
| Mode 2 | DCI format 1A | Common and UE-specific by C-RNTI | Transmit diversity |
|  | DCI format 1 | UE-specific by C-RNTI | Transmit diversity |
| Mode 3 | DCI format 1A | Common and UE-specific by C-RNTI | Transmit diversity |
|  | DCI format 2A | UE-specific by C-RNTI | Large delay CDD or transmit diversity |
| Mode 4 | DCI format 1A | Common and UE-specific by C-RNTI | Transmit diversity |
|  | DCI format 2 | UE-specific by C-RNTI | Closed-loop spatial multiplexing or transmit diversity |
| Mode 5 | DCI format 1A | Common and UE-specific by C-RNTI | Transmit diversity |
|  | DCI format 1D | UE-specific by C-RNTI | Multi-user MIMO |
| Mode 6 | DCI format 1A | Common and UE-specific by C-RNTI | Transmit diversity |
|  | DCI format 1B | UE-specific by C-RNTI | Closed-loop spatial multiplexing using single transport layer |
| Mode 7 | DCI format 1A | Common and UE-specific by C-RNTI | If the number of PBCH antenna ports is 1, a single antenna port, port 0 is used, and if not, transmit diversity |
|  | DCI format 1 | UE-specific by C-RNTI | Single antenna port, port 5 |
| Mode 8 | DCI format 1A | Common and UE-specific by C-RNTI | If the number of PBCH antenna ports is 1, a single antenna port, port 0 is used, and if not, transmit diversity |
|  | DCI format 2B | UE-specific by C-RNTI | Dual layer transmission, ports 7 and 8 or a single antenna port, port 7 or 8 |
| Mode 9 | DCI format 1A | Common and UE-specific by C-RNTI | Non-MBSFN subframe: if the number of PBCH antenna ports is 1, a single antenna port, port 0 is used, and if not, transmit diversity MBSFN subframe: a single antenna port, port 7 |
|  | DCI format 2C | UE-specific by C-RNTI | Layer transmission of maximum 8, port 7-14 |

If a UE is configured by a high layer so that it decodes a PDCCH having SPS CRC scrambled by a C-RNTI, the UE decodes the PDCCH of a primary cell and the corresponding PDSCH of the primary cell according to each combination defined in Table 7. If the PDSCH is transmitted without the corresponding PDCCH, the same PDSCH-related configuration is applied. A PDSCH corresponding to the PDCCH and a PDSCH not having a PDCCH are subjected to scrambling initialization by an SPS C-RNTI.

If the transmission mode 7 is configured for a UE, a UE-specific reference signal corresponding to a PDCCH(s) is subjected to scrambling initialization by an SPS C-RNTI.

If the transmission mode 9 is configured for a UE, when the UE detects a PDCCH carrying the DCI format 1A or 2C intended therefor and having SPS CRC scrambled by a C-RNTI or a configured PDSCH configured without a PDCCH intended therefor, the UE decodes the corresponding PDSCH in a subframe indicated by a high layer parameter ("mbsfn-SubframeConfigList"). In this case, the UE is configured by a high layer so that it decodes a PMCH, or a PRS occasion is configured only within an MBSFN subframe, and a subframe in which a CP length used in a subframe #0 is a normal CP and configured as part of a PRS occasion by a high layer is excluded.

Table 11 illustrates a PDCCH and PDSCH configured by an SPS C-RNTI.

TABLE 11

| Transmission mode | DCI format | Search space | PDSCH transmission method corresponding to PDCCH |
|---|---|---|---|
| Mode 1 | DCI format 1A | Common and UE-specific by C-RNTI | Single antenna port, port 0 |
|  | DCI format 1 | UE-specific by C-RNTI | Single antenna port, port 0 |
| Mode 2 | DCI format 1A | Common and UE-specific by C-RNTI | Transmit diversity |
|  | DCI format 1 | UE-specific by C-RNTI | Transmit diversity |
| Mode 3 | DCI format 1A | Common and UE-specific by C-RNTI | Transmit diversity |
|  | DCI format 2A | UE-specific by C-RNTI | Transmit diversity |

TABLE 11-continued

| Transmission mode | DCI format | Search space | PDSCH transmission method corresponding to PDCCH |
|---|---|---|---|
| Mode 4 | DCI format 1A | Common and UE-specific by C-RNTI | Transmit diversity |
|  | DCI format 2 | UE-specific by C-RNTI | Transmit diversity |
| Mode 5 | DCI format 1A | Common and UE-specific by C-RNTI | Transmit diversity |
| Mode 6 | DCI format 1A | Common and UE-specific by C-RNTI | Transmit diversity |
| Mode 7 | DCI format 1A | Common and UE-specific by C-RNTI | Single antenna port, port 5 |
|  | DCI format 1 | UE-specific by C-RNTI | Single antenna port, port 5 |
| Mode 8 | DCI format 1A | Common and UE-specific by C-RNTI | Single antenna port, port 7 |
|  | DCI format 2B | UE-specific by C-RNTI | Single antenna port, port 7 or 8 |
| Mode 9 | DCI format 1A | Common and UE-specific by C-RNTI | Single antenna port, port 7 |
|  | DCI format 2C | UE-specific by C-RNTI | Single antenna port, port 7 or 8 |

If a UE is configured by a high layer so that it decodes a PDCCH having CRC scrambled by a temporary C-RNTI and is configured so that it does not decode a PDCCH having CRC scrambled by the C-RNTI, the UE decodes the PDCCH and a corresponding PDSCH according to a combination defined in Table 8. The PDSCH corresponding to the PDCCH(s) is subjected to scrambling initialization by the temporary C-RNTI.

Table 12 illustrates the PDCCH and PDSCH configured by a temporary C-RNTI.

TABLE 12

| DCI format | Search space | PDSCH transmission method corresponding to PDCCH |
|---|---|---|
| DCI format 1A | Common and UE-specific by temporary C-RNTI | If the number of PBCH antenna ports is 1, a single antenna port, port 0 is used, and if not, transmit diversity |
| DCI format 1 | UE-specific by temporary C-RNTI | If the number of PBCH antenna ports is 1, a single antenna port, port 0 is used, and if not, transmit diversity |

UE Procedure for PUSCH Transmission

A UE is semi-statically configured through higher layer signaling so that it performs PUSCH transmission signaled through a PDCCH according to any one of two uplink transmission modes of the mode 1 and 2 defined in Table 13. When the UE is configured by a high layer so that it decodes a PDCCH having CRC scrambled by a C-RNTI, the UE decodes the PDCCH according to a combination defined in Table 9 and transmits the corresponding PUSCH. PUSCH transmission corresponding to the PDCCH(s) and PUSCH retransmission for the same transport block are subjected to scrambling initialization by the C-RNTI. The transmission mode 1 is a default uplink transmission mode for the UE until the uplink transmission mode is assigned to the UE by higher layer signaling.

If the transmission mode 2 is configured for a UE and the UE receives a DCI format 0 uplink scheduling grant, the UE assumes that PUSCH transmission is related to a transport block 1 and a transport block 2 is disabled.

Table 13 illustrates the PDCCH and PUSCH configured by the C-RNTI.

TABLE 13

| Transmission mode | DCI format | Search space | Transmission method of PUSCH corresponding to PDCCH |
|---|---|---|---|
| Mode 1 | DCI format 0 | Common and UE-specific by C-RNTI | Single antenna port, port 10 |
| Mode 2 | DCI format 0 | Common and UE-specific by C-RNTI | Single antenna port, port 10 |
|  | DCI format 4 | UE-specific by C-RNTI | Closed-loop spatial multiplexing |

If a UE is configured by a high layer so that it decodes a PDCCH having CRC scrambled by a C-RNTI and receives a random access procedure initiated by a PDCCH order, the UE decodes the PDCCH according to a combination defined in Table 10.

Table 14 illustrates the PDCCH configured by a PDCCH order for initiating a random access procedure.

TABLE 14

| DCI format | Search space |
| --- | --- |
| DCI format 1A | Common and UE-specific by C-RNTI |

If a UE is configured by a high layer so that it decodes a PDCCH having SPS CRC scrambled by a C-RNTI, the UE decodes the PDCCH according to a combination defined in Table 11 and transmits a corresponding PUSCH. PUSCH transmission corresponding to the PDCCH(s) and PUSCH retransmission for the same transport block are subjected to scrambling initialization by the SPS C-RNTI. Minimum transmission of the PUSCH and PUSCH retransmission for the same transport block without the corresponding PDCCH is subjected to scrambling initialization by the SPS C-RNTI.

Table 15 illustrates the PDCCH and PUSCH configured by the SPS C-RNTI.

TABLE 15

| Transmission mode | DCI format | Search space | Transmission method of PUSCH corresponding to PDCCH |
| --- | --- | --- | --- |
| Mode 1 | DCI format 0 | Common and UE-specific by C-RNTI | Single antenna port, port 10 |
| Mode 2 | DCI format 0 | Common and UE-specific by C-RNTI | Single antenna port, port 10 |

Regardless of whether a UE has been configured to decode a PDCCH having CRC scrambled by a C-RNTI, if the UE is configured by a high layer so that it decodes a PDCCH scrambled by a temporary C-RNTI, the UE decodes the PDCCH according to a combination defined in Table 12 and transmits the corresponding PUSCH. A PUSCH corresponding to the PDCCH(s) is subjected to scrambling initialization by the temporary C-RNTI.

If the temporary C-RNTI is set by a high layer, PUSCH transmission corresponding to a random access response grant and PUSCH retransmission for the same transport block are scrambled by the temporary C-RNTI. If not, PUSCH transmission corresponding to a random access response grant and PUSCH retransmission for the same transport block are scrambled by a C-RNTI.

Table 16 illustrates the PDCCH configured by the temporary C-RNTI.

TABLE 16

| DCI format | Search space |
| --- | --- |
| DCI format 0 | Common |

If a UE is configured by a high layer so that it decodes a PDCCH having CRC scrambled by a TPC-PUCCH-RNTI, the UE decodes the PDCCH according to a combination defined in Table 13. The indication of 3/3A in Table 17 includes that the UE receives the DCI format 3 or DCI format according to the configuration.

Table 17 illustrates the PDCCH configured by the TPC-PUCCH-RNTI.

TABLE 17

| DCI format | Search space |
| --- | --- |
| DCI format 3/3A | Common |

If a UE is configured by a high layer so that it decodes a PDCCH having CRS scrambled by a TPC-PUSCH-RNTI, the UE decodes the PDCCH according to a combination defined in Table 14. The indication of 3/3A in Table 18 includes that the UE receives the DCI format 3 or DCI format according to the configuration.

Table 18 illustrates the PDCCH configured by the TPC-PUSCH-RNTI.

TABLE 18

| DCI format | Search space |
| --- | --- |
| DCI format 3/3A | Common |

Relay Node (RN)

A relay node delivers data transmitted/received between an eNB and a UE through two different links (backhaul link and access link). The eNB may include a donor cell. The relay node is wirelessly connected to a wireless access network through the donor cell.

Meanwhile, in relation to the band (or spectrum) use of a relay node, a case where a backhaul link operates in the same frequency band as an access link and is called an "in-band", and a case where the backhaul link and the access link operate in different frequency bands is called an "out-band." In both the in-band and the out-band, a UE operating according to the existing LTE system (e.g., Release-8) (hereinafter referred to as a "legacy UE") is capable of accessing a donor cell.

A relay node may be divided into a transparent relay node or a non-transparent relay node depending on whether a UE recognizes the relay node. Transparent means a case where whether a UE communicates with a network through a relay node is not recognized. Non-transparent means a case where whether a UE communicates with a network through a relay node is recognized.

In relation to control of a relay node, the relay node may be divided into a relay node configured as part of a donor cell and a relay node that autonomously controls a cell.

A relay node configured as part of a donor cell may have a relay node identifier (relay ID), but does not have the cell identity of the relay node itself.

If at least part of radio resource management (RRM) is controlled by an eNB to which a donor cell belongs, although the remaining parts of the RRM are located in a relay node, it is called a relay node configured as part of the donor cell. Preferably, such a relay node may support a legacy UE. For example, various types of smart repeaters, decode-and-forward relays, and L2 (second layer) relay nodes and a type-2 relay node correspond to such a relay node.

In the case of a relay node that autonomously controls a cell, the relay node controls one cell or a plurality of cells, and a unique physical layer cell identity is provided to each of cells controlled by the relay node. Furthermore, the cells controlled by the relay node may use the same RRM mechanism. From a viewpoint of a UE, there is no difference between a case where a UE accesses a cell controlled by a relay node and a UE accesses a cell controlled by a common eNB. A cell controlled by such a relay node may support a legacy UE. For example, a self-backhauling relay node, an L3 (third layer) relay node, a type-1 relay node and a type-1a relay node correspond to such a relay node.

A type-1 relay node is an in-band relay node and controls a plurality of cells. Each of the plurality of cells seems to be a separate cell different from a donor cell from a viewpoint of a UE. Furthermore, a plurality of cells has respective physical cell IDs (this is defined in LTE Release-8), and the relay node may transmit its own synchronization channel, a reference signal, etc. In the case of a single-cell operation, a UE may directly receive scheduling information and HARQ feedback from a relay node and transmit its own control channel (scheduling request (SR), CQI, ACK/NACK, etc.) to a relay node. Furthermore, the type-1 relay node seems to be a legacy eNB (an eNB operating according to the LTE Release-8 system) from a viewpoint of legacy UEs (UEs operating according to the LTE Release-8 system). That is, the type-1 relay node has (backward compatibility. Meanwhile, from a viewpoint of UEs operating according to the LTE-A systems, the type-1 relay node seems to be an eNB different from a legacy eNB, and can provide performance improvement.

In addition to a case where the type-1a relay node operates in an out-band, it has the same characteristics as the type-1 relay node. The operation of the type-1a relay node may be configured so that an influence attributable to an L1 (first layer) operation is minimized or not present.

A type-2 relay node is an in-band relay node and does not have a separate physical cell ID and thus does not form a new cell. The type-2 relay node is transparent to a legacy UE, and the legacy UE does not recognize the presence of the type-2 relay node. The type-2 relay node may transmit a PDSCH, but does not transmit a CRS and PDCCH at least.

Meanwhile, in order for a relay node to operate in the in-band, some resources in the time-frequency space must be reserved for a backhaul link, and the resources may be configured so that they are not used for an access link. This is called resources partitioning.

A common principle in resources partitioning in a relay node may be described as follows. Backhaul downlink and access downlink may be multiplexed on one carrier frequency according to a time division multiplexing (TDM) method (i.e., only one of the backhaul downlink and access downlink is activated in a specific time). Similarly, the backhaul uplink and access uplink may be multiplexed on one carrier frequency according to the TDM scheme (i.e., only one of the backhaul uplink and access uplink is activated in a specific time).

In the backhaul link multiplexing in FDD, backhaul downlink transmission may be performed in a downlink frequency band, and backhaul uplink transmission may be performed in an uplink frequency band. In the backhaul link multiplexing in TDD, backhaul downlink transmission may be performed in a downlink subframe of an eNB and a relay node, and backhaul uplink transmission may be performed in an uplink subframe of an eNB and a relay node.

In the case of an in-band relay node, for example, if backhaul downlink reception from an eNB and access downlink transmission to a UE are performed in the same frequency band at the same time, signal interference may be generated from the reception stage of the relay node due to a signal transmitted by the transmission stage of the relay node. That is, signal interference or RF jamming may be generated from the RF front end of the relay node. Likewise, if backhaul uplink transmission to an eNB and access uplink reception from a UE are performed in the same frequency band at the same time, signal interference may be generated.

Accordingly, in order for a relay node to transmit/receive signals in the same frequency band at the same time, it is difficult to implement the simultaneous transmission if sufficient separation between a reception signal and a transmission signal (e.g., a transmit antenna and a receive antenna are sufficiently isolated geographically, such as that the transmit antenna and the receive antenna are installed on the ground/underground).

One scheme for solving such a signal interference problem is that a relay node operates to not send a signal to a UE while it receives a signal from a donor cell. That is, a gap is generated in transmission from the relay node to the UE. During the gap, the UE (including a legacy UE) may be configured to not expect any transmission from the relay node. Such a gap may be configured by configuring a multicast broadcast single frequency network (MBSFN) subframe.

Figure 18:
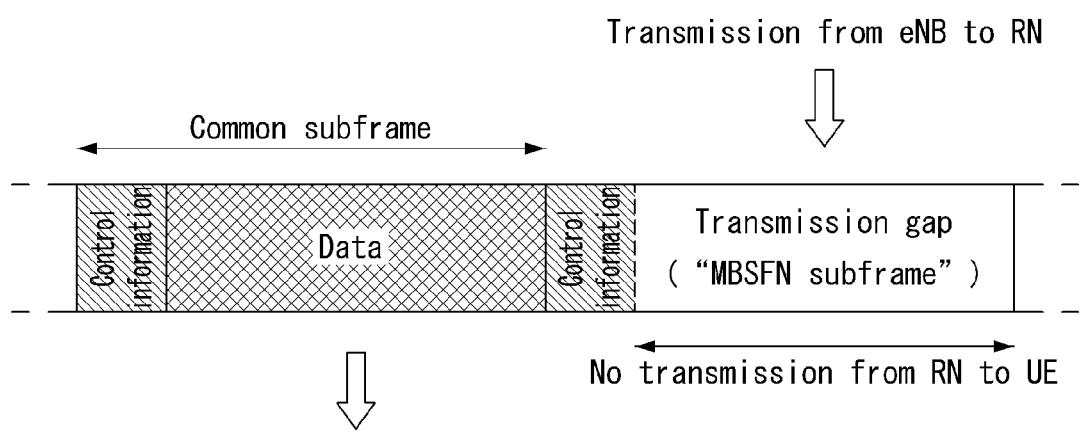
FIG. 18 illustrates a relay node resource partition in a wireless communication system to which the present invention may be applied.

FIG. 18 illustrates a structure of relay resource partitioning in the wireless communication system to which the present invention can be applied.

In FIG. 18, in the case of a first subframe as a general subframe, a downlink (that is, access downlink) control signal and downlink data are transmitted from the relay node and in the case of a second subframe as the MBSFN subframe, the control signal is transmitted from the relay node from the terminal in the control region of the downlink subframe, but no transmission is performed from the relay node to the terminal in residual regions. Herein, since the legacy terminal expects transmission of the PDCCH in all downlink subframes (in other words, since the relay node needs to support legacy terminals in a region thereof to perform a measurement function by receiving the PDCCH every subframe), the PDCCH needs to be transmitted in all downlink subframes for a correct operation of the legacy terminal. Therefore, eve on a subframe (second subframe) configured for downlink (that is, backhaul downlink) transmission from the base station to the relay node, the relay does not receive the backhaul downlink but needs to perform the access downlink transmission in first N (N=1, 2, or 3) OFDM symbol intervals of the subframe. In this regard, since the PDCCH is transmitted from the relay node to the terminal in the control region of the second subframe, the backward compatibility to the legacy terminal, which is served by the relay node may be provided. In residual regions of the second subframe, the relay node may receive transmission from the base station while no transmission is performed from the relay node to the terminal. Therefore, through the resource partitioning scheme, the access downlink transmission and the backhaul downlink reception may not be simultaneously performed in the in-band relay node.

The second subframe using the MBSFN subframe will be described in detail. The control region of the second subframe may be referred to as a relay non-hearing interval. The relay non-hearing interval means an interval in which the relay node does not receive the backhaul downlink signal and transmits the access downlink signal. The interval may be configured by the OFDM length of 1, 2, or 3 as described above. In the relay node non-hearing interval, the relay node may perform the access downlink transmission to the terminal and in the residual regions, the relay node may receive the backhaul downlink from the base station. In this case, since the relay node may not simultaneously perform transmission and reception in the same frequency band, It takes a time for the relay node to switch from a transmission mode to a reception mode. Therefore, in a first partial interval of a backhaul downlink receiving region, a guard time (GT) needs to be set so that the relay node switches to the transmission/reception mode. Similarly, even when the relay node operates to receive the backhaul downlink from the base station and transmit the access downlink to the terminal, the guard time for the reception/transmission mode switching of the relay node may be set. The length of the guard time may be given as a value of the time domain and for example, given as a value of k (k≥1) time samples (Ts) or set to the length of one or more OFDM symbols. Alternatively, when the relay node backhaul downlink subframes are consecutively configured or according to a predetermines subframe timing alignment relationship, a guard time of a last part of the subframe may not be defined or set. The guard time may be defined only in the frequency domain configured for the backhaul downlink subframe transmission in order to maintain the backward compatibility (when the guard time is set in the access downlink interval, the legacy terminal may not be supported). In the backhaul downlink reception interval other than the guard time, the relay node may receive the PDCCH and the PDSCH from the base station. This may be expressed as a relay (R)-PDCCH and a relay-PDSCH (R-PDSCH) in a meaning of a relay node dedicated physical channel.

Quasi Co-Located (OCL) Between Antenna Ports

Quasi co-located or quasi co-location (QC/QCL) may be defined as follows.

If two antenna ports are in a QC/QCL relation (or subjected to QC/QCL), a UE may assume that the large-scale property of a signal delivered through one antenna port may be inferred from a signal delivered through another antenna port. In this case, the large-scale property include one or more of delay spread, Doppler spread, a frequency shift, average received power and received timing.

Furthermore, the large-scale property may be defined as follows. If two antenna ports are in a QC/QCL relation (or subjected to QC/QCL), a UE may assume that the large-scale property of a channel through which one symbol is delivered through one antenna port may be inferred from a radio channel through which one symbol is delivered through another antenna port. In this case, the large-scale property include one or more of delay spread, Doppler spread, Doppler shift, an average gain and average delay.

That is, if two antenna ports are in a QC/QCL relation (or subjected to QC/QCL), this means that the large-scale property of a radio channel from one antenna port is the same as the large-scale property of a radio channel from the remaining one antenna port. If a plurality of antenna ports in which an RS is transmitted is taken into consideration, when antenna ports in which different two types of RSs are transmitted have a QCL relation, the large-scale property of a radio channel from one antenna port may be substituted with the large-scale property of a radio channel from the other antenna port.

In this specification, the above QC/QCL-related definitions are not distinguished. That is, the QC/QCL concept may comply with one of the definitions. Or, in a similar form, the QC/QCL concept definition may be modified into a form in which transmission may be assumed between antenna ports having a QC/QCL assumption as if it is performed in the co-location (e.g., a UE may assume antenna ports transmitted at the same transmission point). The spirit of the present invention includes such similar modified examples. In the present invention, for convenience of description, the above QC/QCL-related definitions are interchangeably used.

According to the QC/QCL concept, a UE cannot assume the same large-scale property between radio channels from corresponding antenna ports with respect to non-QC/QCL antenna ports. That is, in this case, the UE must perform independent processing on each non-QC/QCL antenna port configured with respect to timing acquisition and tracking, frequency offset estimation and compensation, delay estimation and Doppler estimation.

There is an advantage in that a UE can perform the following operation between antenna ports capable of assuming QC/QCL:

With respect to delay spread and Doppler spread, the UE may apply a power-delay profile, delay spread, a Doppler spectrum, Doppler spread estimation results for a radio channel from any one antenna port to a Wiener filter used upon channel estimation for a radio channel from another antenna port in the same manner With respect to frequency shift and received timing, the UE may apply the same synchronization to the demodulation of another antenna port after performing time and frequency synchronization on any one antenna port.

With respect to average received power, the UE may average reference signal received power (RSRP) measurement for two or more antenna ports.

For example, if DMRS antenna ports for downlink data channel demodulation have been subjected to QC/QCL with the CRS antenna port of a serving cell, the UE can improve DMRS-based downlink data channel reception performance by likewise applying the large-scale property of a radio channel estimated from its own CRS antenna port upon channel estimation through a corresponding DMRS antenna port.

The reason for this is that an estimate regarding the large-scale property can be more stably obtained from a CRS because the CRS is a reference signal broadcasted with relatively high density every subframe and over a full band. In contrast, a DMRS is transmitted in a UE-specific manner with respect to a specific scheduled RB. Furthermore, the precoding matrix of a precoding resource block group (PRG) unit used by an eNB for transmission may be changed, and thus a valid channel received by a UE may vary in a PRG unit. Although a plurality of PRGs has been scheduled, performance deterioration may occur if the DMRS is used to estimate the large-scale property of a radio channel in a wide band. Furthermore, since a CSI-RS may have a transmission period of several~several tens of ms and a resource block has low density of 1 resource element per antenna port on average, performance deterioration may occur if the CSI-RS is used to estimate the large-scale property of a radio channel That is, a UE can use it for the detection/reception of a downlink reference signal, channel estimation and a channel state report by QC/QCL assumption between antenna ports.

Buffer Status Reporting(BSR)

A buffer status reporting procedure may be used for a serving eNB to provide information about the amount of available (or valid) data for transmission in the UL buffers of a UE. In RRC, BSR reporting may be controlled by configuring two timers. In this case, the two timers may correspond to periodicBSR-Timer and retxBSR-Timer. Furthermore, in RRC, BSR reporting may be controlled by signaling a logical channel group (logicalChannelGroup, LCG) for selectively allocating a logical channel for a logical channel group (LCG).

For a BSR procedure, a UE must consider all of not-suspended radio bearers. Furthermore, in this case, the UE may consider suspended radio bearers.

The BSR may be triggered when any one of the following events is generated.

If UL data (for a logical channel to which an LCG belongs) may be transmitted in an RLC entity or PDCP entity and data belonging to a logical channel having higher priority than a logical channel belonging to a specific LCG is already transmittable or there is no data transmittable in anywhere (or through) of the logical channel belonging to the LCG (i.e., a BSR corresponds to/is denoted as an "Regular BSR" to be described later), If UL resources are allocated and the number of padding bits is the same as or greater than the size of the sum of a buffer status report MAC control element and a subheader thereof (i.e., a BSR corresponds to/is denoted as a "Padding BSR" to be described later)

If retxB SR-Timer expires and a UE has transmittable data with respect to a logical channel belonging to an LCG (i.e., a BSR corresponds to/is denoted as an "Regular BSR" to be described later)

If periodicB SR-Timer expires (a BSR corresponds to/is denoted as a "Periodic BSR" to be described later)

In the case of the Regular and Periodic BSR:

If one or more LCGs have transmittable data within a TTI in which a BSR is transmitted: a Long BSR is reported.

In other cases, a Short BSR is reported.

In the case of a padding BSR:

1) If the number of padding bits is the same as or greater than the size of the sum of a Short BSR and a subheader thereof and is smaller than the size of the sum of a Long BSR and a subheader thereof:

If one or more LCGs have transmittable data within a TTI in which a BSR is transmitted: the Truncated BSR of an LCG having a logical channel in which the transmittable data is transmitted and which has the highest priority is reported.

In other cases: a Short BSR is reported.

2) In addition, if the number of padding bits is the same as or greater than the size of the sum of a Long BSR and a subheader thereof: a Long BSR is reported.

If at least one BSR is triggered in a BSR procedure and determined to have been not cancelled:

1) If a UE has UL resources allocated for new transmission in a corresponding TTI:

In order to generate a BSR MAC control element, a multiplexing and assembly procedure is indicated.

periodicBSR-Timer is started or restarted except a case where all of generated BSRs are truncated BSRs.

retxBSR-Timer is started or restarted.

2) In addition, if a Regular BSR is triggered:

If an UL grant is not configured or a Regular BSR is not triggered due to data that may be transmitted through a logical channel (in this case, the logical channel is a channel in which SR masking (logicalChannelSR-Mask) has been configured by an upper layer): a scheduling request is triggered.

If a Regular BSR and Periodic BSR have priority over a padding BSR, although a plurality of events triggering a BRS until the BSR is transmitted is generated, an MAC PDU includes a maximum of one MAC BSR control element. If a UE receives assignment for the transmission of new data of any UL-SCH, it may start or restart retxBSR-Timer.

In all of triggered BSRs, the UL grant of a subframe may accommodate all of pending transmission data, but may be cancelled if it is not sufficient to additionally accommodate the sum of a BSR MAC control element and a subheader thereof. All of triggered BSRs may be cancelled if a BSR is included in an MAC PDU for transmission.

A UE may transmit a maximum of one Regular/Periodic BSR within one TTI. If a UE receives a request for the transmission of a plurality of MAC PDUs within one TTI, it may include a padding BSR in any one of MAC PDUs not including the Regular/Periodic BSR.

All of BSRs transmitted in one TTI may always incorporate a buffer status after all of MAC PDUs configured for the TTI are transmitted. Each LCG may report a maximum of one buffer status value per TTI. The value may be reported in all of BSRs reporting buffer statuses for an LCG. A Padding BSR is not allowed to cancel a triggered Regular/Periodic BSR. A Padding BSR is triggered for only a specific MAC PDU, and the trigger is cancelled when such an MAC PDU is configured.

Device-to-Device (D2D) Communication

Figure 19:
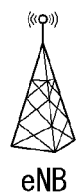
FIG. 19 is a diagram for illustrating the elements of a direct communication (D2D) scheme between UEs.
Figure 19:
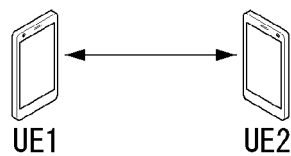

FIG. 19 is a diagram for illustrating the elements of a direct communication (D2D) scheme between UEs.

In FIG. 19, a UE means the UE of a user, and corresponding network equipment may also be taken into consideration to be a kind of UE if the network equipment, such as an eNB, transmits/receives a signal according to a communication method with the UE. Hereinafter, a UE1 may operate to select a resource unit corresponding to specific resources within a resource pool that means a set of a series of resources and to transmit a D2D signal using the corresponding resource unit. A UE2, that is, a reception UE for the UE1, receives a configuration for the resource pool in which the UE1 may send a signal, and detects the signal of the UE1 within the corresponding pool. In this case, an eNB may notify the UE1 of the resource pool if the UE 1 is located within the connection range of the eNB. If the UE1 is out of the connection range of the eNB, another UE may notify the UE1 of the resource pool or the resource pool may be previously determined to be predetermined resources. In general, the resource pool may include a plurality of resource units, and each UE may select one or a plurality of resource units and use it for its own D2D signal transmission.

Figure 20:
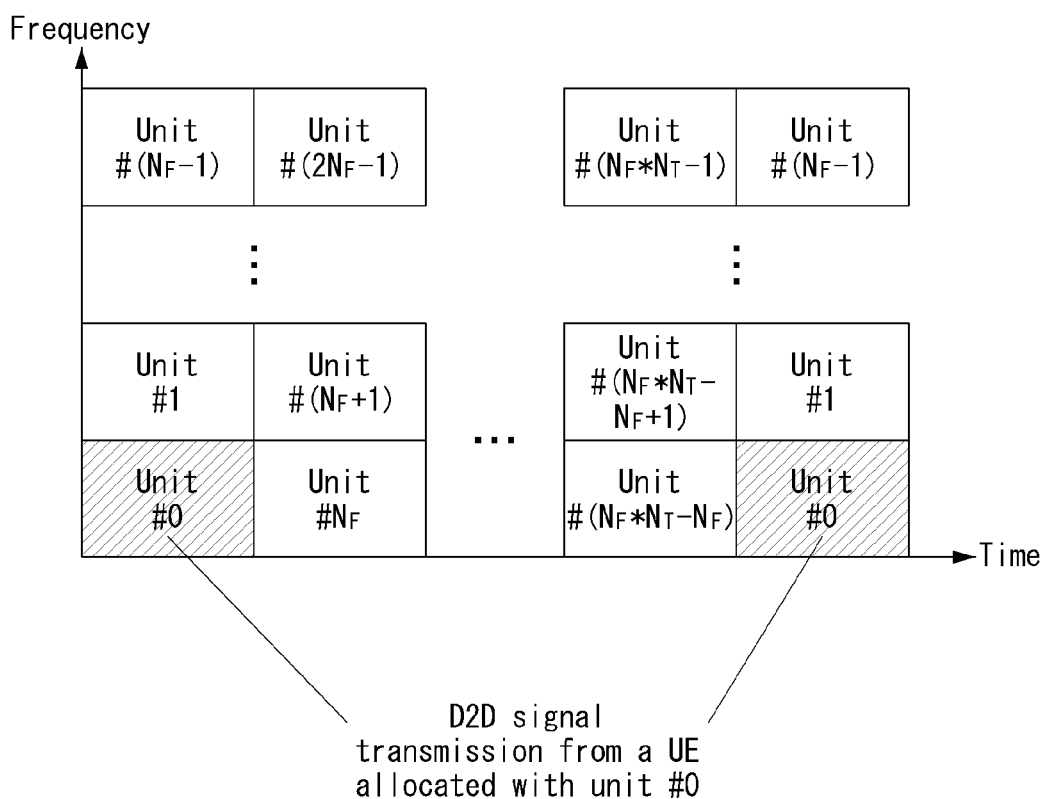
FIG. 20 is a diagram showing an embodiment of the configuration of a resource unit.

FIG. 20 is a diagram showing an embodiment of the configuration of a resource unit.

Referring to FIG. 20, all of frequency resources have been partitioned into N_F, all of time resources have been partitioned into N_T, and thus a total of N_F*N_T resource units may be defined. In this case, it may be expressed that a corresponding resource pool is repeated using an N_T subframe as a cycle. Characteristically, as shown in this drawing, one resource unit may periodically repeatedly appear. Or in order to obtain a diversity in a time or frequency dimension, the index of a physical resource unit to which one logical resource unit is mapped may change in a predetermined pattern over time. In such a resource unit structure, the resource pool may mean a set of resource units that a UE trying to send a D2D signal may use for transmission.

The aforementioned resource pool may be subdivided into several types. First, the resource pool may be divided depending on the contents of a D2D signal transmitted in each resource pool. For example, the contents of a D2D signal may be divided as follows, and a separate resource pool may be configured in each of the contents.

Scheduling assignment (SA): a signal including the location of resources used as the transmission of a D2D data channel used by each transmission UE, a modulation and coding scheme (MCS) necessary for the demodulation of other data channels or information, such as an MIMO transmission method and/or timing advance. The signal may be multiplexed with D2D data on the same resource unit and transmitted. In this specification, an SA resource pool may mean a pool of resources in which SA is multiplexed with D2D data and transmitted, and may also be called a D2D control channel.

A D2D data channel: a resource pool used for a transmission UE to send user data using resources designated through SA. If the resource pool may be multiplexed with D2D data on the same resource unit and transmitted, only a D2D data channel of a form other than SA information may be transmitted in a resource pool for a D2D data channel In other words, a resource element used to transmit SA information on an individual resource unit within an SA resource pool may still be used to send D2D data in a D2D data channel resource pool.

A discovery channel: a resource pool for a message that enables a transmission UE transmits information, such as its own ID, so that an adjacent UE can discover the transmission UE.

In contrast, if the contents of a D2D signal are the same, a different resource pool may be used depending on the transmission/reception attributes of the D2D signal. For example, even in the case of the same D2D data channel or discovery message, it may be classified as a different resource pool depending on a transmission timing determination method of a D2D signal (e.g., whether the D2D signal is transmitted in the reception occasion of a synchronization reference signal or it is transmitted by applying a specific timing advance in a corresponding occasion) or a resource allocation method (e.g., whether an eNB designates the transmission resources of an individual signal for an individual transmission UE or an individual transmission UE autonomously selects individual signal transmission resources within each pool), a signal format (e.g., the number of symbols that each D2D signal occupies within one subframe or the number of subframes used for the transmission of one D2D signal), signal intensity from an eNB, and transmit power intensity of a D2D UE.

Figure 21:
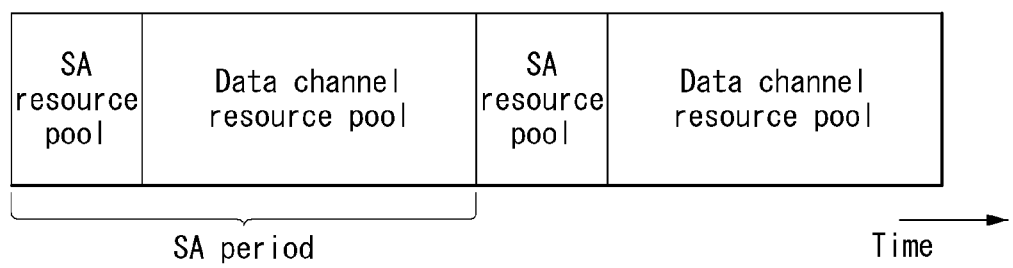
FIG. 21 shows a case where an SA resource pool and a following data channel resource pool periodically appear.

FIG. 21 shows a case where an SA resource pool and a following data channel resource pool periodically appear. Hereinafter, the period in which an SA resource pool appears is called an SA period.

The present invention provides a method of selecting resources for transmitting a relay signal when a relay operation is performed in D2D communication.

In this specification, for convenience of description, a method for an eNB to directly indicate the transmission resources of a D2D transmission UE in D2D communication is called/defined as Mode 1, and a method in which a transmission resource region has been previously configured or a method for an eNB to designate a transmission resource region and for a UE to directly select transmission resources is called/defined as Mode 2. In the case of D2D discovery, a case where an eNB directly indicates resources is called/defined as Type 2, and a case where a UE directly selects transmission resources in a previously configured resource region or in a resource region indicated by an eNB is called/defined as Type 1.

The aforementioned D2D may also be called a sidelink. SA may be called a physical sidelink control channel (PSCCH), and a D2D synchronization signal is called a sidelink synchronization signal (SSS), and a control channel through which the most basic information is transmitted prior to $=$ D2D communication transmitted along with the SSS may be called a physical sidelink broadcast channel (PSBCH) or a physical D2D synchronization channel (PD2DSCH) as another name A signal used for a specific UE to provide notification that it is located nearby, in this case, the signal may include the ID of the specific UE. Such a channel may be called a physical sidelink discovery channel (PSDCH).

In D2D of Rel. 12, only a D2D communication UE has transmitted a PSBCH along with an SSS. Accordingly, the measurement of an SSS is performed using the DMRS of a PSBCH. An out-coverage UE measures the DMRS of a PSBCH, measures the reference signal received power (RSRP) of the signal, and determines whether it will become its synchronization source.

Figure 22:
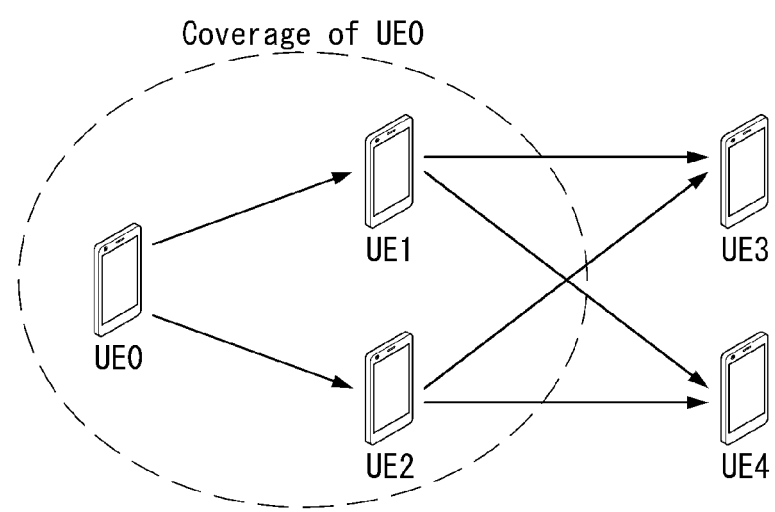
FIGS. 22 to 24 are diagrams showing examples of a relay process and resources for relay to which the present invention may be applied.
Figure 23:
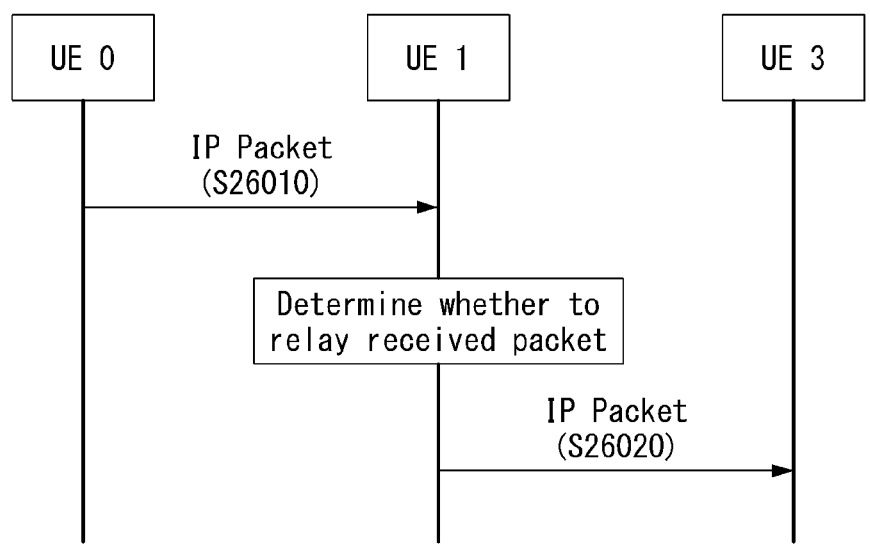
Figure 24:
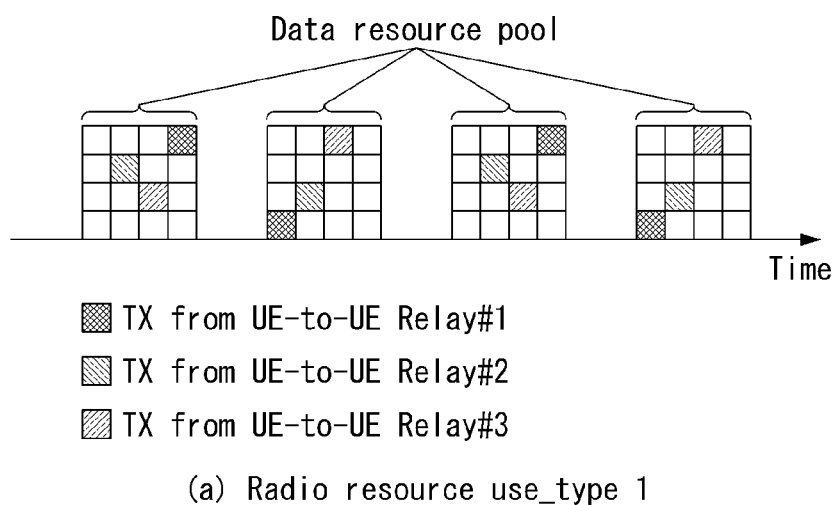
Figure 24:
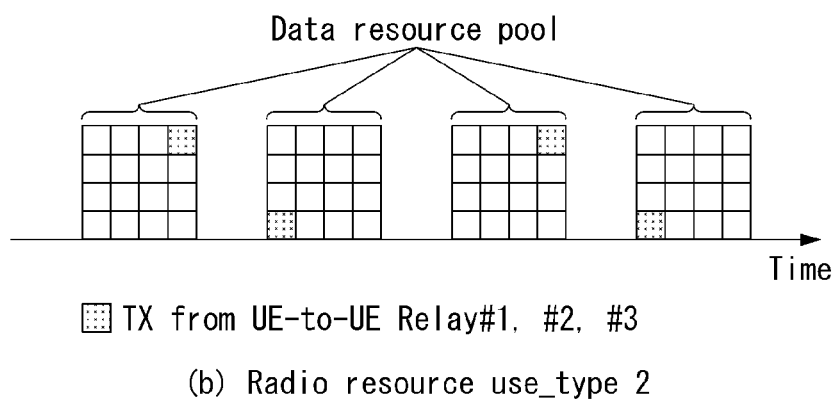

FIGS. 22 to 24 are diagrams illustrating an example of a relay process and a resource for relay according to an exemplary embodiment of the present invention.

Referring to FIGS. 22 to 24, in a communication system that supports device-to-device communication, by transmitting data to a terminal outside coverage through relay, the terminal may substantially extend coverage.

Specifically, as shown in FIG. 22, a UE 1 and/or a UE 2, which are UEs within coverage of a UE 0 may receive a message transmitted by the UE 0.

However, the UE 0 cannot directly transmit a message to a UE 3 and a UE 4 existing outside coverage. Therefore, in such a case, in order to transmit a message to the UE 3 and the UE 4 outside coverage of the UE 0, the UE 0 may perform a relay operation.

In order to transmit a message to the terminal existing outside coverage, the relay operation means an operation in which terminals within coverage transfer a message.

FIG. 23 illustrates an example of the relay operation, and when the UE 0 transmits a data packet to the UE 3 outside coverage, the UE 0 may transmit the data packet to the UE 3 through the UE 1.

Specifically, when the UE 0 transmits the data packet to the UE 3, the UE 0 sets a parameter representing whether the data packet may be relayed to execution of a relay operation and transmits the data packet (S26010).

The UE 1 receives the data packet and determines whether to relay the data packet is through the parameter.

When the parameter instructs a relay operation, the UE 1 transmits the received data packet to the UE 3, and when the parameter does not instruct a relay operation, the UE 1 does not transmit the data packet to the UE 3.

The UE 0 may transmit a message to the terminal existing outside coverage through such a method.

FIG. 24 illustrates an example of a method of selecting a resource for a relay operation.

Referring to FIG. 24(a), the terminal may autonomously select a resource in a resource pool to relay a message. That is, UEs (UE 1, UE 2, and UE 3) that relay the same message may randomly select a resource in a resource pool to relay the same message.

However, in such a case, there is a problem that a receiving terminal that receives a message repeatedly receives the same message through different resources.

Therefore, as shown in FIG. 24(b), in a resource pool, a resource for relay is allocated, and when each relay terminal transmits a message through an allocated resource, the receiving terminal may receive the same message through the same resource, thereby reducing resource waste.

Radio Resources Scheduling Method

The present invention proposes a method for scheduling radio resources for a UE in a wireless communication system.

In particular, in the present invention, a wireless communication environment in which a vehicle-to-everything (V2X) is performed using a radio channel is taken into consideration. V2X includes communication between a vehicle and all of entities, such as a vehicle-to-vehicle (V2V) denoting communication between vehicles, vehicle to infrastructure (V2I) denoting communication between a vehicle and an eNB or a road side unit (RSU), and a vehicle-to-pedestrian (V2P) denoting communication between a vehicle and a UE carried by a person (pedestrian, bicycle driver, vehicle driver or passenger).

Hereinafter, in describing the present invention, for convenience of description, a UE (i.e., vehicle) performing V2X is called a vehicle UE (V-UE), but the present invention is not necessarily limited to a UE performing V2X and may be applied to a common UE.

When V2X is performed, direct communication (V2V) may be performed between UEs (e.g., may correspond to a V-UE, that is, may mean a vehicle terminal) in a dedicated carrier for V2X, or a UE may send (uplink) data to a (serving) eNB through an LTE uplink band.

In this case, while the UE has established an RRC connection with the corresponding (serving) eNB (i.e., RRC_CONNECTED state), the UE may sent the uplink data (i.e., PUSCH) through the scheduling of the (serving) eNB. However, after the RRC connection is disconnected (i.e., RRC_IDLE state), it is difficult to expect that the scheduling-based transmission of the (serving) eNB will be performed as in the existing. Accordingly, in such a case, the UE may set up a connection with the (serving) eNB (again) and perform communication. However, such a method is not always proper because a connection procedure is complicated and many messages must be exchanged.

Accordingly, in this case, a V-UE may previously secure resources by using scheduled resources (i.e., semi-persistent scheduled (SPS) resources) using the existing semi-persistent method. However, as the mobility of a V-UE increases, there may be a case where a serving eNB does not receive the UL data of the V-UE even in corresponding resources.

Accordingly, the present invention proposes a method for a serving eNB to efficiently receive UL data from a V-UE in addition to a method for scheduling the resources of a V-UE that moves with fast mobility.

<UE Mobility and Semi-Persistent Scheduling (SPS)>

It is assumed that resources have been scheduled in a specific V-UE according to the SPS method and only a serving cell knows the information.

Figure 25:
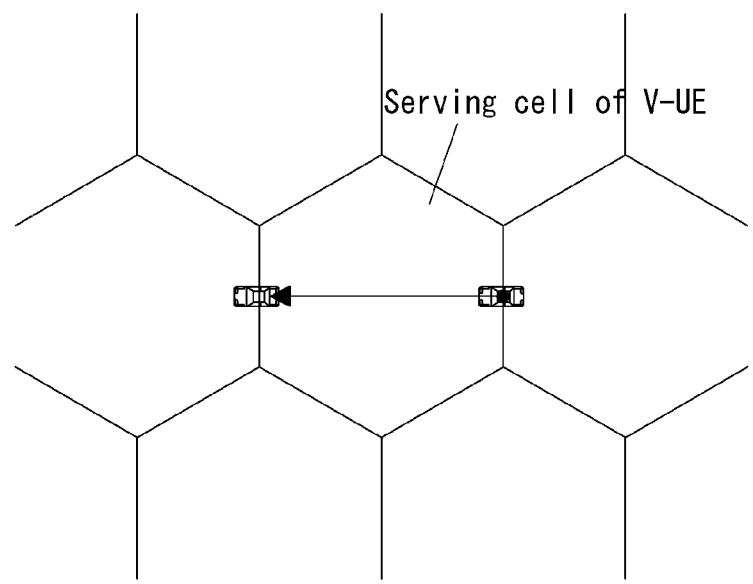
FIG. 25 is a diagram illustrating a cell layout of a wireless communication system to which the present invention may be applied.

FIG. 25 is a diagram illustrating a cell layout of a wireless communication system to which the present invention may be applied.

As in FIG. 25, a V-UE that has left a specific area (e.g., serving cell) cannot continue to use corresponding SPS resources. Furthermore, the V-UE may use new resources determined by (or requested by the V-UE in a new serving cell) by a new area (e.g., new serving cell) that the V-UE has entered through handover. Such a process may act as overhead in message transmission. In particular, if the V-UE transmits only a message (e.g., user data) of a small size, as described above, the transmission of messages for resource allocation may be a great load. Furthermore, if the message (e.g., user data) continues to be periodically transmitted, it may be more efficient to semi-persistently transmit the message in resources at a predetermined location rather than a method of dynamically scheduling resources in line with a message transmission occasion. However, if a change of resources is rapidly generated due to high mobility of a V-UE, the scheduling of such a semi-persistent method may be hindered.

<Condition for Extended SPS>

In this aspect, if a V-UE having high mobility transmits a period message (e.g., user data), more efficient communication can be performed if the following condition is improved in a process of scheduling resources.

Condition 1) A network stage may be aware of information of resources allocated to a specific V-UE or/and to be used for SPS purposes in an area in which the specific V-UE is expected to move in addition to an area in which the specific V-UE will stay.

<Effective Region for SPS>

For example, each area where the aforementioned V-UE stays (i.e., an area where the V-UE stays or an area to which the UE is expected to move) may be an area of a geographical concept. The area may be divided depending on latitude and longitude information. Alternatively, as in the concept of a wireless communication system (e.g., LTE network), the area may be a cell coverage area covered by one cell. In this case, cells (or eNBs) present in each area may transfer resource information of a V-UE to a high network stage.

If each area is divided into cell coverage as described above, in order to define an area that shares resource information, it may be assumed that a cluster including one or more cells is present as in FIG. 2.

Figure 26:
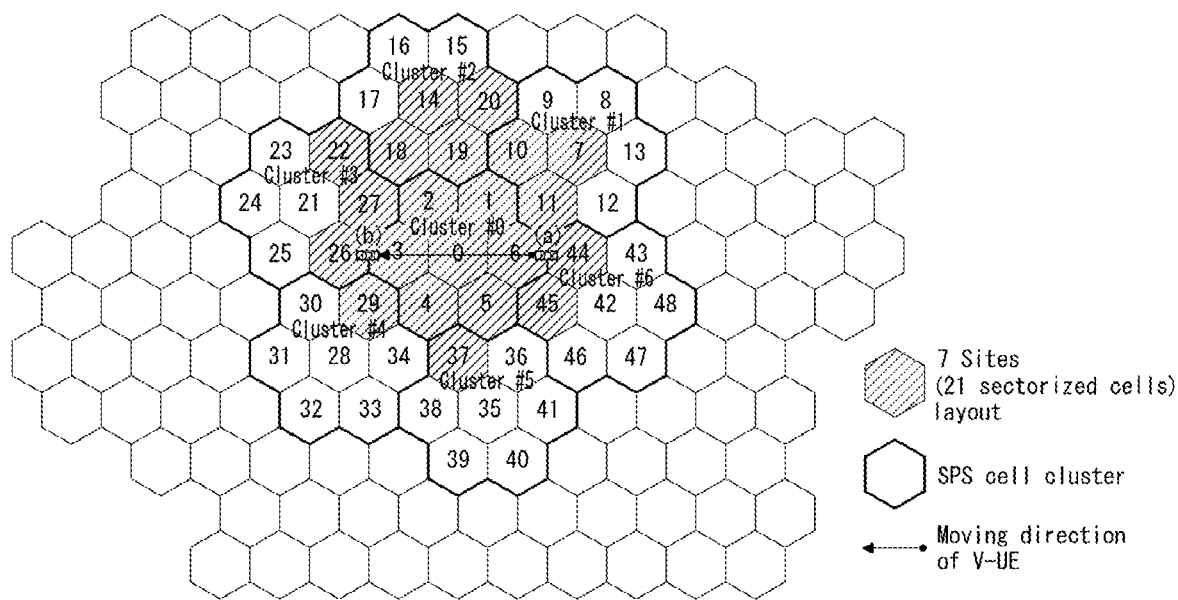
FIG. 26 is a diagram for illustrating a cluster according to an embodiment of the present invention.

FIG. 26 is a diagram for illustrating a cluster according to an embodiment of the present invention.

A cluster may determine a region to which the scheduling of an SPS method is validly applied. Furthermore, a cluster may be controlled by a high layer as in a tracking area (TA) in LTE, for example. Cells within a cluster may have been synchronized or may share synchronization information. Furthermore, cells within a cluster may share resource information related to scheduling. Practically, a TA may be capable of cell clustering of various forms, but assumes clustering of the same form, for convenience of description.

In a hexagonal cell layout configuration, for example, as in FIG. 26, a structure in which a center eNB is located at the center of a cluster and n (n=6 in FIG. 26) eNBs surround the center eNB may be taken into consideration. FIG. 26 illustrates a case where a cluster #0 consists of a cell #0 to a cell 5, a cluster #1 consists of a cell #7 to a cell 13, a cluster #2 consists of a cell #14 to a cell 20, a cluster ·3 consists of a cell #21 to a cell 27, a cluster #4 consists of a cell #28 to a cell 34, a cluster #5 consists of a cell #35 to a cell 41, and a cluster #6 consists of a cell #42 to a cell 48.

If an eNB has been sectorized, the sectorized cells may gather to form a cluster or if cells have not been sectorized and an eNB has an omni-antenna, eNB sites may gather to form a cluster.

Meanwhile, FIG. 26 illustrates the configuration of the hexagonal cell layout, for convenience of description and illustrates a method of configuring a cluster, but the present invention is not limited thereto. The cluster concept according to the present invention may be applied to various cell layout configurations.

<Operation of Cell Cluster>

For example, if it is expected that there is no change of a serving cluster while a V-UE moves from a point (a) of FIG. 26 to a point (b), an SPS operation may be maintained. That is, for V2X transmission (or other purposes), cells within the same cluster transmit the same (cluster-specific) signal at the same time according to a single frequency network (SFN) method or cells within the same cluster may transmit respective cell-specific signals at the same time according to SFN.

For example, each cluster may transmit a specific signal based on the synchronization signal or cell-id of each cell or a signal (hereinafter referred to as a "cluster synchronization signal". For example, it may be distinguished by a physical cell ID, a virtual cell ID or a group ID) for a corresponding cluster.

For example, if one or more LTE cells configure a cluster as described above, a cell(s) within the cluster may allocate resources for SPS transmission in an LTE band. In this case, the corresponding resources may be resources for data transmitted in the uplink of an LTE band (e.g., a V-UE performs uplink data transmission to an LTE cell through a Uu interface) or may be resources for (V2V) data transmitted to the V-UE. In this case, for example, if the resources for V2V data are designated, cells using the LTE band may indicated the use of resources for the corresponding V-UE in a V2V band (e.g., a PC5 interface may be used in a dedicated carrier different from an LTE band, such as a 5.9 GHz band).

In accordance with an embodiment of the present invention, as in the example of FIG. 26, it may be assumed that there is no cell overlapped between clusters.

Furthermore, in accordance with another embodiment of the present invention, it may be assumed that the redundancy of the same cell between clusters is permitted. In this case, one cell may belong to two or more different clusters. Such a cell may selectively transmit only a signal for a single cluster in a specific occasion (based on time division multiplexing (TDM))

<SPS Operation: if there is No Cell Overlapped Between Clusters>

As in FIG. 26, if clusters are configured without a cell overlapped between the clusters, an SPS operation may be defined as follows.

1) Each cell belongs to a specific single cluster, and may transmit a cluster synchronization signal that may include the ID of each cluster at predetermined timing (e.g., subframe #) based on its own cluster index. For example, a sequence for a cluster synchronization signal based on a cluster ID may be generated.

For example, all of clusters may transmit a cluster synchronization signal at the same timing. For another example, all of clusters may transmit cluster synchronization signals at different timing.

Figure 27:
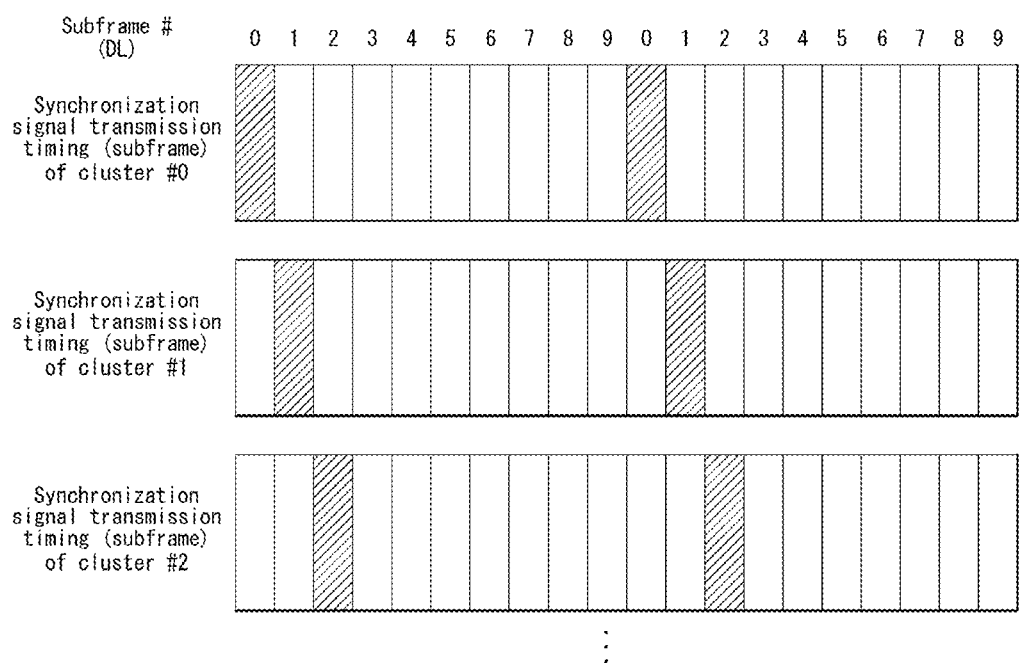
FIG. 27 is a diagram illustrating a method of transmitting a cluster synchronization signal according to an embodiment of the present invention.

FIG. 27 is a diagram illustrating a method of transmitting a cluster synchronization signal according to an embodiment of the present invention.

FIG. 27 illustrates a case where clusters transmit cluster synchronization signals in different subframes.

FIG. 26 illustrates a case where a cluster synchronization signal is transmitted in one subframe within one radio frame per one cluster, but a cluster synchronization signal may be repeatedly transmitted in one or more subframes within one radio frame.

Furthermore, like a primary synchronization signal (PSS) and a secondary synchronization signal (SSS), a cluster synchronization signal may be configured as a plurality of types of synchronization signals. The types of cluster synchronization signals may be transmitted in the same or different periods through separate time-frequency resources.

2) A V-UE may monitor neighbor clusters and obtain cluster IDs.

For example, referring to FIG. 26, when the V-UE enters the point (a), it may be greatly influenced by the cluster synchronization signal of the cluster #0 rather than the signal of another cluster.

Furthermore, the V-UE may attempt a connection (e.g., initiates a random access procedure) with a cluster that belongs to corresponding clusters and that has a cluster synchronization signal of the strongest intensity or may attempt a connection with a preferred cluster.

3) If the V-UE is determined to have moved to a new cluster, parameters received from the existing cluster may be released and a parameter for the new cluster may be applied (i.e., cluster handover).

In this case, resources previously allocated according to the SPS method may also be released and new resources may be allocated by the new cluster. For example, the V-UE may receive resources allocated by a PDCCH that carries DCI to which CRC scrambled by an SPS-RNTI has been attached.

For example, if the V-UE transmits LTE uplink data through the Uu interface, a serving eNB (or eNB within a serving cluster) may determine whether it will release the SPS resources of the corresponding V-UE based on whether UL data is received from the V-UE. For example, if continuous empty transmission of a specific number or more continues as in Implicit Release After {e2 to e8} (in this case, "e" means empty transmission and e2 indicates twice or more continuous empty transmission) in the RRC layer, SPS resources may be released. Or, the UE may recognize a change of a serving eNB (or serving cluster) (i.e., based on a cluster synchronization signal), and may request the release of the SPS resources from the changed serving eNB (or serving cluster).

For another example, if a transmission V-UE transmits V2V data to a reception V-UE through a PC5 interface, the reception V-UE taken into consideration to be located in the same cluster may not receive data from the transmission V-UE continuously (i.e., a specific number or more/more than a specific number or more). For example, the reception V-UE may transmit an indicator to the V-UE, such as ACK/NAK, as a response to cluster-based SPS data reception. In this case, each reception V-UE may transmit an indicator corresponding to a specific ACK/NAK region defined based on a cluster ID and/or the ID of a Tx V-UE. In this case, the reception V-UE may transmit ACK/NAK for all of data transmitted by the transmission V-UE. Or, if data is not continuously received from the V-UE by a specific number or more, the reception V-UE may transmit NAK in order to indicate this fact. In this case, the number may be previously defined. As in the SPS operation of LTE, the number may be defined (or set) through higher layer signaling or may be transferred to the V-UE through a physical channel. If the transmission V-UE determines that all of (or some) reception V-UEs estimated to be located in the same cluster do not properly receive data based on such an ACK/NAK response (i.e., if an NAK response is received from all of (or some) reception V-UEs), the transmission V-UE may recognize that it has been out of a corresponding cluster and attempt SPS release and SPS re-request on a serving eNB (or serving cluster).

In this case, in order to avoid interference between neighbor clusters, each cluster may use a different resource pool.

Figure 28:
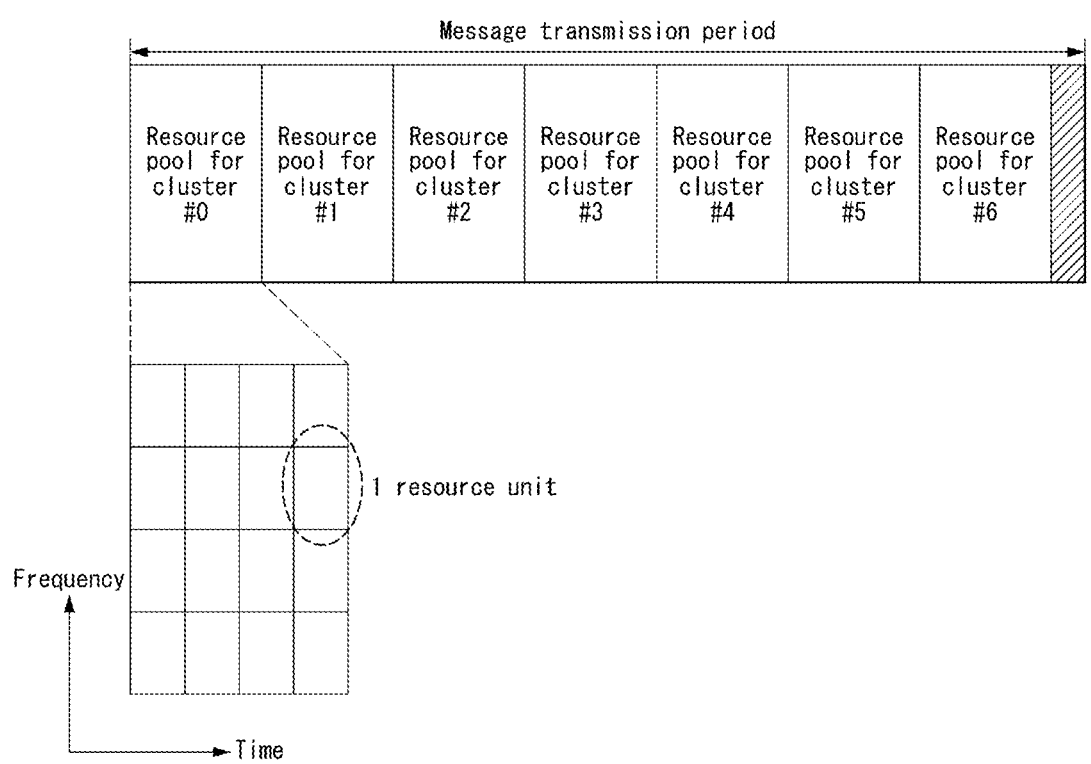
FIG. 28 is a diagram illustrating resource pools used in a cluster according to an embodiment of the present invention.

FIG. 28 is a diagram illustrating resource pools used in a cluster according to an embodiment of the present invention.

One resource pool may include a set of one or more different subframes as in FIG. 28.

In this case, during each V2X transmission period, there may be resources not used for V2X SPS resource transmission.

FIG. 28 shows a case where resource pools for respective clusters have been continuously attached in a time domain. One resource pool may be uniformly spread within a message transmission period. That is, resource pools for respective clusters may not be continuously configured in the time domain.

One resource pool may be partitioned into time/frequency resources as in FIG. 28 according to a unit (i.e., resource unit) in which each V-UE transmits a message.

Furthermore, each cluster may allocate a resource unit selected within a resource pool configured therefor (e.g., based on the ID of a V-UE or randomly selected) to the V-UE.

4) When a V-UE periodically monitors a cluster ID-related signal and detects a signal greater than the signal of a corresponding serving cluster or when the signal of a serving cluster is a specific level or less, the V-UE may attempt the reselection of another cluster.

Or, as described above, although reception V-UEs belonging to the same cluster do not properly receive the signal of a transmission V-UE, they may attempt cluster reselection.

For example, in FIG. 26, when the V-UE moves from the point (a) to the point (b), it may attempt a connection with the cluster #3 from which a cluster synchronization signal is expected to be received most greatly (i.e., the cluster #3 reselection).

<SPS Operation: a Specific Cell may be Redundantly Present in a Plurality of Clusters>

Figure 29:
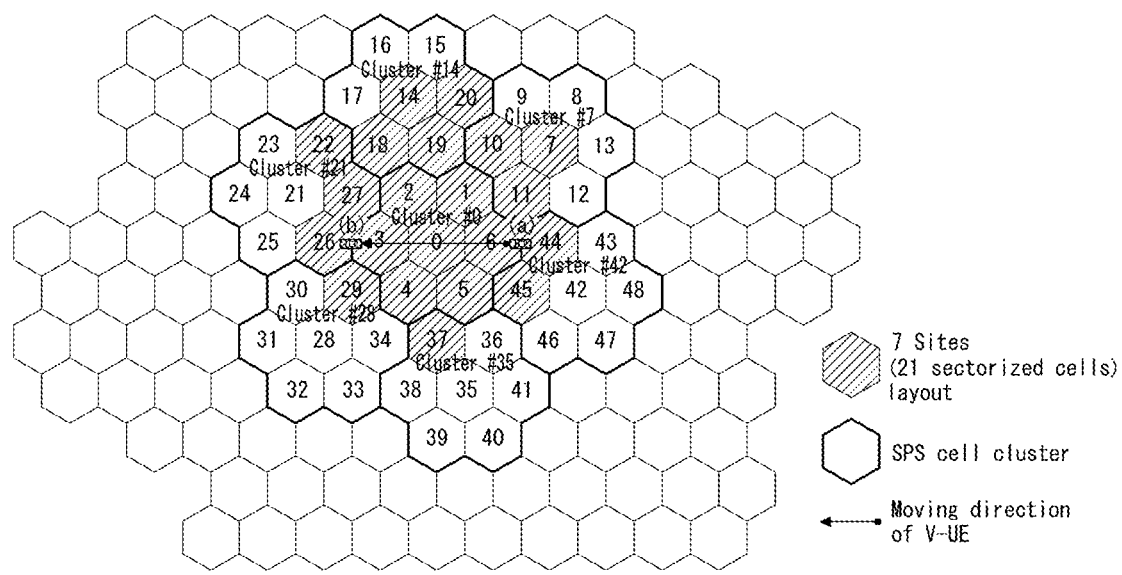
FIG. 29 is a diagram for illustrating a cluster according to an embodiment of the present invention.

FIG. 29 is a diagram for illustrating a cluster according to an embodiment of the present invention.

Each cell may belong to one or more clusters.

For example, in a cell layout, such as FIG. 29, each cell may become the center cell of all of the clusters. In this case, at timing where signals (e.g., cluster synchronization signals) related to a cluster to which each cell belongs as a center cell is exchanged, each cell operates as a center cell (or cluster head). If not, each cell may operate as a neighbor cell (or cluster member).

That is, a cell #n becomes a center cell and forms a cluster #n. In other words, that is, in the cluster #n, the cell #n becomes the center cell and consists of cells neighboring the cell #n. For example, the cluster #1 may consist of the cell #1, the cell #10, the cell #19, the cell #2, the cell #0, and the cell #6.

FIG. 29 illustrates cells of 0≤n<49. In this case, the cells #0, #7, #14, . . . #42 form clusters as respective center cells. This may be defined like a cluster group #0. That is, the cluster group #0 may consist of the cluster #0, the cluster #7, the cluster #14, . . . , the cluster #42. Likewise, a cluster group #1 may consist of clusters including the cells #1, #8, #15, . . . #43 as center cells.

As in FIG. 29, a cell(s) belonging to a specific cluster may redundantly belong to another cluster(s), an SPS operation may be defined as follows.

1) Cells belonging to each cluster transmits a cluster synchronization signal that may include the ID of each cluster at predetermined timing (e.g., subframe #) based on its own cluster index. For example, a sequence for cluster synchronization signals may be generated based on cluster IDs.

For example, when a cluster transmits a synchronization signal, all of clusters may transmit signals at different timing or some clusters (i.e., cluster group) may transmit cluster synchronization signals at the same timing. In the case of the cell layout, such as FIG. 29, if the cluster #0 in which the cell #0 belongs as a center cell transmits a cluster synchronization signal, clusters (i.e., cluster #1 to cluster #6) in which the remaining cells (i.e., cell #1 to cell #6) of the corresponding cluster #0 belong as center cells may not transmit cluster synchronization signals at the same timing as the cluster #0. Accordingly, clusters in which the cells #1 to the cell #6 belong as center cells may transmit synchronization signals at timing different from that of the cluster #0.

In order to satisfy such a condition, the transmission of a cluster synchronization signal at the same timing for each cluster group as in FIG. 30 may be taken into consideration.

FIG. 30 is a diagram illustrating a method of transmitting a cluster synchronization signal according to an embodiment of the present invention.

FIG. 30 illustrates a case where cluster groups transmit cluster synchronization signals in different subframes.

FIG. 30 illustrates a case where each cluster group transmits a cluster synchronization signal in one subframe within one radio frame, but each cluster group may repeatedly transmit a cluster synchronization signal in one or more subframes within one radio frame.

Furthermore, as in a PSS or SSS, a cluster synchronization signal may include a plurality of types of synchronization signals, and each type of the cluster synchronization signal may be transmitted in the same or different period through a separate time-frequency resource.

2) A UE may Monitor Neighbor Clusters and Acquire Cluster IDs.

For example, in FIG. 29, when the V-UE enters the point (a), it may start to be influenced by the cluster synchronization signals of the clusters #0, #1, #5, #6, #44, and #45 more greatly.

Furthermore, the V-UE may attempt a connection (e.g., initiate a random access procedure) with a cluster that belongs to the corresponding clusters and that has the greatest cluster synchronization signal or may attempt a connection with a preferred cluster.

3) If it is determined that a V-UE has moved to a new cluster, parameters received from the exiting cluster may be released and a parameter for the new cluster may be applied (i.e., cluster handover).

In this case, resources previously allocated according to the SPS method may also be released, and new resources may be allocated by the new cluster. For example, the V-UE may receive resources allocated by a PDCCH that carries DCI to which CRC scrambled by an SPS-RNTI has been attached.

For example, if the V-UE transmits LTE uplink data through the Uu interface, a serving eNB (or eNB within a serving cluster) may determine whether to release the SPS resources of the corresponding V-UE based on whether UL data is received from the V-UE. For example, if continuous empty transmission of a specific number or more continues in the RRC layer like ImplicitReleaseAfter {e2 to e8} (in this case, "e" means empty transmission, and e2 indicates twice or more continuous empty transmissions), the SPS resources may be released. Or, the UE may recognize a change of the serving eNB (or serving cluster) (i.e., based on a cluster synchronization signal), and may request the release of the SPS resources from the changed serving eNB (or serving cluster).

For another example, if a transmission V-UE transmits V2V data to a reception V-UE through the PC5 interface, the reception V-UE considered to be within the same cluster may not receive data transmitted by the transmission V-UE continuously (i.e., a specific number or more/more than a specific number or more). For example, the reception V-UE may transmit an indicator, such as ACK/NAK, to a V-UE as a response to cluster-based SPS data reception. In this case, each reception V-UE may transmit a corresponding indicator in a specific ACK/NAK region defined based on a cluster ID and/or the ID of a Tx V-UE. In this case, the reception V-UE may transmit ACK/NAK for all of data transmitted by the transmission V-UE or may transmit NAK in order to indicate that data has not been received from the V-UE if the data is not received continuously a specific number or more. In this case, the number may be previously defined. As in the SPS operation of LTE, the number may be defined (or set) through higher layer signaling or may be delivered to the V-UE through a physical channel. If the transmission V-UE determines that all of (or some) reception V-UEs estimated to be within the same cluster do not properly receive data based on such an ACK/NAK response (i.e., if an NAK response is received from all of (or some) reception V-UEs), the transmission V-UE may recognize that it has been out of a corresponding cluster and attempt an SPS release and SPS re-request for a serving eNB (or serving cluster).

In this case, each cluster may use a different resource pool in order to avoid interference between neighbor clusters. This is described with reference to the following drawing.

Figure 31:
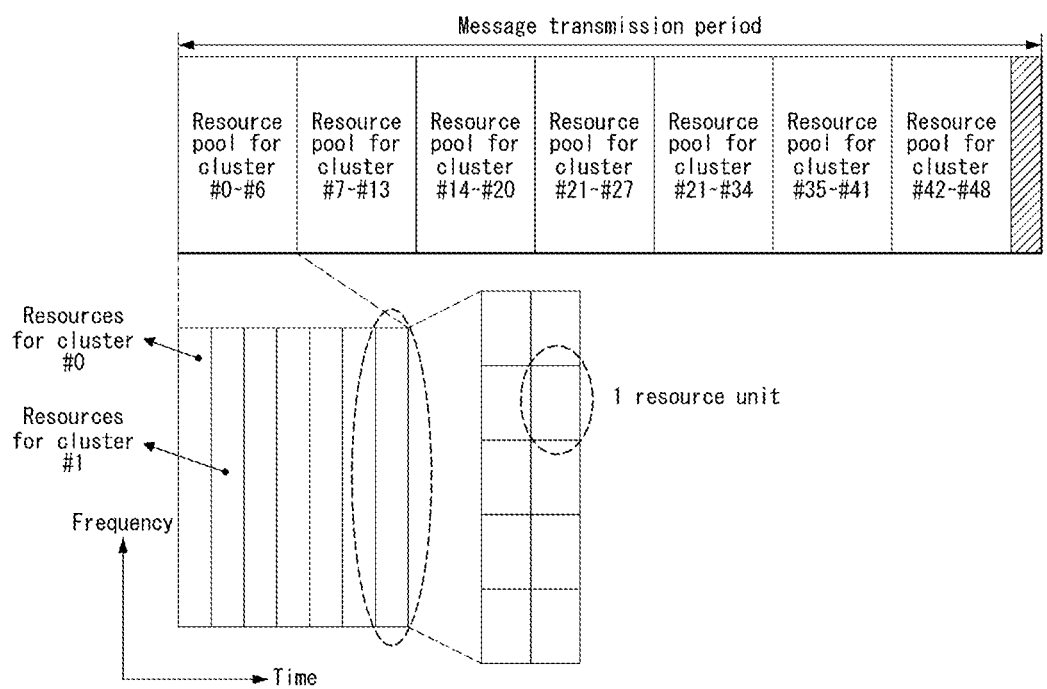
FIG. 31 is a diagram illustrating resource pools used in a cluster according to an embodiment of the present invention.

FIG. 31 is a diagram illustrating resource pools used in a cluster according to an embodiment of the present invention.

In particular, interference between clusters can be minimized when clusters belonging to the same cluster group use different resource pools. Furthermore, when clusters in which cells belonging to each cluster are center cells use resource pools according to the TDM scheme, corresponding cells can easily perform transmission according to a cooperative method. Resource pools, such as FIG. 31, may be configured by taking these points into consideration.

One resource pool may include a set of one or more different subframes as in FIG. 31.

In this case, there may be resources not used for 2X SPS resource transmission during each V2X transmission period.

FIG. 31 shows a case where resource pools for respective clusters have been continuously attached in a time domain, but one resource pool may be uniformly spread within a message transmission period. That is, the resource pools may not be continuously configured in the time domain.

One resource pool may be partitioned into time/frequency resources as in FIG. 31 based on a unit (i.e., resource unit) on which each V-UE transmits a message.

Furthermore, each cluster may allocate a resource unit selected within resources configured therefor (e.g., based on the ID of the V-UE or randomly selected) to the V-UE.

Alternatively, clusters belonging to the same cluster group may be configured to use the same resource pool. This is described with reference to the following drawing.

Figure 32:
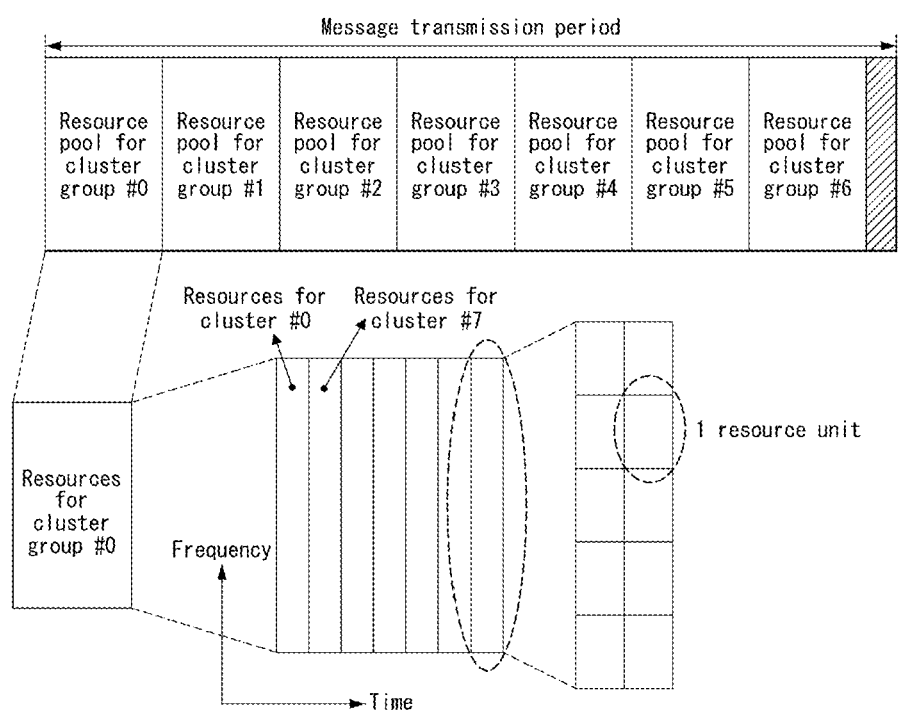
FIG. 32 is a diagram illustrating resource pools used in a cluster according to an embodiment of the present invention.

FIG. 32 is a diagram illustrating resource pools used in a cluster according to an embodiment of the present invention.

Referring to FIG. 32, the same resource pool may be configured in clusters belonging to the same cluster group.

One resource pool may include a set of one or more different subframes as in FIG. 32.

Furthermore, there may be resources not used for V2X SPS resource transmission during each V2X transmission period.

FIG. 32 shows a case where resource pools for respective cluster groups have been continuously attached in a time domain. One resource pool may be uniformly spread within a message transmission period. That is, the resource pools for the respective cluster groups may not be continuously configured in the time domain.

In this case, as in FIG. 32, clusters belonging to each cluster group may use different resources according to the TDM scheme within a resource pool configured within a corresponding cluster group.

One resource for each cluster may be partitioned into time/frequency resources as in FIG. 32 based on a unit (i.e., resource unit) on which each UE transmits a message.

Furthermore, each cluster may allocate a resource unit (e.g., based on the ID of a V-UE UE or randomly selected) selected within a resource pool configured therefor to the V-UE.

Alternatively, resources may not be distinguished according to a method, such as TDM, between clusters included in a corresponding cluster group within a resource pool allocated to a single cluster group so that resource reselection according to mobility is generated as small as possible.

4) A V-UE periodically monitors a cluster ID-related signal. When a signal greater than the signal of a corresponding serving cluster is detected, the V-UE may attempt the reselection of another cluster when the signal of the serving cluster is a specific level or less.

In this case, the V-UE may first select a cluster synchronization signal that belongs to the cluster synchronization signals of FIG. 30 and that corresponds to its own cluster group.

A resource pool that enables a V-UE to transmit data may have been defined for each cluster group according to the definition of the resource pool. In this case, clusters may alternately perform transmission of the TDM scheme for each cluster as in FIG. 32 within a corresponding resource pool.

In the aforementioned configuration in which a specific cell belongs to a plurality of clusters, for the above operation, the data transmission occasion/reception occasion of an eNB may be partitioned into several phases so that one cell does not transmit/receive signals for the plurality of clusters at the same time.

For example, in the example of FIG. 31, a total of valid reception occasion/transmission occasions for uplink data/downlink data may be partitioned into seven phases (i.e., time resources). In this case, a different resource pool(s) may be assigned to each reception occasion/transmission occasion. Whether each cell is the center cell of a cluster in which phase or whether another cell serves as an assistant cell of another cluster in which another cell is a center cell in which phase may have been previously determined.

In a specific cluster, a center cell receives the uplink data of a UE(s) belonging to the specific cluster in a corresponding phase (or transmits downlink data in the corresponding phase). The remaining cells may transmit/receive nothing in the corresponding phase (i.e., this means that UEs belonging to the remaining cells do not perform uplink data transmission in the corresponding phase or the remaining cells do not transmit downlink data in the corresponding phase) or may receive the uplink data of a UE(s) belonging to a center cell together and deliver the uplink data to the center cell (or transmit downlink data along with the center cell (e.g., SFN)).

That is, clusters that transmit/receive data in the same phase may be grouped into the same cluster group.

Clusters belonging to a cluster group may use different resources according to the TDM scheme as in FIG. 32, but may use the same resources (or resources are not distinguished) as described above.

Figure 33:
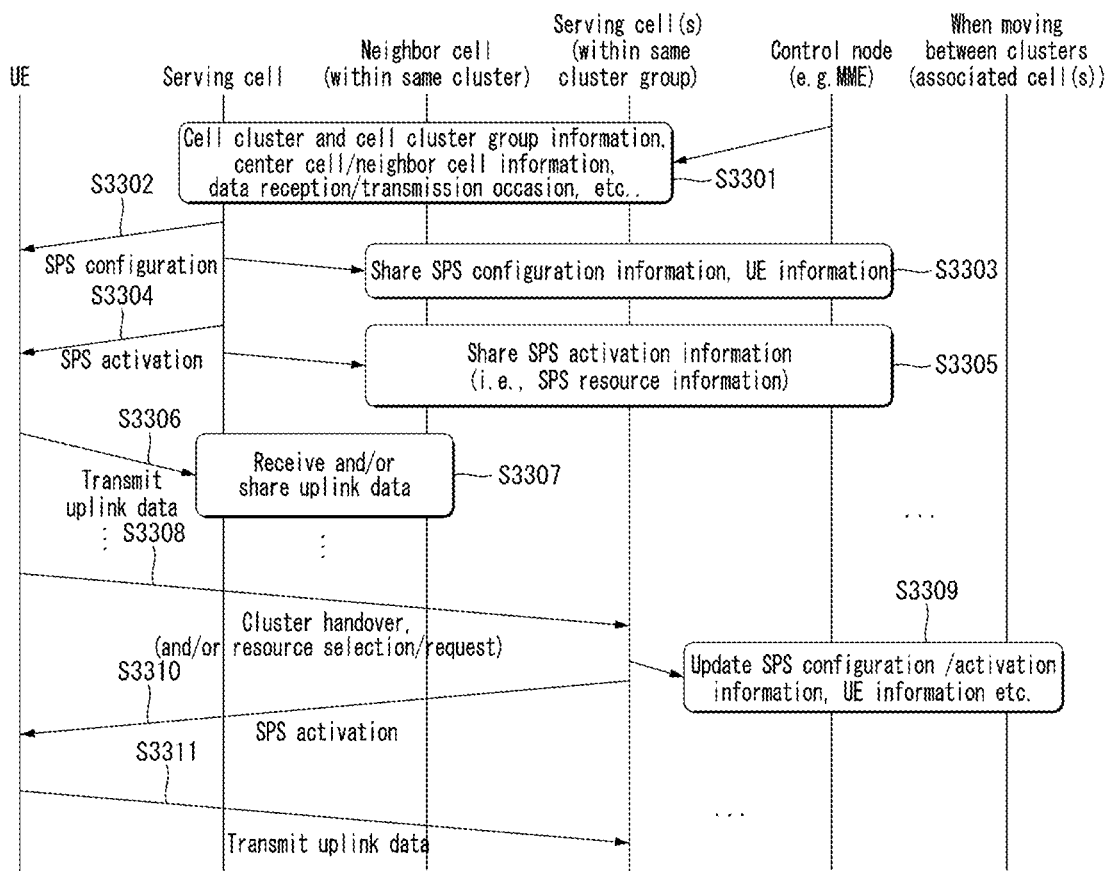
FIG. 33 is a diagram illustrating a resource allocation method according to an embodiment of the present invention.

In this case, if the clusters belonging to the same cluster group use different resources according to the TDM scheme, when a UE moves between the clusters, resource reselection (UE request) may be generated as in FIG. 33.

Figure 34:
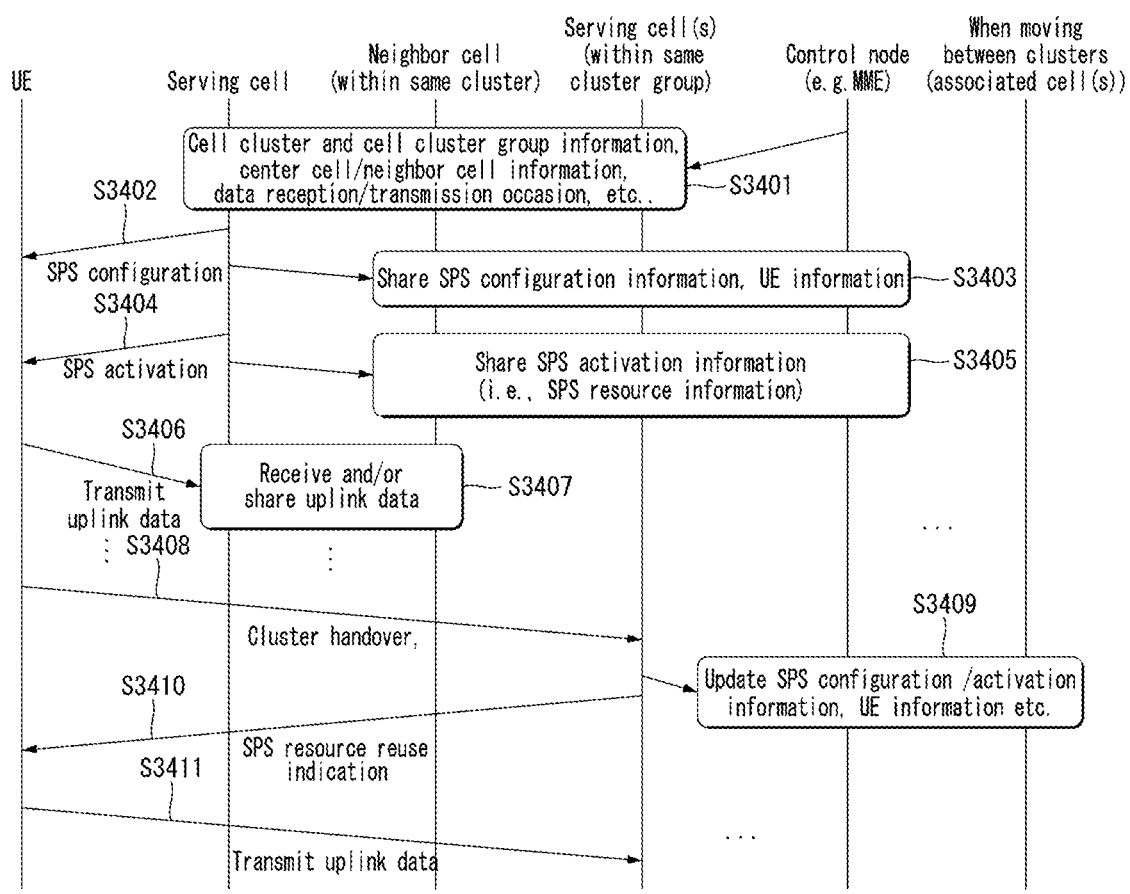
FIG. 34 is a diagram illustrating a resource allocation method according to an embodiment of the present invention.

Furthermore, if clusters belonging to the same cluster group use the same resource, a UE may continue to use the same resources as in FIG. 34 without the resource reselection of the UE due to the sharing of resources between the clusters. In this case, a cluster to which the UE has newly moved may indicate (or handover success or SPS activation) that the UE may use SPS resources without any change through a paging channel UL grant message.

The high node (e.g., MME) of an eNB that manages an eNB/cell may previously define and deliver information about such a cell cluster and cell cluster group, center cell/neighbor cell information within a cluster, and data reception/transmission occasion information in each cluster to an eNB/cell(s).

FIG. 33 is a diagram illustrating a resource allocation method according to an embodiment of the present invention.

Referring to FIG. 33, a control node (e.g., MME) transmits cell cluster and cell cluster group information, information about a center cell/neighboring cell in each cluster, and UL/DL data reception/transmission occasion information to a serving cell, a neighbor cell(s) within the same cluster, and a serving cell(s) within the same cluster group (S3301).

A new UE enters a serving cell and/or the serving cell transmits SPS configuration information, including semi-persistent resource allocation information, to a UE depending on a resource situation (S3302).

That is, the UE receives first SPS configuration information, including semi-persistent resource allocation information of a first cluster to which the serving cell belongs, from a first eNB.

In this case, the SPS configuration information may include period information of SPS resources (i.e., DL resources or UL resources) allocated to the UE, time/frequency domain location information of a resource unit selected in the resource pool of a first cluster to which the serving cell of the UE belongs, and number information ("ImplicitReleaseAfter") for determining whether to release the number of HARQ processes and/or SPS resources.

The serving cell shares the corresponding information by transmitting the SPS configuration information and the information of the corresponding UE to the neighbor cell(s) within the same cluster, the serving cell(s) within the same cluster, and a control node (S3303).

The serving cell transmits SPS activation information to the UE (S3304).

That is, the UE receives first SPS resources allocated within the serving cell based on the first SPS configuration information by receiving SPS assignment (i.e., SPS activation) from the first eNB.

The serving cell shares the corresponding information by transmitting the SPS activation information (i.e., SPS resource information) to the neighbor cell(s) within the same cluster, the serving cell(s) within the same cluster, and the control node (S3305).

The UE transmits UL data in the allocated resources (i.e., first SPS resources) (S3306).

In this case, the serving cell receives the UL data from the UE and shares the UL data by transmitting the received UL data to the neighbor cell(s) within the same cluster (S3307).

Thereafter, the UE performs cluster handover by moving to a cluster belonging to the same cluster group (S3308).

As described above, when the UE performs cluster handover (or reselects a cluster), priority may be assigned to a cluster belonging to the same cluster group as a cluster to which the serving cell of the UE belongs. Accordingly, the UE may perform handover to a second cluster belonging to the same cluster group as the first cluster to which the serving cell belongs.

If clusters belonging to the same cluster group use different resources according to the TDM scheme, the serving cell of the cluster to which the UE has moved (or the center cell of the cluster to which the UE has moved) may (re)select resources for the UE. That is, the second eNB may transmit to the UE time/frequency domain location information of a resource unit selected in the resource pool of the second cluster to which a serving cell to which the UE has moved belongs. In this case, higher layer signaling or physical layer control signaling may be used.

Alternatively, the UE may request the allocation of resources from the serving cell of the cluster to which the UE has moved. For example, the UE may request the allocation of a new resource unit by transmitting a scheduling request to the second eNB. Furthermore, the UE may receive time/frequency domain location information of the new resource unit from the second eNB as a response to the allocation request of the resource unit. In this case, higher layer signaling or physical layer control signaling may be used.

Furthermore, the UE may directly designate a resource unit in the resource pool of the second cluster to which the serving cell to which the UE has moved belongs, and may request the allocation of the designated resource unit from the second eNB. For example, the UE may select a resource unit at a location having less delay for the resource allocation of resources that may be allocated to the UE, and may request the resource unit from the second eNB. In this case, the UE may receive assignment for the allocation of the corresponding resource unit from the second eNB as a response to the allocation request of the resource unit.

As described above, if clusters belonging to the same cluster group use different resources according to the TDM scheme, when a UE performs handover between the clusters, a resource unit allocated to the corresponding UE may be reselected. However, even in this case, in addition to a change in the location of the resource unit, an SPS configuration configured in the corresponding UE may be identically applied.

The serving cell(s) within the same cluster updates corresponding information by transmitting the SPS configuration information, SPS activation information and UE information to an associated cell(s) when the UE moves between control nodes and clusters (S3309).

The serving cell(s) within the same cluster transmit the SPS activation information to the UE (S3310).

That is, the UE receives second SPS resources allocated thereto within the new serving cell based on the first SPS configuration information by receiving SPS assignment (i.e., SPS activation) from the second eNB.

In this case, a different resource region is configured within a resource pool for each cluster to which the same cluster group belongs. Accordingly, the first SPS resources may be allocated within a resource region configured in the first cluster, and the second SPS resources may be allocated within a resource region configured in the second cluster.

However, the second SPS resources are allocated in the new serving cell of the UE, but are allocated based on the first SPS configuration information, and thus may be allocated in the same period as the first SPS.

The UE transmits UL data in the allocated resources (i.e., second SPS resources) (S3311).

FIG. 34 is a diagram illustrating a resource allocation method according to an embodiment of the present invention.

Referring to FIG. 34, a control node (e.g., MME) transmits cell cluster and cell cluster group information, information about a center cell/neighboring cell in each cluster, and UL/DL data reception/transmission occasion information to a serving cell, a neighbor cell(s) within the same cluster, and a serving cell(s) within the same cluster group (S3401).

A new UE enters a serving cell and/or the serving cell transmits SPS configuration information, including semi-persistent resource allocation information, to a UE depending on a resource situation (S3402).

That is, the UE receives first SPS configuration information, including semi-persistent resource allocation information of a first cluster to which the serving cell belongs, from a first eNB.

In this case, the SPS configuration information may include period information of SPS resources (i.e., DL resources or UL resources) allocated to the UE.

The serving cell shares the corresponding information by transmitting the SPS configuration information and the information of the corresponding UE to the neighbor cell(s) within the same cluster, the serving cell(s) within the same cluster, and a control node (S3403).

The serving cell transmits SPS activation information to the UE (S3404).

That is, the UE receives first SPS resources allocated within the serving cell based on the first SPS configuration information by receiving SPS assignment (i.e., SPS activation) from the first eNB.

The serving cell shares the corresponding information by transmitting the SPS activation information (i.e., SPS resource information) to the neighbor cell(s) within the same cluster, the serving cell(s) within the same cluster, and the control node (S3405).

The UE transmits UL data in the allocated resources (i.e., first SPS resources) (S3406).

In this case, the serving cell receives the UL data from the UE and shares the UL data by transmitting the received UL data to the neighbor cell(s) within the same cluster (S3407).

Thereafter, the UE performs cluster handover by moving to a cluster belonging to the same cluster group (S3408).

As described above, when the UE performs handover (or reselects a cluster), priority may be assigned to a cluster belonging to the same cluster group as a cluster to which the serving cell of the UE belongs. Accordingly, the UE may perform handover to a second cluster belonging to the same cluster group as the first cluster to which the serving cell belongs.

The serving cell(s) within the same cluster update corresponding information by transmitting the SPS configuration information, SPS activation information and UE information to an associated cell(s) when the UE moves between control nodes and clusters (S3409).

As described above, if clusters belonging to the same cluster group use the same resources, the serving cell(s) within the same cluster transmits SPS resources reuse indication to the UE (S3410).

In this case, the UE may be provided with indication (or handover success or SPS activation) indicating that the UE may use the SPS resources in the cluster to which the UE has newly moved without any change through a paging channel UL grant message.

That is, the UE may continue to use the same resources without resource reselection due to the sharing of resources between clusters belonging to the same cluster group. In other words, the UE may receive second SPS resources allocated thereto within the new serving cell based on the first SPS configuration information by receiving the indication indicating that the UE may use the same resources, such as SPS assignment, from the second eNB. In this case, the second SPS resources may correspond to resources at the same location as the first SPS resources in the time-frequency domains.

The UE transmits UL data in the allocated resources (i.e., second SPS resources) (S3411).

Meanwhile, although not illustrated in FIGS. 33 and 34, if the UE performs handover to a third cluster belonging to a cluster group different from the first cluster, it may receive second SPS configuration information including semi-persistent resource allocation information of the third cluster from a third eNB. Furthermore, the UE may receive third SPS resources allocated thereto based on the second SPS configuration information by receiving SPS assignment from the third eNB.

In this case, when the UE completes handover to the third cluster, it may request the release of the second SPS resources from the third eNB. Alternatively, if empty transmission of a specific number or more continues on the second SPS resources from the UE, the second SPS resources may be released. Alternatively, when non-acknowledgement (NACK) is continuously transmitted by a specific number or more by a reception UE that receives data through the second SPS resources, the second SPS resources may be released.

Meanwhile, FIGS. 33 and 34 illustrate cases where the UE transmits UL data through SPS resources, for convenience of description, but the present invention is not limited thereto and may be identically applied to a case where DL data is transmitted to a UE through SPS resources.

General Apparatus to which the Present Invention may be Applied

Figure 35:
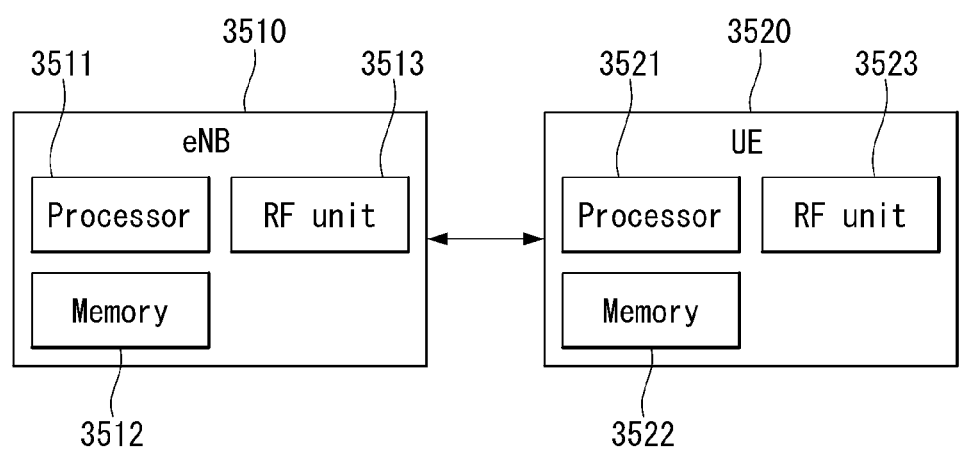
FIG. 35 illustrates a block diagram of a wireless communication apparatus according to an embodiment of the present invention.

FIG. 35 illustrates a block diagram of a wireless communication apparatus according to an embodiment of the present invention.

Referring to FIG. 35, a wireless communication system includes an eNB 3510 and a plurality of UEs 3520 located within the area of the eNB 3510.

The eNB 3510 includes a processor 3511, memory 3512, and a radio frequency (RF) unit 3513. The processor 3511 implements the functions, processes and/or methods proposed in FIGS. 1 to 34. The layers of the radio interface protocol may be implemented by the processor 3511. The memory 3512 is connected to the processor 3511 and stores various types of information for driving the processor 3511. The RF unit 3513 is connected to the processor 3511 and transmits and/or receives a radio signal.

The UE 3520 includes a processor 3521, memory 3522 and an RF unit 3523. The processor 3521 implements the functions, processes and/or methods proposed in FIGS. 1 to 34. The layers of the radio interface protocol may be implemented by the processor 3521. The memory 3522 is connected to the processor 3521 and stores various types of information for driving the processor 3521. The RF unit 3523 is connected to the processor 3521 and transmits and/or receives a radio signal.

The memory 3512, 3522 may be inside or outside the processor 3511, 3521 and may be connected to the processor 3511, 3521 by various well-known means. Furthermore, the eNB 3510 and/or the UE 3520 may have a single antenna or multiple antennas.

In the aforementioned embodiments, the elements and characteristics of the present invention have been combined in specific forms. Each of the elements or characteristics may be taken into consideration to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The present invention has been illustrated as being applied to the 3GPP LTE/LTE-A systems, but may be applied to various wireless communication systems in addition to the 3GPP LTE/LTE-A systems.

The invention claimed is:

1. A method for a user equipment (UE) being allocated with radio resources in a wireless communication system, the method comprising:
receiving, from a first evolved-NodeB (eNB), first configuration information related to a group for resource allocation; and
determining an allocated resource based on the first configuration information and a location of the UE,
wherein the group includes a plurality of regions related to a plurality of cells that are synchronized,
wherein the allocated resource is determined based on a resource pool related to the group, and
wherein when a region in which the UE is located is changed from a first region related to the first eNB to a second region related a second eNB, the allocated resource is valid when the second region is included in the plurality of regions.

2. The method of claim 1, wherein the group is based on a first cluster which is comprised of the plurality of cells.

3. The method of claim 2, further comprising:
receiving a synchronization signal related to at least one of a plurality of clusters,
wherein a cluster to which the UE belongs is determined based on the synchronization signal.

4. The method of claim 3, wherein the synchronization signal is transmitted in different subframes for each cell belonging to the cluster.

5. The method of claim 3, wherein when a cluster handover is performed, a cluster having greatest received intensity of the synchronization signal is selected among the plurality of clusters.

6. The method of claim 3, wherein the synchronization signal is transmitted at same timing determined according to an index of the cluster.

7. The method of claim 2, further comprising:
receiving, from the second eNB, second configuration information when the second region is included in a plurality of regions of a second cluster different from the first cluster, wherein the allocated resource is determined based on a resource pool related to the second cluster when the second region is included in the plurality of regions of the second cluster.

8. The method of claim 7, wherein when empty transmission of a specific number or more continues from the UE on the allocated resource, the allocated resource is released.

9. The method of claim 7, wherein the allocated resource is released when non-acknowledgement (NACK) is continuously transmitted by a specific number or more from the UE receiving data through the allocated resource using vehicle-to-vehicle (V2V) communication.

10. The method of claim 1, wherein the allocated resource is released when the second region is not included in the plurality of regions.

11. A user equipment (UE) being allocated with radio resources in a wireless communication system, the UE comprising:
a radio frequency (RF) unit for transmitting/receiving a radio signal; and
a processor controlling the RF unit,
wherein the processor is configured to:
receive, from a first evolved-NodeB (eNB), first configuration information related to a group for resource allocation; and
determine an allocated resource based on the first configuration information and a location of the UE,
wherein the group includes a plurality of regions related to a plurality of cells that are synchronized,
wherein the allocated resource is determined based on a resource pool related to the group, and
wherein when a region in which the UE is located is changed from a first region related to the first eNB to a second region related a second eNB, the allocated resource is valid when the second region is included in the plurality of regions.

* * * * *